United States Patent [19]
Inoue et al.

[11] Patent Number: 5,602,940
[45] Date of Patent: Feb. 11, 1997

[54] METHOD OF LABELING IMAGE DATA AND DEVICE FOR THE SAME USING TEMPORARY LABELS HAVING A CONCENTRATION RELATIONSHIP

[75] Inventors: Yoshitsugu Inoue; Hiroyuki Kawai, both of Hyogo, Japan

[73] Assignee: Mitsubishi Denki Kabushiki Kaisha, Tokyo, Japan

[21] Appl. No.: 539,151

[22] Filed: Sep. 29, 1995

Related U.S. Application Data

[63] Continuation of Ser. No. 225,266, Apr. 8, 1994, abandoned.

[30] Foreign Application Priority Data

Apr. 9, 1993 [JP] Japan ..................................... 5-083153
Jul. 22, 1993 [JP] Japan ..................................... 5-181526

[51] Int. Cl.$^6$ ..................................................... G06K 9/36
[52] U.S. Cl. ........................................... 382/180; 382/204
[58] Field of Search ............................... 395/60, 62, 133; 382/180, 203, 204, 205, 286

[56] References Cited

U.S. PATENT DOCUMENTS

| | | | |
|---|---|---|---|
| 4,624,013 | 11/1986 | Urushibata | 382/9 |
| 5,113,451 | 5/1992 | Chapman et al. | 382/8 |
| 5,305,393 | 4/1994 | Kawai et al. | 382/9 |

FOREIGN PATENT DOCUMENTS

| | | | |
|---|---|---|---|
| 60-250480 | 12/1985 | Japan | G06F 15/62 |
| 2-48778 | 2/1990 | Japan | G06F 15/70 |

OTHER PUBLICATIONS

A High Speed Labeling Algorithm for Raster–Scanned Type, Japan Institute of Electronics Information Communication Engineers Transactions, vol. J73–D–II, No. 1, Jan. 1990, pp. 36–45.

Shima et al., "A High Speed Algorithm For Propagation–type Labelling Based on Block Sorting of Runs . . ." IEEE (1990).

Ishiyama et al., "Labelling Board Based on Boundary Tracking" IEEE (1992).

English Translation of Japanese Kokoku #2–48778 to Fujiwara, publ. Feb. 1990.

English Translation of "A High Speed Labelling Algorithm For Raster–Scanned Type," Article by Okuyama et al., Jan. 1990.

*Primary Examiner*—Andrew Johns
*Attorney, Agent, or Firm*—Lowe, Price, LeBlanc & Becker

[57] ABSTRACT

When a leading end of a run on an upper row in a binary mask which performs raster scan over a binary image is detected, a run label which was assigned to the same run when scanning a row preceding the current row by one row is read out, and label diversion destination data is read from a concatenation table using the read run label as an address. A temporary label is determined by comparing a concatenated label, which indicates the minimum label value of the runs prior to the run on the upper row of which leading end is detected and adjacent to the run existing on the run on the lower row of the binary mask, with the diversion destination data read from the concatenation table. If one of them is 0, the other label data is issued as the temporary label. If both of them are 0, a new label is issued as the temporary label. If the compared label values are different from each and are not 0, the smaller label value is written into the concatenation table using the larger label value as the address. In the labeling process for a binary image data, a frequency of assignment of multiple labels to the same object is reduced, and thereby a load in a label integrating process is reduced.

65 Claims, 54 Drawing Sheets

FIG. 2
| ADDRESS | 0 | 1 | 2 | 3 | 4 |
|---------|---|---|---|---|---|
| DATA    | 0 | 1 | 2 | 3 | 4 |
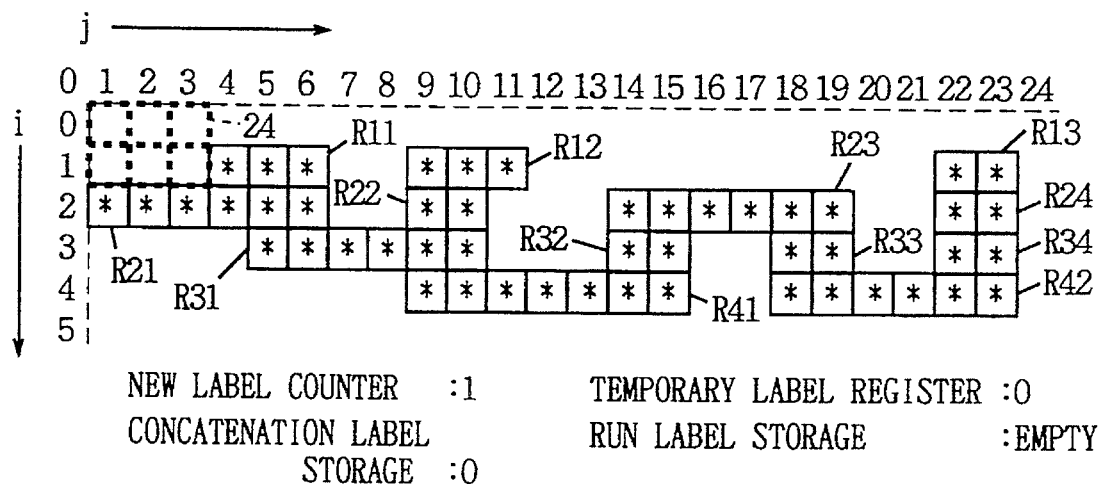
FIG. 3
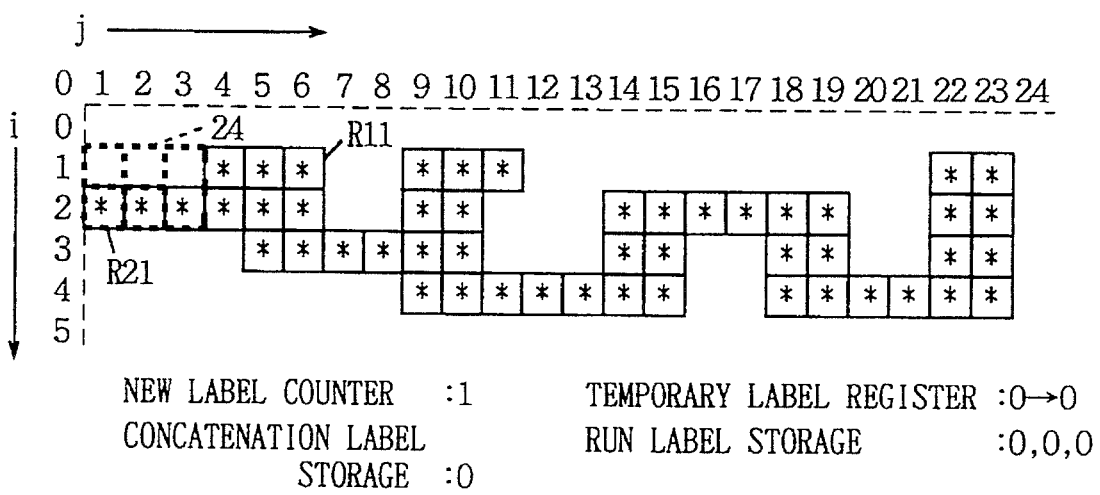
FIG. 4

FIG. 11
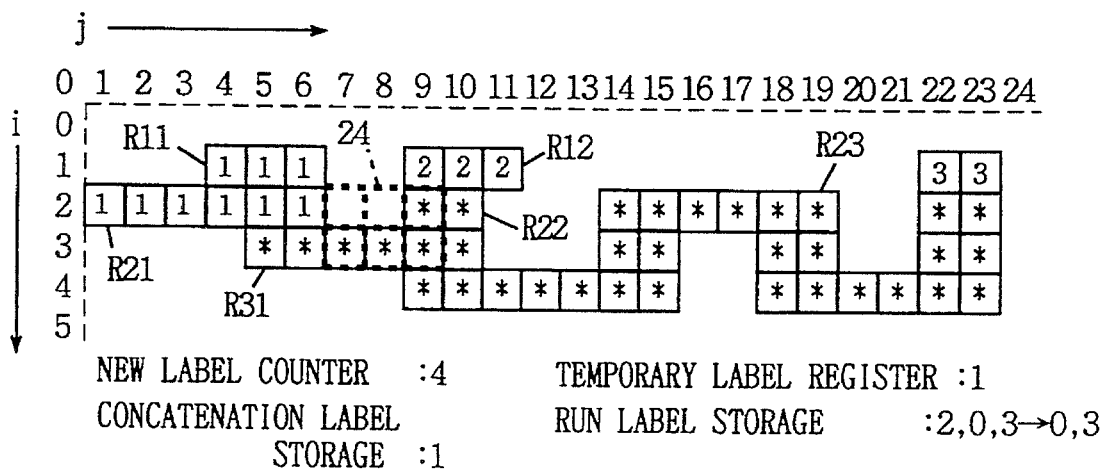
FIG. 12
| ADDRESS | 0 | 1 | 2 | 3 | 4 |
|---------|---|---|---|---|---|
| DATA    | 0 | 1 | 1 | 3 | 4 |
FIG. 13
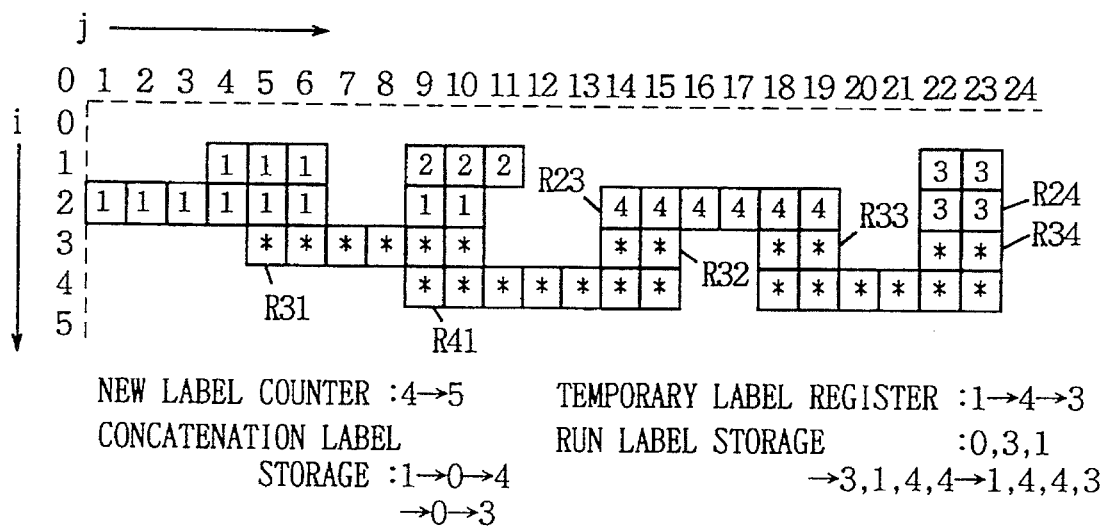

FIG. 14
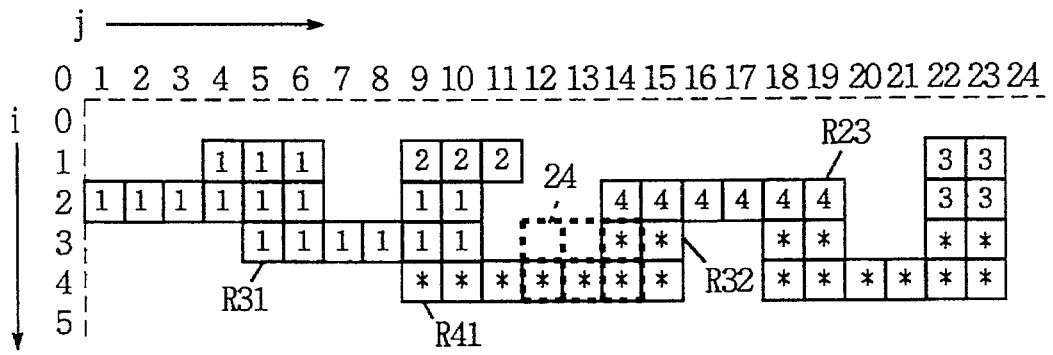
FIG. 15
| ADDRESS | 0 | 1 | 2 | 3 | 4 |
|---------|---|---|---|---|---|
| DATA    | 0 | 1 | 1 | 3 | 1 |
FIG. 16
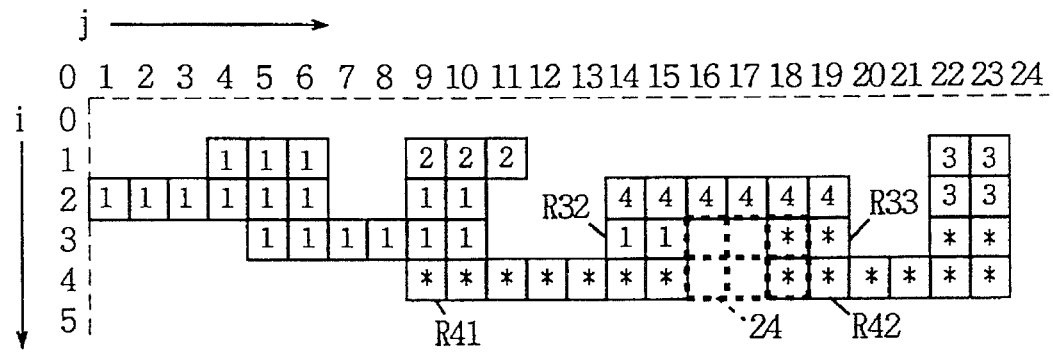

FIG. 17
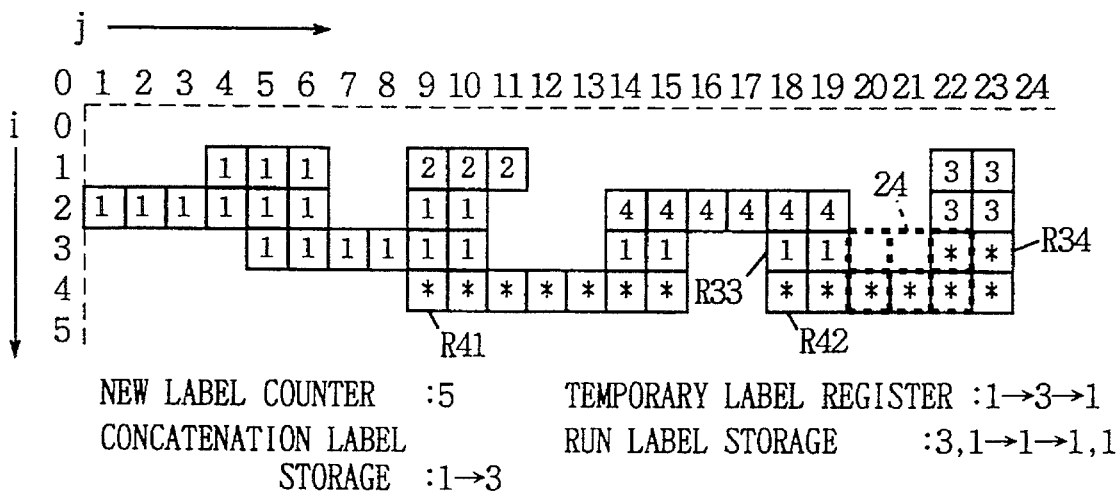
FIG. 18
| ADDRESS | 0 | 1 | 2 | 3 | 4 |
|---|---|---|---|---|---|
| DATA | 0 | 1 | 1 | 1 | 1 |
FIG. 19
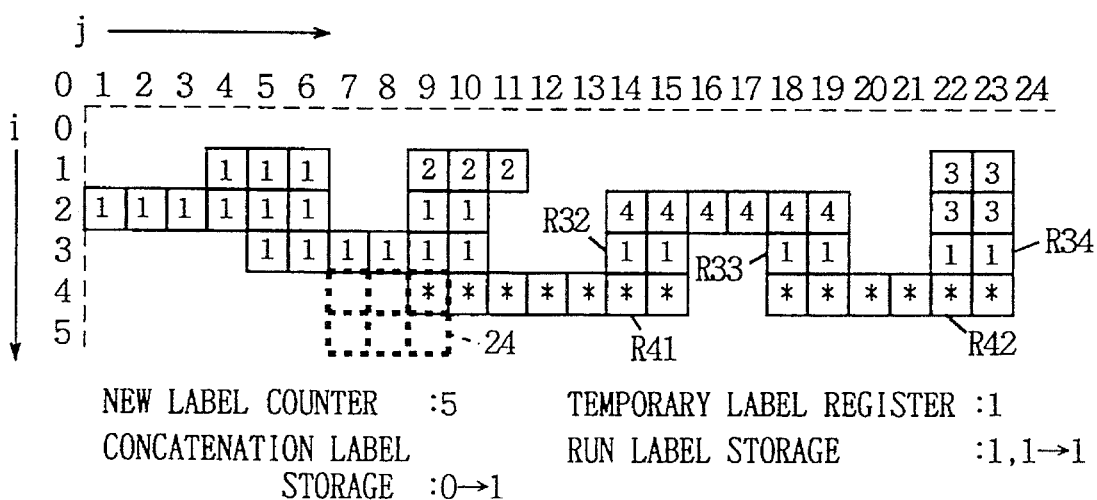

| ADDRESS | 0 | 1 | 2 | 3 | 4 |
|---|---|---|---|---|---|
| DATA | 0 | 1 | 2 | 3 | 4 |

| ADDRESS | 0 | 1 | 2 | 3 | 4 |
|---------|---|---|---|---|---|
| DATA    | 0 | 1 | 2 | 2 | 4 |

| ADDRESS | 0 | 1 | 2 | 3 | 4 |
|---------|---|---|---|---|---|
| DATA    | 0 | 1 | 2 | 2 | 2 |

| ADDRESS | 0 | 1 | 2 | 3 | 4 |
|---------|---|---|---|---|---|
| DATA    | 0 | 1 | 1 | 2 | 2 |

FIG. 27
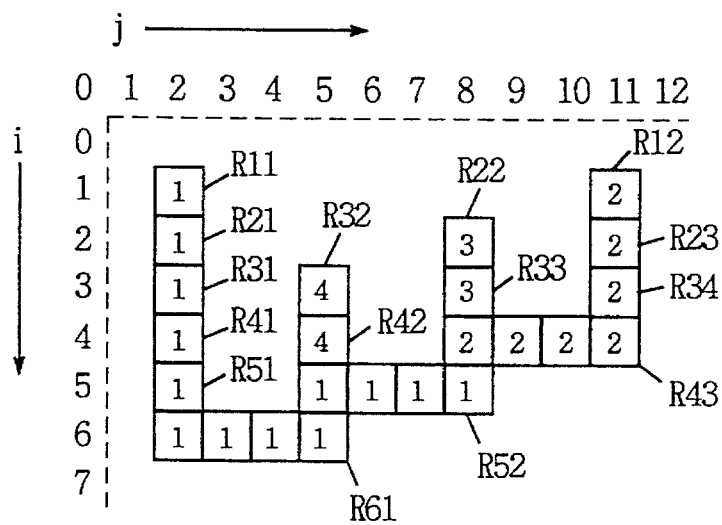
FIG. 28
| ADDRESS | 0 | 1 | 2 | 3 | 4 |
|---------|---|---|---|---|---|
| DATA    | 0 | 1 | 1 | 1 | 1 |
FIG. 29
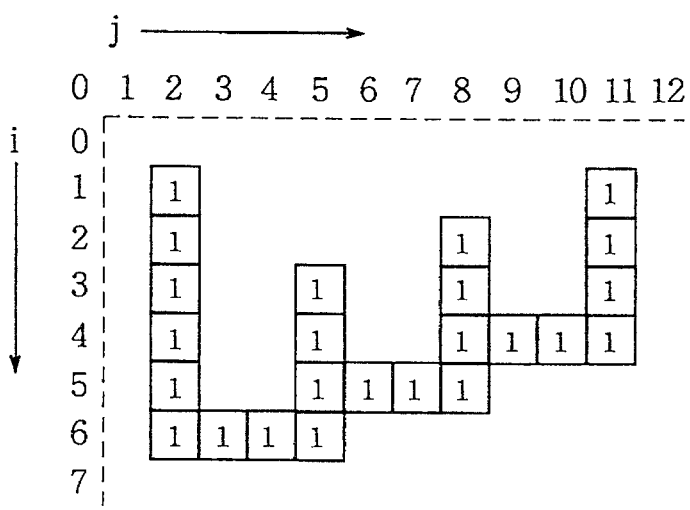

| RUN LABEL | CONCATENATION LABEL | CONCATENATION TABLE DATA | $(\phi 1, \phi 0)$ |
|---|---|---|---|
| ADD | — | — | (0,0) |
| — | ADD | DAT | (1,0) |
| — | DAT | ADD | (1,1) |
| — | — | — | (0,1) |

FIG. 56
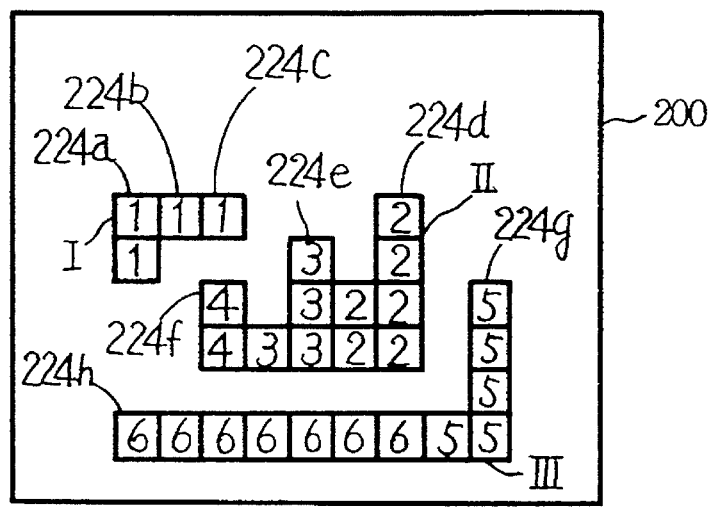
FIG. 57
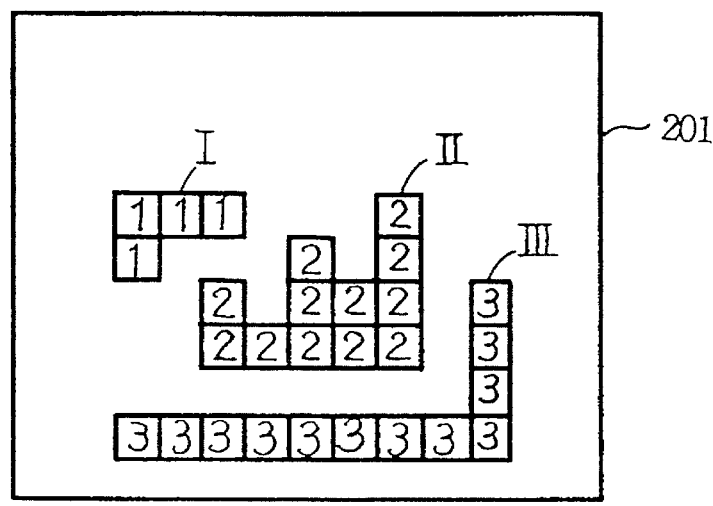
FIG. 58
| ADDRESS | 1 | 2 | 3 | 4 | 5 | 6 |
|---------|---|---|---|---|---|---|
| DATA    | 1 | 2 | 2 | 3 | 5 | 5 |

FIG. 60A

| ADDRESS | 1 | 2 | 3 | 4 | 5 | 6 |
|---|---|---|---|---|---|---|
| DATA | 1 | 2 | 2 | 3 | 5 | 5 |

TEMPORARY LABEL COUNTER :1

FINAL LABEL COUNTER :0→1

FIG. 60B

| ADDRESS | 1 | 2 | 3 | 4 | 5 | 6 |
|---|---|---|---|---|---|---|
| DATA | 1 | 2 | 2 | 3 | 5 | 5 |

TEMPORARY LABEL COUNTER :2

FINAL LABEL COUNTER :1→2

FIG. 60C

| ADDRESS | 1 | 2 | 3 | 4 | 5 | 6 |
|---|---|---|---|---|---|---|
| DATA | 1 | 2 | 2 | 3 | 5 | 5 |

TEMPORARY LABEL COUNTER :3

FINAL LABEL COUNTER :2

FIG. 60D

| ADDRESS | 1 | 2 | 3 | 4 | 5 | 6 |
|---|---|---|---|---|---|---|
| DATA | 1 | 2 | 2 | 3 | 5 | 5 |

↓
2

TEMPORARY LABEL COUNTER :4

FINAL LABEL COUNTER :2

FIG. 61A

| ADDRESS | 1 | 2 | 3 | 4 | 5 | 6 |
|---------|---|---|---|---|---|---|
| DATA    | 1 | 2 | 2 | 2 | 5 | 5 |

↓
3

TEMPORARY LABEL
COUNTER :5

FINAL LABEL
COUNTER :2→3

FIG. 61B

| ADDRESS | 1 | 2 | 3 | 4 | 5 | 6 |
|---------|---|---|---|---|---|---|
| DATA    | 1 | 2 | 2 | 2 | 3 | 5 |

↓
3

TEMPORARY LABEL
COUNTER :6

FINAL LABEL
COUNTER :3

FIG. 61C

| ADDRESS | 1 | 2 | 3 | 4 | 5 | 6 |
|---------|---|---|---|---|---|---|
| DATA    | 1 | 2 | 2 | 2 | 3 | 3 |

DATA STRUCTURE OF
CONCATENATION TABLE

FIG. 73 PRIOR ART
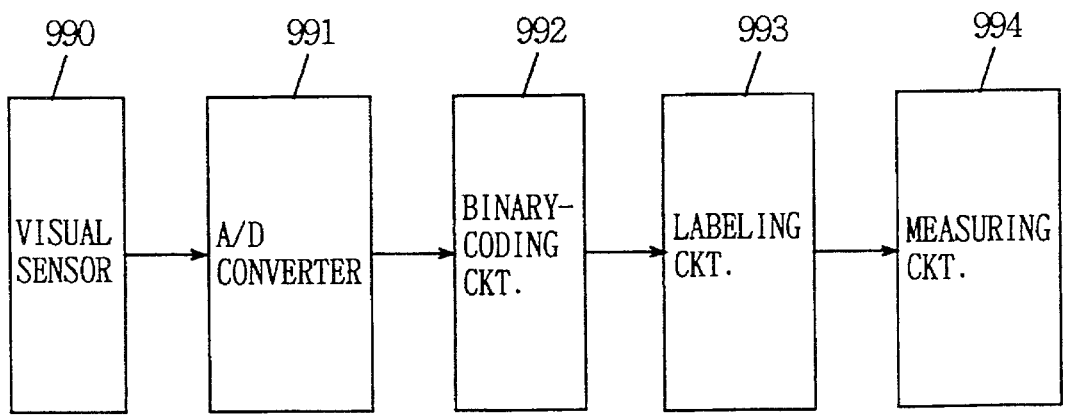
FIG. 74 PRIOR ART
(a)
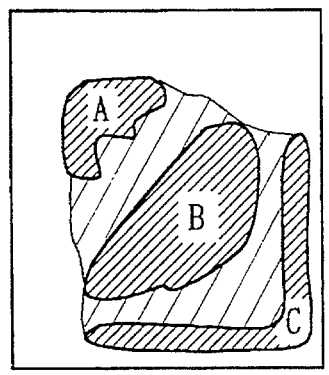
(b)
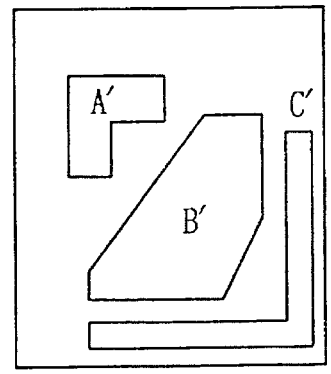
(c)

| ADDRESS | 0 | 1 | 2 | 3 | 4 |
|---|---|---|---|---|---|
| DATA | 0 | 1 | 2 | 3 | 4 |

| ADDRESS | 0 | 1 | 2 | 3 | 4 |
|---|---|---|---|---|---|
| DATA | 0 | 1 | 1 | 3 | 4 |

| ADDRESS | 0 | 1 | 2 | 3 | 4 |
|---|---|---|---|---|---|
| DATA | 0 | 1 | 1 | 3 | 1 |

| ADDRESS | 0 | 1 | 2 | 3 | 4 |
|---|---|---|---|---|---|
| DATA | 0 | 1 | 1 | 3 | 3 |

METHOD OF LABELING IMAGE DATA AND DEVICE FOR THE SAME USING TEMPORARY LABELS HAVING A CONCENTRATION RELATIONSHIP

This application is a continuation of application Ser. No. 08/225,266 filed Apr. 8, 1994, now abandoned.

BACKGROUND OF THE INVENTION

1. Field of the Invention

The present invention relates to a method of and a device for labeling each pixel in an image. In particular, the invention relates to a labeling method and a labeling circuit, in which a temporary label is added or assigned to each pixel by scanning a local image region in an image, a concatenation relationship between the temporary labels is stored, and a final label is added to each pixel based on the concatenation relationship. More particularly, the invention relates to a labeling method and a labeling device in which raster scan of a local image region in a binary image is carried out, a provisional label is added to a run detected on a lower row in the local image region, and a temporary label for each pixel in this run is determined when the run is detected again on an upper row in the local image region thereafter. The invention also relates to a labeling method and a labeling device for processing an image bearing a temporary label, in which a common label is successively added to the concatenated regions according to a concatenation state of temporary labels.

2. Description of the Related Art

As one of image processing systems, there is a measuring system using a vision recognition system, in which shapes or forms of recognition objects, i.e., objects to be recognized, are distinguished from each other, and processing such as measurement of areas of the distinguished objects and/or calculation of a number of recognition objects contained in a screen is performed.

FIG. 73 shows an example of a structure of a conventional measuring system using a vision recognition system. In FIG. 73, the measuring system includes a visual sensor 990 formed of, e.g., an ITV (industrial television) camera for producing image information from a recognition object, an A/D converter 991 for converting analog image signals sent from the visual sensor 990 into digital image signals, a binary-encoding circuit 992 for effecting threshold processing on the digital image signals sent from the A/D converter 991 with a predetermined threshold value to produce binary image data, and a labeling circuit 993 for labeling each pixel in the binary image sent from the binary-encoding circuit 992.

The labeling circuit 993 detects concatenated regions in an image data series applied thereto, and adds peculiar labels to the concatenated regions for identifying objects in the image. A measuring circuit 994 identifies the objects in the image in accordance with the image labeled by the labeling circuit 993, and carries out the processing such as measurement of the areas or calculation of the number thereof. Operations of the visual sensor 990 and labeling circuit 993 will be briefly described below with reference to FIG. 74.

The visual sensor 990 supplies an analog image signal produced by scanning the screen in the raster scan manner. The analog image signal supplied from the visual sensor 990 is converted by the A/D converter 991 into the digital image signal as shown at (a) in FIG. 74. At (a) in FIG. 74, there are shown regions A, B and C of relatively large values of image data.

The binary-encoding circuit 992 effects the threshold processing on the output of the A/D converter 991 to produce regions A', B' and C' of logic "1" corresponding to the regions A, B and C at (a) in FIG. 74, respectively, as shown at (b) in FIG. 74.

Remaining image regions are set to logic "0". The labeling circuit 993 distinguishes the concatenation regions A', B' and C' in the binary images shown at (b) in FIG. 74, and adds peculiar labels to respective concatenation regions. In an example shown at (c) in FIG. 74, the regions A', B' and C' bear labels 1, 2 and 3, respectively.

Different labels mean different regions including different objects, i.e., non-concatenated regions in the image. The measuring circuit 994 extracts the regions of the same labels in accordance with the labels, and carries out the processing such as calculation of the area and/or number of the object.

FIG. 75 schematically shows labeling steps by the labeling circuit. As shown at (a) in FIG. 75, a binary mask 24 extracts local image regions from an input binary image. Labeling is effected on a unit, of each local image region thus extracted. The binary mask 24 utilized in this example cuts out the local image region consisting of pixels arranged in two rows of three columns. In FIG. 76, the binary mask 24 scans binary image data $P(i-1, j+1)$, $P(i-1, j)$ and $P(i-1, j-1)$ corresponding to three pixel positions $(i-1, j+1)$, $(i-1, j)$ and $(i-1, j-1)$ with an upper row 24b. A lower row 24a of the binary mask 24 extracts image data $P(i, j+1)$, $P(i, j)$ and $P(i, j-1)$ corresponding to three pixel positions $(i, j+1)$, $(i, j)$ and $(i, j-1)$ adjacent to the pixels extracted by the upper row 24b of the binary mask. The binary mask 24 scans the binary image in a raster scan manner.

The local image regions in the binary image which are extracted from the input binary image by the binary mask 24 are processed to extract pixel regions (runs) each including concatenated pixels, and the labels of the reference pixels are determined using adjacent pixel data in the binary mask and adjacent pixel labels which have been processed. As a result, as shown at (b) in FIG. 75, a temporary label image, in which each pixel bears a temporary label, is produced. The process has been conducted by extracting the local image regions with the binary mask, so that different labels may be assigned to the same concatenated components. Therefore, if there exist confluent points of labels, which are indicated by circles at (b) in FIG. 75, relationship representing the fact that the concatenated components adjacent to the confluent points have concatenated labels is stored in a label correlation table shown at (c) in FIG. 75. At (c) in FIG. 75, there is shown a state in which such a relationship is stored that the labels 2 and 3 are connected and form the same concatenated component, labels 3 and 4 are elements forming the same concatenated component, and labels 5 and 6 are elements forming the same concatenated component.

After scanning all the binary image and labeling each pixel, each label of the temporary label image is converted into the final label to produce a final label image in accordance with the label connection relationship stored in the label correlation table (see (d) in FIG. 75). The process in which the label correlation table is analyzed to produce the final label image from the temporary label image is generally called a unification process.

For the above process, the labeling circuit is formed of a hardware so as to perform the labeling of each pixel in real time as far as possible.

FIG. 77 shows a structure of a conventional labeling circuit for labeling the binary image. The structure of the labeling circuit shown in FIG. 77 is disclosed, for example, in Japanese Patent Laying-Open No. 2-48778 (1990).

Referring to FIG. 77, the labeling circuit includes a mask forming portion 1 which receives a binary image data I1 and produces a binary image data corresponding to pixels in two rows and three columns shown in FIG. 76. The mask forming portion 1 includes three shift registers 11a, 11b and 11c arranged in tandem for receiving the input binary image data I1, a 1-bit line buffer 10 receiving the input binary image data I1, and three shift registers 11d, 11e and 11f arranged in tandem for receiving the output of line buffer 10. The 1-bit line buffer 10 delays the input binary image data I1 by an amount corresponding to one row (i.e., one scan line in the raster scan). Each of the shift registers 11a–11f delays the received binary image data by an amount corresponding to one pixel (i.e., one clock cycle period). The input binary image data I1 has already been processed into the binary form, and thus the value thereof is "0" or "1".

The mask forming portion 1 supplies the binary image data (which will be referred to as a "binary mask" hereafter) of the local image region shown in FIG. 76. For sake of description, following definition is given in connection with several terms.

(i) Reference Pixel: A central pixel on the lower row 24a in the binary mask 24. That is; the pixel at a position (i, j) on the screen in FIG. 76.

(ii) Reference Run R1: A run to which the reference pixel belongs.

(iii) Adjacent Run R2: A run adjacent to the reference run at (i−1)th row in the case where the reference pixel exists at an i-th row.

(iv) The upper row 24b in the binary mask 24 scans the reference run R2, and the lower row 24a scans the reference run R1. The binary mask 24 scans the binary image in accordance with the raster scan manner.

(v) Run Label: One label which is representative of labels added to the adjacent runs, and forms a provisional label of the reference run.

(vi) Concatenated Label: The newest label among labels in the adjacent runs existing before a −th column (in the raster scan) in the case where a plurality of adjacent runs exist.

The labeling circuit further includes a run label storage controller 6 which is responsive to the binary mask 24 from the mask forming portion 1 to detect a trailing end of the reference run R1, a run label storage 5 which stores the run label in response to a write signal generated upon detection of the trailing end of the reference run, a concatenated label storage 7 which detects a leading end of the adjacent run R2 and stores the current run label, and a temporary label determining portion 2 which is responsive to the binary mask 24, the stored contents of run label storage 5 and the stored contents of concatenated label storage 7 to determine the label of each pixel forming the adjacent run and assign the temporary label to each pixel.

The run label storage 5 has a memory structure of an FIFO (first-in first-out) type, and allows sequential read of the stored contents therefrom in the order of storage thereof. The run label storage 5 achieves following functions under control by the run label storage controller 6. The run label storage 5 is responsive to the binary mask 24 applied from the mask forming portion 1 to search the adjacent run R2 for storing one representative run label among run labels assigned to the adjacent run R2.

The concatenated label storage 7 resets its contents to 0 when both the adjacent run R2 and reference run R1 are interrupted in the binary mask 24 (i.e., in the case of P(i−1, j+1)=0, and P(i, j+1)=0).

The temporary label determining portion 2 includes a run label read controller 12 which is responsive to the binary mask 24 to detect the leading end of adjacent run R2 and applies a read instruction signal (read signal) to the run label storage 5 upon detection of the leading end, a temporary label selection controller 13 which inspects properness of the run label in response to the binary mask 24, run label supplied from the run label storage 5 and concatenated label supplied from the concatenated label storage 7, and produces a control signal for determining the temporary label of each pixel in the adjacent run in accordance with the result of inspection, and a new label counter 18 which produces and holds labels to be used when a new object appears.

The binary mask 24 further includes a temporary label selector 14 which is responsive to the control signal sent from the temporary label selection controller 13 to select one of the run label supplied from the run label storage 5, the concatenated label sent from the concatenated label storage 7 and the new label sent from the new label counter 18 as well as a temporary label register 15 which holds the output of temporary label selector 14.

The temporary label selection controller 13 increments by one the count of new label counter 18 when the count held thereby is selected as the temporary label by the temporary label selector 14. The contents of the temporary label register 15 are reset to "0" when the run label storage controller 6 detects the leading end of reference run R1 and detects the state where all the binary image data P(i−1, j−1), P(i−1, j) and P(i−1, j+1) on the upper row 24b of binary mask 24 are "0". The contents held in the temporary label register 15 are applied to the run label storage 5. The temporary label selector 14 applies the temporary label to the concatenated label storage 7. Thus, the concatenated label storage 7 is responsive to detection of the leading end of adjacent run R2 to latch as the concatenated label the label supplied from the temporary label selector 14.

The temporary label selection controller 13 feeds a select signal to the temporary label selector 14 upon detection of the leading end of adjacent run R2. This select signal is used for determining the temporary label for each pixel forming the adjacent run R2 in accordance with the concatenated label supplied from the concatenated label storage 7 and the run label applied from the run label storage 5. The temporary label selection controller 13 generates the select signal in accordance with the following temporary label determining logics.

(i) In the case of run label=0 and concatenated label=0: The contents of new label counter 18 are selected as the temporary label, and the count of new label counter 18 is incremented.

(ii) In the case of run label=0 and concatenated label≠0: The concatenated label applied from the concatenated label storage 7 is selected as the temporary label.

(iii) In the case of run label≠0 and concatenated label=0: The run label applied from the run label storage 5 is selected as the temporary label.

(iv) In the case of run label≠0, concatenated label≠0 and run label=concatenated label: Either the run label or concatenated label (e.g., run label) is selected as the temporary label.

(v) In the case of run label≠0, concatenated label≠0 and run label≠concatenated label: Either the run label or concatenated label (e.g., concatenated label) is selected as the temporary label. In this case, both the concatenated label and run label are assigned to the same object, so that the concatenated label and run label are sent to an integration processing portion 4 via the integrated label feeding portion 3. The integration processing portion 4 produces a label correlation table in accordance with the concatenated label and run label.

The temporary label determining portion 2 further includes a temporary label feeding portion 16 and a temporary label feed controller 17. The temporary label feed controller 17 is responsive to the binary mask 24 to generate a select signal for selecting either the fixed value of "0" or the output of temporary label register 15 in accordance with the value of the adjacent reference pixel data P(i−1, j). The temporary label feeding portion 16 is responsive to the select signal sent from the temporary label feed controller 17 to select and feed either the fixed value "0" or the temporary label supplied from the temporary label register 15. The temporary label feed controller 17 controls the selecting operation of the temporary label feeding portion 16 in such a manner that the temporary label feeding portion 16 selects the temporary label supplied from the temporary label register 15 if the adjacent reference pixel data P(i−1, j) is 1 and selects the fixed value "0" if the adjacent reference pixel data P(i−1, j) is 0.

An operation of the labeling circuit shown in FIG. 77 will be described below with reference to FIGS. 78A–82C showing the steps in the labeling process and states of main components.

The reference run R1 is scanned with the lower row 24a of the binary mask 24 shown in FIG. 76, and the adjacent run R2 is scanned by the upper row 24b of the binary mask 24. It is assumed that the binary image data shown in FIG. 78A is to be processed. In FIG. 78A, "*" indicates portions of values are "1", and blank portions represents regions containing binary image data of which values are "0". "R11" and "R42" are names of runs which are used for sake of illustration.

The binary image to be processed has a size of N pixels in the horizontal direction (coordinate: j=1 to N−1) and M pixels in the vertical direction (coordinate: i=0 to M−1). Objects to be labeled are represented by "1" (portions bearing "*" shown in FIG. 78A) out of the binary values. Other portions are represented by the value of "0" (blank regions in FIG. 78A). Labels added to the runs start at the number of 1.

In the initial state shown in FIG. 78A, a following initial setting is conducted. The 1-bit line buffer 10 includes shift register stages for storing pixel data (binary image data) of one row, and the content of each register is set to 0. The count of new label counter 18 is initially set to 1. The stored contents of concatenated label storage 7 are set to 0, and the stored contents of temporary label register 15 are also set to 0. The run label storage 5 has cleared its stored contents and has not stored any label.

When the binary image data P(i, j+1) is supplied to the mask forming portion 1, the shift registers 11a–11f receive the binary image data P(i, j+1), P(i, j), P(i, j−1), P(i−1, j+1), P(i−1, j) and P(i−1, j−1), respectively, and will supply the received binary image data at the next clock cycle. Thereby, the binary mask 24 of two rows and three columns is produced.

As shown in FIG. 78, when the binary mask 24 scans the leading end of first reference run R11, the run label storage controller 6 confirms that all the binary image data on the upper row of binary mask 24 are 0, and resets the held value of the temporary label register 15 to 0. The binary image data P(0, 4) of the adjacent reference pixel (0, 4) is 0, so that the temporary label feeding portion 16 selects 0 and feeds the same therefrom.

As shown in FIG. 78C, when the binary mask 24 reaches the trailing end of reference run R11, the run label storage 5 stores the output of temporary label register 15. Since the adjacent run was not present on the 0th row, the held value of temporary label register 15 is kept at 0, i.e., the reset state, so that the run label storage 5 stores 0.

Even in the case where the binary mask 24 further shifts to scan the reference runs R12 and R13, the adjacent run is not present, so that an operation similar to that already executed for the reference run R11 is performed. Thus, when the lower row of binary mask 24 completes the scanning of the first row, the run label storage 5 stores three 0's as run labels of runs R11, R12 and R13. At this time, the count of new label counter 18 is 1, the held value of temporary label register 15 is 0, and the held value of concatenated label storage 7 is 0.

As shown in FIG. 79A, when the binary mask 24 scans the new rows (first and second rows) and detects the leading end of the first reference run R21, an operation is carried out similarly to the operation for the former row, so that the temporary label register 15 is reset.

As shown in FIG. 79B, in the course of rightward shift of the binary mask 24, the leading end of reference run R11 is detected. In response to detection of the leading end of reference run R11, the run label 0 added to the run R11 which has been stored in the run label storage 5 is read therefrom under the control of the run label storage controller 6.

At this time, since both the run label and concatenated label are 0, the temporary label selection controller 13 generates the control signal for selecting the count of 1, which is the output of new label counter 18, in accordance with the first condition. The temporary label selector 14 selects and outputs the count 1 of new label counter 18. At this time, the count of new label counter 18 is incremented by one under the control of the temporary label selection controller 13. The label 1 sent from the temporary label selector 14 is latched by the concatenated label storage 7 and temporary label register 15. Thereby, the temporary label for the adjacent run R11 is determined as 1.

As shown in FIG. 79C, when the binary mask 24 is further shifted rightward by one pixel, the binary image data P(1, 4) of the adjacent reference pixel (1, 4) goes to 1, so that the temporary label feeding portion 16 selects the label value 1, which is the output of temporary label register 15, and feeds the same therefrom. Hereafter, the temporary label feeding portion 16 selects and feeds therefrom the label value 1 as long as the binary image data of the pixel (adjacent reference pixel) of the central position on the upper row 24b of the binary mask 24 is 1.

As shown in FIG. 80A, when the reference pixel in the binary mask 24 reaches the pixel (2, 6), the pixels at the right ends of both the upper and lower rows in the binary mask 24 are data 0, so that the concatenated label storage 7 is reset.

As shown in FIG. 80B, when the binary mask 24 is further shifted rightward by one pixel, the trailing end of reference run R21 is detected. The run label storage 5 responds to detection of the trailing end of reference run R21 and stores the label value 1 supplied from the temporary label register 15. At this time, the run label storage 5 has stored two run labels of 0 for the runs R12 and R13 as well as the run label 1 for the run R21.

As shown in FIG. 80C, when the binary mask 24 reaches the leading ends of the reference run R22 and adjacent run R12, the label value 0 for the run R12 is first read from the run label storage 5. Since both the run label and concatenated label are 0, the temporary label selector 14 selects as the temporary label the count of 2 of the new label counter 18 in accordance with the first condition (i) for temporary label selection. The count of new label counter 18 is counted up to 3. The label 2 selected by the temporary label selector 14 is latched by the temporary label register 15 and concatenated label storage 7.

While the data of adjacent reference pixel in the binary mask 24 is 1, the temporary label feeding portion 16 selects as its output the label 2 sent from the temporary label register 15.

As shown in FIG. 81A, when the binary mask 24 reaches the trailing end of reference run R22, the run label storage 5 stores the temporary label value 2 supplied from the temporary label register 15. At this time, run label storage 5 stores the label value 0 for run R13, label value 1 for run R21 and label value 2 for run R22. Since both the pixels at the right ends of upper and lower rows in binary mask 24 are 0, the concatenated label storage 7 is reset, and the contents thereof go to 0.

Then, the binary mask 24 scans the reference run R23. The operation relating to this scan is the same as those carried out for the reference runs R11, R12 and R13. Thus, at the leading end of reference run R23, the temporary label register 15 and concatenated label storage 7 latch the data 0. As shown in FIG. 81B, when the binary mask 24 reaches the trailing end of reference run R23, the run label storage 5 stores the output data 0 of temporary label register 15. At this time, the run label storage 5 stores data of the run label 0 for the run R13, run label 1 for the run R21, run label 2 for the run R22 and run label 0 for the run R23. The concatenated label storage 7 has been reset to 0 since both the data values at the right ends of binary mask 24 went to 0.

When the binary mask 24 further shifts to detect the adjacent run R13, the run label 0 is read from the run label storage 5 similarly to the operation for the adjacent run R12. In accordance with the first condition (i) for temporary label selection, the temporary label selector 14 selects as the temporary label the count 3 which is the output of new label counter 18. The temporary label register 15 and concatenated label storage 7 latches this temporary label 3. The count of new label counter 18 is counted up by one to 4. The temporary label feeding portion 16 selects and outputs the temporary label 3 stored in the temporary label register 15. At the trailing end of reference run R24, the label value 3 supplied from the temporary label register 15 is stored as the run label in the run label storage 5.

When the binary mask 24 starts scanning of the next rows, i.e., second and third rows, the adjacent run R21 is first detected. In response to this, the run label 1 is read from the run label storage 5. The temporary label selector 14 selects the run label 1 sent from the run label storage 5 in accordance with the third condition (iii) for temporary label selection, and the temporary label register 15 and concatenated label storage 7 latch the value of 1. While the data of the adjacent reference pixel in binary mask 24 is 1, the temporary label feeding portion 16 selects and outputs the label value 1 as the temporary label.

Thereafter, the binary mask 24 detects the reference run R31. However, the reference run R31 is concatenated to the adjacent run R21, and the trailing end of adjacent run R21 is not yet detected. Therefore, the temporary label register 15, run label storage 5 and concatenated label storage 7 do not change its contents.

As shown in FIG. 81C, when the binary mask 24 reaches the leading end of adjacent run R22, the run label 2 for the adjacent run R22 is read from the run label storage 5. At this time, the reference run R31 exists, the output of concatenated label storage 7 is the label value 1, and thus the reference run and adjacent run which are concatenated together have different labels. In this case, the temporary label selector 14 selects a smaller label value (i.e., label value 1) in accordance with the fifth condition (v) for temporary label selection, and the temporary label register 15 and concatenated label storage 7 latch this label value 1. Since different labels are assigned to the same object, the integrated label feeding portion 3 supplies the label values 1 and 2 to the integration processing portion 4 under the control of the temporary label selection controller 13. The integration processing portion 4 stores the fact that the labels 1 and 2 are concatenated together.

While the binary mask 24 is scanning the adjacent run R22, the temporary label feeding portion 16 selects and outputs the label value 1 applied from the temporary label register 15 when the data of adjacent reference pixel is 1.

As shown in FIG. 82A, when the binary image data of reference pixel goes to P(3, 10), the pixels at the right ends of upper and lower rows in the binary mask 24 are 0, so that the concatenated label storage 7 is reset to 0. At the trailing end of reference run R31, the temporary label register 15 stores as the run label the label value supplied from the temporary label register 15.

As shown in FIG. 82B, when the binary mask 24 reaches the leading end of adjacent run R23, the run label 0 is read from the run label storage 5. Since the concatenated label storage 7 outputs the concatenated label of 0, data 4, i.e., output of the new label counter 18 is latched by the temporary label register 15 and run label storage 5 in accordance with the first condition (i) for temporary label selection. The count of new label counter 18 goes to 5.

For the adjacent run R23, the temporary label feeding portion 16 selects and outputs the label value 4 sent from the temporary label register 15. When reference runs R32 and R33 are scanned during scanning of the adjacent run R23, the label values 4, which are supplied from the temporary label register 15 at the respective trailing ends, are stored in the run label storage 5 as the run labels for the reference runs R32 and R33.

When the binary mask 24 scans adjacent runs R24 and R34, operations are carried out in the same manner as those for the adjacent run R13. When the scanning of the second and third rows is completed, the run label storage 5 has stored the run label 1 for run R31, run labels 4 for runs R32 and R33, and run label 3 for run R34.

While the binary mask 24 scans the adjacent runs R31 and R41 after starting the scanning of the next rows (third and fourth rows), the operation is carried out in the same manner as that which was carried out for the adjacent runs R21 (first run on the second row) and reference run R31 during the scanning of the row preceding the current row by one row.

As shown in FIG. 82C, when the binary mask 24 reaches the leading end of adjacent run R32, the run label 4 for the adjacent run R32 is read from the run label storage 5. At this time, the output of concatenated label storage 7 is 1. Therefore, there is established a relationship similar to that between the adjacent run R22 and reference run R31 (see FIG. 82A), so that different labels are assigned to the same object. At this time, the label of a smaller value (i.e., 1) is latched by the temporary label register 15 and concatenated label storage 7 in accordance with the fifth condition (v) for temporary label selection, and the integration processing portion 4 stores the fact that the labels 1 and 4 are concatenated together. For the adjacent run R32, the temporary label feeding portion 16 selects and outputs the label value 1 which is the output of temporary label register 15.

At the trailing end of R41, the run label storage 5 stores the run label 1. At this time, both the pixels at the right ends of upper and lower rows in binary mask 24 are 0, and the run is interrupted at these positions, so that the concatenated label storage 7 is reset to 0.

As shown in FIG. 83A, when the binary mask 24 reaches the leading end of adjacent run R33, the run label 4 for adjacent run R33 is read from the run label storage 5. Since the output of concatenated label storage 7 is 0, the temporary label selector 14 selects the run label 4 from the run label storage 5 in accordance with the third condition (iii) for temporary label selection, and the temporary label register 15 and concatenated label storage 7 latch the same. For the adjacent run R33, the temporary label feeding portion 16 outputs the label value 4 as the temporary label.

As shown in FIG. 83B, when the binary mask 24 reaches the leading end of adjacent run R34, the run label 3 for the adjacent run R34 is read from the run label storage 5. The output of concatenated label storage 7 is 4, and hence different labels are assigned to the same object. In this case, the concatenated label of a smaller label value (i.e., label value 3) between them is latched by the temporary label register 15 and concatenated label storage 7 in accordance with the fifth condition (v) for temporary label selection. Meanwhile, the integration processing portion 4 stores the fact that the labels 3 and 4 are concatenated together. For the adjacent run R34, the temporary label feeding portion 16 selects and outputs the label value 3, i.e., output of temporary label register 15. At the trailing end of reference run R42, the run label storage 5 stores the label value 3 which is the output of temporary label register 15.

When the binary mask 24 starts scanning of the next rows (fourth and fifth rows), adjacent runs, i.e., runs R41 and R42 are scanned. At the leading ends of adjacent runs R41 and R42, corresponding run labels 1 and 3 are read from the run label storage 5, respectively. The label value outputted from the concatenated label storage 7 is 0 at the time of detection of the run leading end, so that the run label supplied from the run label storage 5 is selected in accordance with the third condition (iii) for temporary label selection. For each of pixels belonging to the adjacent runs R41 and R42, the temporary label feeding portion 16 selects the outputs of temporary label register 15 and outputs, as the temporary labels, the run labels 1 and 3 of adjacent runs R41 and R42, respectively.

When all the scanning is completed, a temporary label image in which the temporary label is assigned to each pixel in the runs of binary image is obtained as shown in FIG. 83C. This temporary label image is stored in a temporary label memory (not shown), and in other words, the temporary label value corresponding to each pixel is stored in the temporary label memory.

The integration processing portion 4 has stored the fact of concatenation between the labels 1 and 2, between labels of 4 and 1, and between labels of 4 and 3. The integration processing portion 4, which analyzes the concatenation relationship among these labels, detects the fact that labels 2, 3 and 4 are diverged with the label 1 as a starting point, and rewrites these labels 2, 3 and 4 into the label 1. Thereby, a label image in which the same object bears a common label as shown in FIG. 84 is produced.

It is necessary to analyze the concatenation relationship between the temporary labels in order to obtain the label image shown in FIG. 84 by performing the integrating process for labels of the temporary label image shown in FIG. 83C. The analysis of the concatenation relationship between temporary labels is complicated, and is generally conducted with a software, so that the analysis requires a long time. It has been attempted to devise preparation of the concatenation table storing the concatenation relationship among labels for reducing a process time required for the analysis. As a method of preparing such a concatenation table (i.e., table storing a concatenation relationship among labels) is disclosed by Okuyama et al in "A High Speed Labeling Algorithm for Raster-Scanned Type", *Japan Institute of Electronics Information Communication Engineers Transactions*, Vol. J73-D-II, No. 1, January 1990, pp 36–45. This prior art method of preparing the concatenation table will be described below with reference to FIGS. 85A to 85D.

In an initial labeling state, as shown in FIG. 85A, the concatenation table contains data which are equal to values of addresses at which the data are stored. When it is found that different labels are added to one object (fifth condition (v) for temporary label selection), the different two labels are supplied to the integration processing portion 4 (the states shown in FIGS. 81C, 82C and 83B).

The integration processing portion 4 writes the label selected in accordance with the fifth condition for temporary label selection (i.e., label supplied to and latched by the temporary label register 15 and concatenated label storage 7) into the concatenation table using the other, i.e., unselected label as an address. More specifically, in the state shown in FIG. 81C, the concatenated label is 1 and the run label is 2, in which case the concatenated label is selected as the temporary label, so that the concatenated label 1 is written into the concatenation table using the run label 2 as an address, as shown in FIG. 85B.

Likewise, in the state shown in FIG. 82C, the concatenated label 1 is written as the write data into the concatenation table using the run label 4 as the address as shown in FIG. 85C. As shown in FIG. 85D, the run label 3 is selected as the temporary label in the state of FIG. 82B, so that the run label 3 is written as the write data into the concatenation table using the concatenated label 4 as the address.

Relabeling of the temporary label image is carried out using the concatenation table shown in FIG. 85D as a look-up table, so that a label image shown in FIG. 86 is obtained. More specifically, in the concatenation table shown in FIG. 85D, data in the concatenation table shown in FIG. 85D is read using each temporary label of the temporary label image as the address, and the processing is carried out for converting the temporary label in accordance with the data thus read. In this operation, the temporary label 4 is converted into the label 3 as shown in FIG. 85D, while the temporary label 3 maintains the label 3, so that two labels are assigned to the same object. In order to avoid this situation, the label image is scanned again to detect concatenation between pixels. If the concatenated pixels bear different labels, the concatenation table is converted again to carry out relabeling again for finally obtaining the label image shown in FIG. 84.

If the contents of concatenation table are rewritten by accessing several times the same address, so-called "label separation", i.e., assignment of different labels to the same object, occurs. For example, in FIGS. 85A to 85D, the address 4 in concatenation table was accessed two times, so that the contents thereof changed from 4 to 1, and then from 1 to 3. Therefore, the label 3 is separated from the label 1, and information that the run of label 3 is concatenated to the run of label 1 disappears, because the concatenation relationship information relating to the labels 4 and 1 disappears when storing the concatenation relationship between the labels 4 and 3. Thus, according to the manner of preparing the concatenation table in the prior art labeling method, the frequency of assignment of different labels to the same object is high, which results in increase of load in the label integrating process for analyzing the concatenation table and relabeling the temporary labels, and thus results in reduction of the processing performance.

Also in the relabeling process, it is necessary to inspect concatenation between pixels, so that the process is complicated. In other words, it is necessary to detect existence and nonexistence of separated label simultaneously with the relabeling operation, and to perform the relabeling again if the separated label is detected. In this case, it is necessary to access the concatenation table again for carrying out an operation such as rewrite of the contents. Such processing cannot be performed at a high speed. Further, a device of a large scale is required if a hardware is used to perform such complicated processing for detecting existence and nonexistence of the separated label during relabeling and for performing the relabeling based on result of detection. This also results in a disadvantage that the relabeling performance decreases as a whole.

When the concatenation table is analyzed, the label values which were 0, 1 and 3 go to successive values, or are converted into 0, 1 and 2, respectively, as shown in FIG. 85D. In this manner, there is finally prepared the conversion table which is a look-up table representing a relationship between the temporary labels and final labels. Using this conversion table, the temporary label image shown in FIG. 75 is scanned, and, using the conversion table thus prepared, the temporary label values are converted into the final label values to produce the final label image shown in FIG. 75.

In order to prepare the above conversion table, two tables, i.e., concatenation table and conversion table are required, and these tables require a large storage region, resulting in increase of the device scale.

SUMMARY OF THE INVENTION

It is an object of the invention to provide a labeling method and a labeling circuit, which suppress the assignment frequency of different labels to the same object, and thereby can remarkably reduce loads in a label integrating process and a relabeling process.

Another object of the invention is to provide a labeling method and a labeling circuit, which can reduce a load imposed on a software in an integrating process and can perform labeling processing at a high speed.

Still another object of the invention is to provide a labeling method and a labeling device, which can reduce a quantity of a hardware.

According to a first aspect of the invention, a labeling method includes the steps of carrying out search in a row adjacent to a row containing a reference run, to which a reference pixel in a local image region (binary mask) belongs, so as to search an adjacent run adjoining to the reference run, provisionally assigning a run label to the reference run in accordance with a result of the search, and storing the provisionally assigned run label at a trailing end of the reference run; when the local image region extracts the reference run as the adjacent run, referring to the run label provisionally assigned to the reference run, propagating the referred run label to a new reference run for assigning a provisional run label to the new reference run and determining a label for each pixel in the reference run which is detected as the adjacent run; and, if the label propagated to the new reference run is different from a run label of a new adjacent run adjoining to the new reference run, storing at an address, which is equal to one of label values of the different two labels, in a concatenation table the other label value for storing a concatenation relationship between runs in the concatenation table.

In the above method, the step of determining the label for each pixel in the reference run which is detected as the adjacent run includes the steps of referring to the concatenation table using the run label which is referred to upon detection of a leading end of the adjacent run, and determining both of the label of the adjacent run and the label of the reference run concatenated to the adjacent run in accordance with referred contents of the concatenation table and the referred run label.

According to a second aspect of the invention, a labeling circuit includes mask producing means for receiving a binary image data series obtained by raster-scan of a binary image and producing a binary mask formed of a local image region of pixels in two rows and three columns; run label storing means which is responsive to said binary mask generated by the mask producing means to store, as a run label of a reference run, one label representing labels assigned to adjacent runs on an (i−1)th row adjoining to the reference run to which the binary image data P (i, j) belongs; run label storage control means which is responsive to the binary mask supplied from the mask producing means to detect a trailing end of the reference run and is responsive to detection of the trailing end to store the run label assigned to the reference run in the run label storing means; concatenated label storing means which stores, as a concatenated label, the newest label among the labels of the adjacent run(s) existing in the column preceding a j-th column in a raster-scanning order in the case where a plurality of adjacent runs exist; integrated label feeding means for feeding both of two labels when it is detected that the two labels which are different from each other are assigned to the same object region; integration processing means which includes a concatenation table, and writes and holds a label, which is selected and outputted as a temporary label between the two labels sent from the integrated label feeding means, at an address in the concatenation table, the address being an unselected label between the two labels; run label read control means which is responsive to the binary mask to detect a leading end of the adjacent run, and is responsive to the detection of the leading end to read the run label, which was stored when the adjacent run including the detected leading end was the reference run, from said run label storing means, and, using the read run label as an address, to read data from the concatenation table; temporary label determining means for detecting coincidence and noncoincidence between the label value, which is read from the concatenation table by the run label read control means, and the concatenated label value, which is read from the concatenated label storing means, and for determining the run label of the reference run for the adjacent run in accordance with a result of the detection and determining, as a temporary label, the label of each belonging pixel to output the same; and new label counter means of which output is selected as the temporary label and of which contents are changed by a unit value when the temporary label determining means detects a new object.

According to the labeling method of the first aspect of the invention, the local image regions in two rows and three columns are extracted from the binary image data series, and the leading end and trailing end of the run are detected using the local image region as the binary mask. The run label of the reference run is stored at the trailing end of the reference run, and the concatenation table is referred to, when the leading end of the run label is detected again as the adjacent run, using the run label of the reference run, and the label obtained from the concatenation table is compared with concatenated label to determine the run label of the reference run and the temporary label of the adjacent run. Thereby, the frequency of assignment of different labels to the same object decreases, and thus a load in the label integrating process is reduced.

According to the labeling circuit of the second aspect of the invention, the trailing end and leading end of a run are detected using the local image region in two rows and three columns as a mask, and the run label storage stores the run label related to a reference run at the trailing end of the reference run. In the case where different labels are assigned to the same object, the selected label value is written at the address represented by the label value, which is not selected as the temporary label of the adjacent run. The run label is read from the run label storage at the leading end of the adjacent run. Using the run label thus read, the concatenation table is referred to for reading data. The label value read from the concatenation table is compared with the concatenated label in the concatenation relationship storage. In accordance with the result of comparison, the labeling is effected on the reference run and adjacent run. Therefore, the frequency of assignment of different labels to the same object is reduced, and the relabeling in the label integrating process can be carried out only with the concatenation table without requiring the temporary label image.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 2 shows an initial state of contents of a concatenation table utilized in the first embodiment of the invention;

FIGS. 3 to 11 each show forms of a binary image during scanning with a binary mask according to the first embodiment of the invention;

FIG. 12 shows contents of the concatenation table during scanning of the binary mask as shown in FIG. 11;

FIG. 13 shows distribution of labels of respective pixels of the binary image at the time of completion of scanning of second and third rows in the first embodiment;

FIG. 14 shows a form of the binary image during the binary mask scanning according to the first embodiment;

FIG. 15 shows contents of the concatenation table during binary mask scanning as shown in FIG. 14;

FIG. 16 shows a form of the binary image during binary mask scanning according to the first embodiment;

FIG. 17 shows a form of the binary image during binary mask scanning according to the first embodiment;

FIG. 18 shows contents of the concatenation table during binary mask scanning as shown in FIG. 17;

FIG. 19 shows a form of the binary image during binary mask scanning according to the first embodiment;

FIG. 27 shows distribution of labels in another binary image after completion of binary mask scanning;

FIG. 28 shows contents of the concatenation table at the time of completion of binary mask scanning of another binary image;

FIG. 29 shows a form of the binary image which is relabeled using the concatenation table shown in FIG. 28;

FIG. 56 shows a temporary label image used in a sixth embodiment;

FIG. 57 shows a final label image obtained from the temporary label image in FIG. 56;

FIG. 58 shows a state of a concatenation table after assignment of temporary labels used in the sixth embodiment;

FIGS. 60A–60D show operations at successive steps in the labeling method of the sixth embodiment;

FIGS. 61A–61C show successive operations in the labeling method of the sixth embodiment;

FIG. 73 shows a structure of a vision recognition system utilizing a conventional labeling process;

FIG. 74 shows a binary-coding process and a labeling process;

DESCRIPTION OF THE PREFERRED EMBODIMENT

(i) Embodiment 1

Following conditions are used in this first embodiment.

Figure 76:
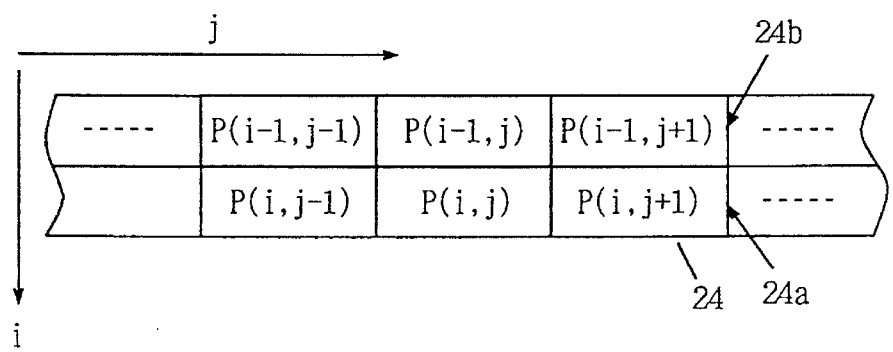
FIG. 76 shows a structure of a binary mask for extracting a local image region used in the labeling process.
Figure 77:
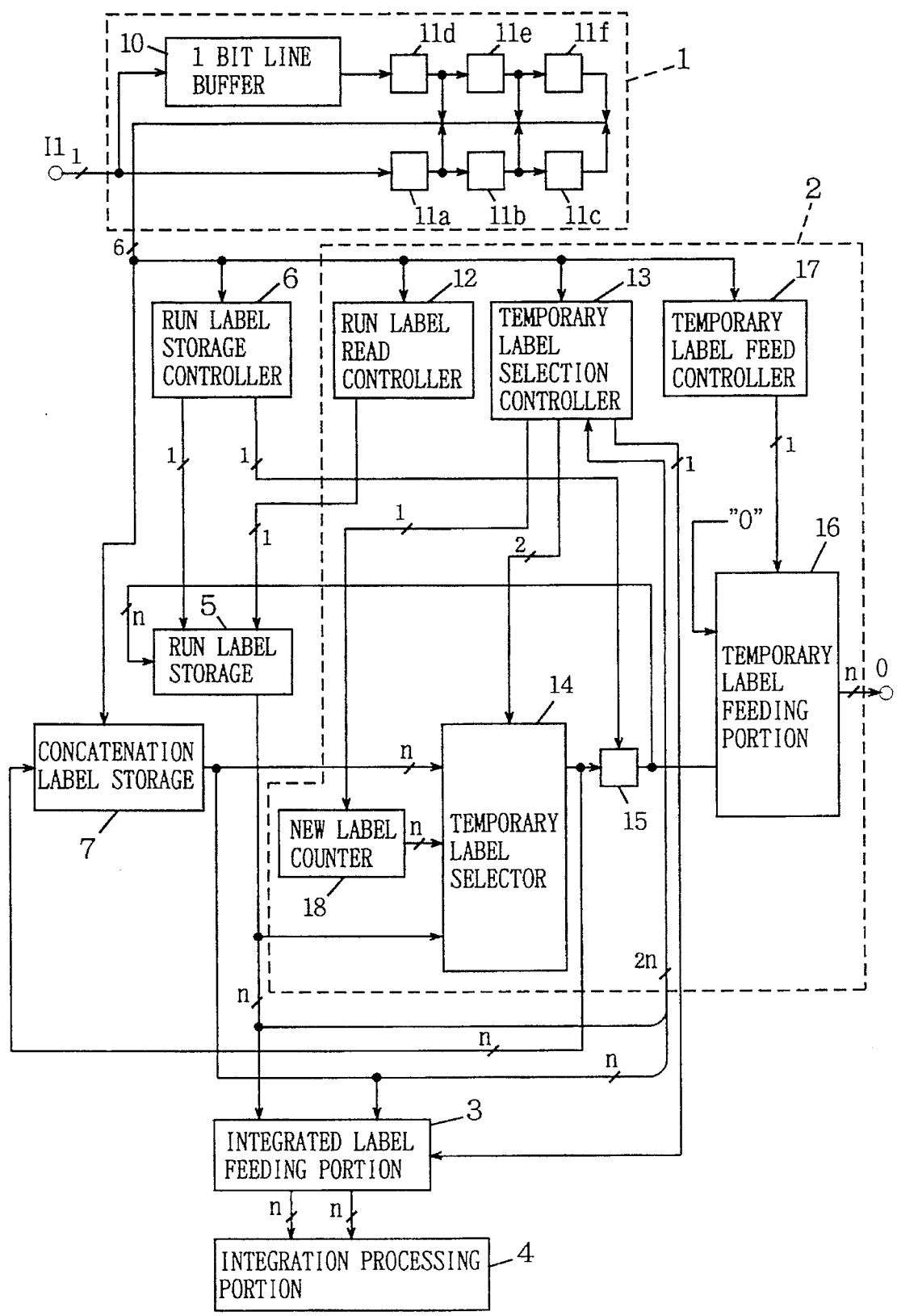
FIG. 77 shows a whole structure of the conventional labeling circuit.

Binary Mask: From binary image data series obtained by raster scan of a binary image, a local image region of pixels in two rows and three columns, shown in FIG. 76 is supplied as a binary mask. An upper row 24b of a binary mask 24 scans an adjacent run, and a lower row 24a of the binary mask 24 scans a reference run.

Concatenated Label: A concatenated label used for discriminating connectivity between pixels is determined by the following conditions:

(a) If a plurality of adjacent runs adjoin to a reference run, the smallest label value among those for these adjacent runs is used as the concatenated label.

(b) If the reference run does not exist, or the run adjacent to the reference run does not exist, the concatenated label is 0.

Concatenation Table: A structure of a concatenation table describing a concatenation relationship between labels is shown in FIG. 2. If it is detected that a plurality of adjacent runs having different labels are the same object through a reference run, the smaller label value is written in the concatenation table using the larger label value as an address. Look-up of a diverging destination can be conducted by referring to the concatenation table. The concatenation table in the initial stage, as shown in FIG. 2, contains addresses and corresponding contents which have the same values. If description in the concatenation table is carried out (i.e., data is written), the concatenated label is formed of a smaller label value between the concatenated label and the label value which is referred to in the concatenation table.

Determination of Temporary Label: When a leading end of the adjacent run is not detected, the temporary label maintains the same state as that for the last pixel. When the leading end of the adjacent run is detected, the temporary label is determined in accordance with the following five conditions for temporary label selection.

(a) First Condition: In the case of concatenation table data=0 and concatenated label=0, a new label value is issued as the temporary label.

(b) Second Condition: In the case of concatenation table data=0 and concatenated label≠0, the concatenated label is used as the temporary label.

(c) Third Condition: In the case of concatenation table data≠0 and concatenated label=0, the concatenation table data is used as the temporary label.

(d) Fourth Condition: In the case of concatenation table data≠0, concatenated label≠0 and concatenation table data=concatenated label, either of them (e.g., concatenation table data) is used as the temporary label.

(e) Fifth Condition: In the case of concatenation table data≠0 and concatenated label≠0 and concatenation table data≠concatenated label, one of them having a smaller value is used as the temporary label.

Figure 1:
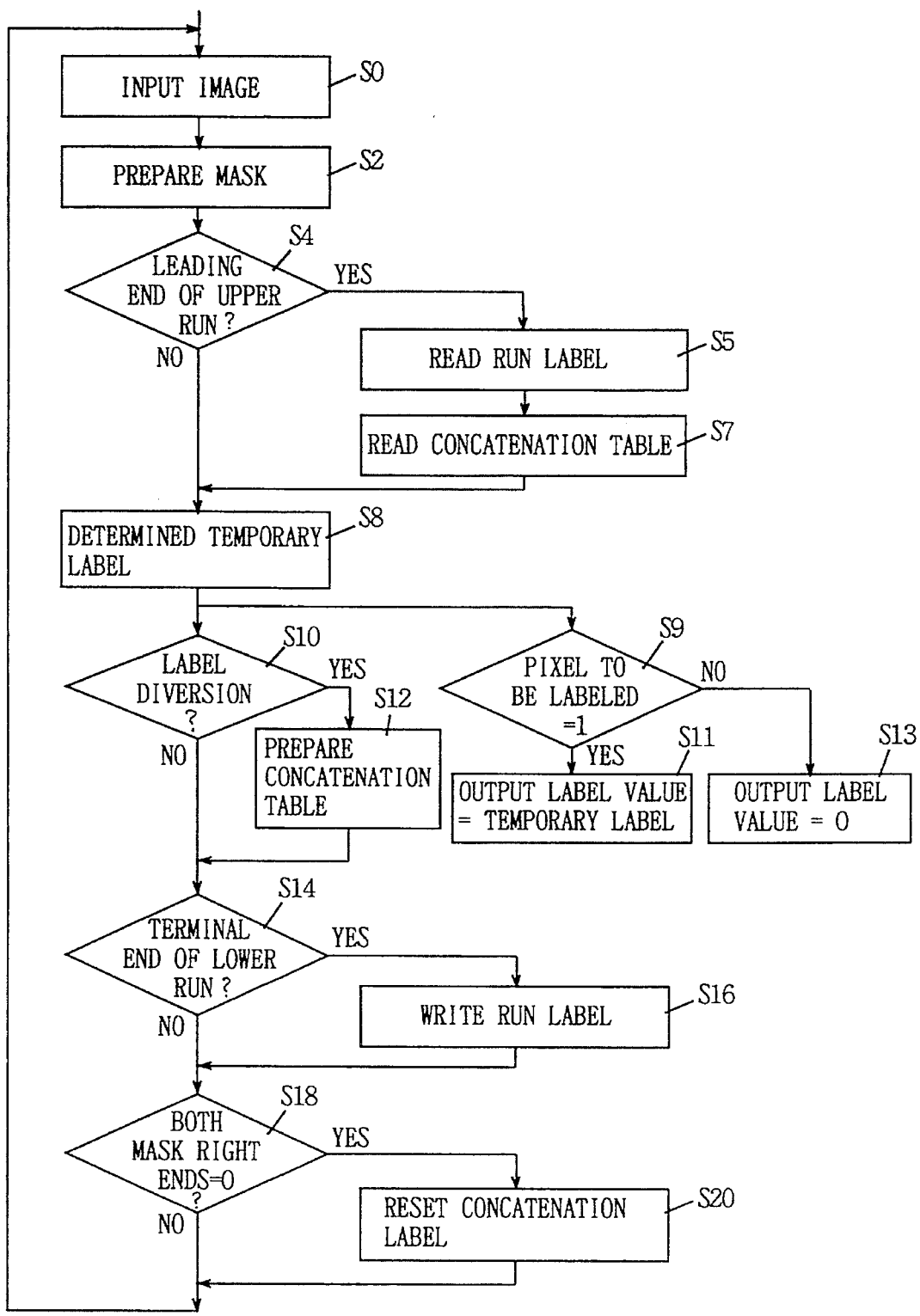
FIG. 1 is a flow diagram showing processing steps in a labeling method according to a first embodiment of the invention.

FIG. 1 is a flow diagram showing processing steps in a labeling method according to the first embodiment of the invention. The labeling steps of the first embodiment will now be described below with reference to FIG. 1.

In response to a clock signal which will be described later, binary image data of one pixel is supplied (step S0). The binary mask in two rows by three columns is formed and outputted in response to the input of this pixel data, i.e., binary image data (step S2).

In the binary mask thus formed, it is determined whether the leading end of a run on the upper row (adjacent run) is contained or not (step S4). If the leading end of the run on the upper row in the binary mask, i.e., adjacent run, is detected, a run label relating to this run on the upper row (adjacent run) is read (step S5). The concatenation table is referred to using the run label thus read, and data is read from the concatenation table (step S7). Thus, using the read run label as the address, corresponding data is read from the concatenation table.

Then, the temporary label is determined (step S8). When the leading end of the run on the upper row (adjacent run) is not detected, the temporary label of the last pixel is maintained. The purpose of this is to cope with such situations that the adjacent runs exist continuously or that no adjacent run exists. Upon detection of the leading end of the run on the upper row (adjacent run), the read run label value is compared with the concatenation table data value, and the temporary label is determined in accordance with the result of comparison. For determining the temporary label, the five conditions for temporary label selection already described are used.

After determination of the temporary label in step S8, it is determined whether data of a pixel to be labeled, i.e., adjacent reference pixel is 1 or not (step S9). If the data of adjacent reference pixel is 1, the determined temporary label is outputted as the output label value, i.e., final temporary label (step S11). If the data of adjacent reference pixel is not 1, i.e., is 0, the fixed data 0 is selected as the output label value (step S13).

In parallel with the operations in steps S9 to S13, it is determined whether diversion or divergence of the label has occurred or not (step S10). Whether the diversion of the label has occurred or not is determined based on whether the fifth condition for temporary label selection was utilized at the step S8 for determining the temporary label (step S10). If the label diversion has occurred, data is written into the concatenation table using the larger unselected label value as the address and using the smaller selected label value as the write data (step S12).

Then, it is determined whether the trailing end of the run on the lower row (reference run) in the binary mask is detected or not (step S14). If the trailing end of the run on the lower row (reference run) is detected, the run label on this lower row is written. Thus, the currently generated temporary label, which was determined at step S8, is stored as the run label for the run on the lower row, i.e., reference run (step S16).

Then, it is determined whether both the data of pixels at the right ends of the upper and lower runs in the binary mask are 0 or not (step S18). The state where both the data of pixels at the upper and lower right ends in the binary mask are 0 means the state where both the adjacent run and reference run are interrupted, so that the concatenated label is reset to 0 (step S20). If one of the data of pixels at the upper and lower right ends in the binary mask is not 0, the reference run or adjacent run exists, so that the process returns to step S0 for starting input of the next pixel data. Further, after resetting the concatenated label at step S20, the process returns to step S0.

These operations are repeated until all the pixels in the binary image are scanned. Then, specific processing operations will be described below.

Figure 78A:
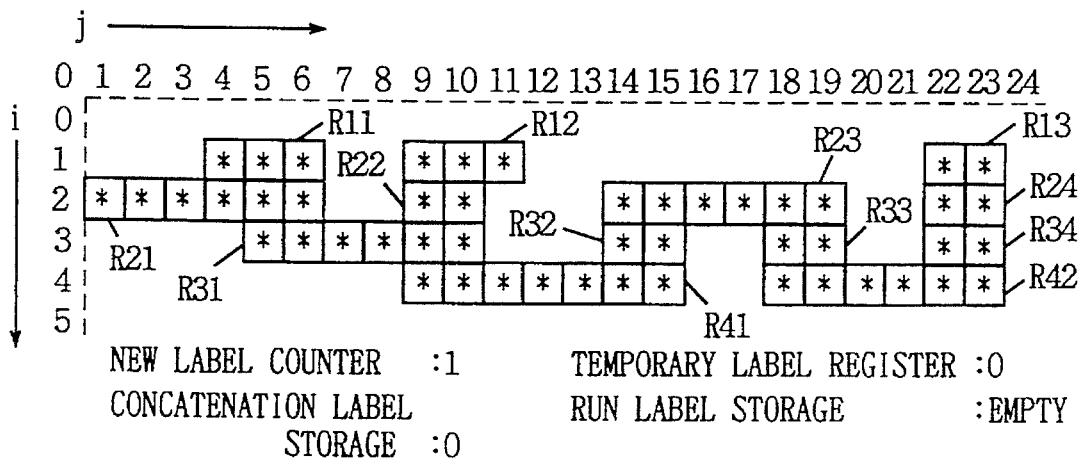
FIGS. 78A–78C show forms of a binary image for showing an operation of a conventional labeling circuit.
Figure 78B:
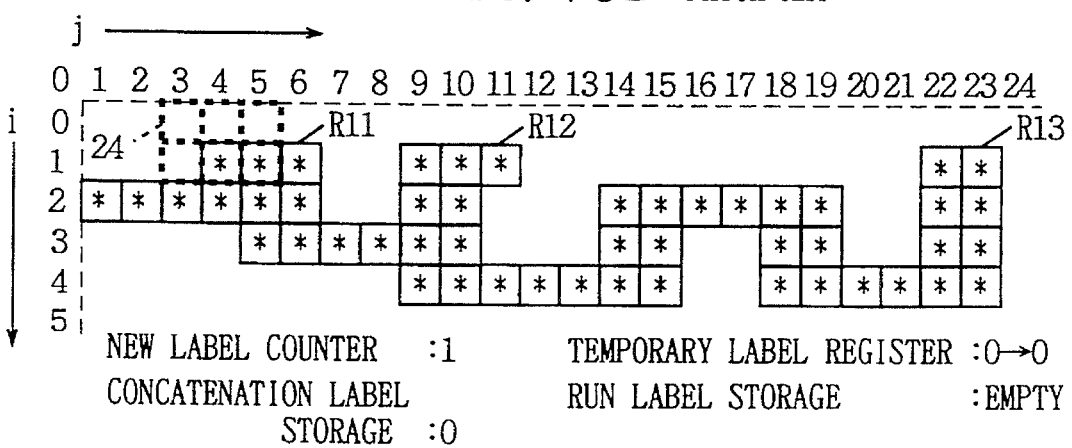
Figure 78C:
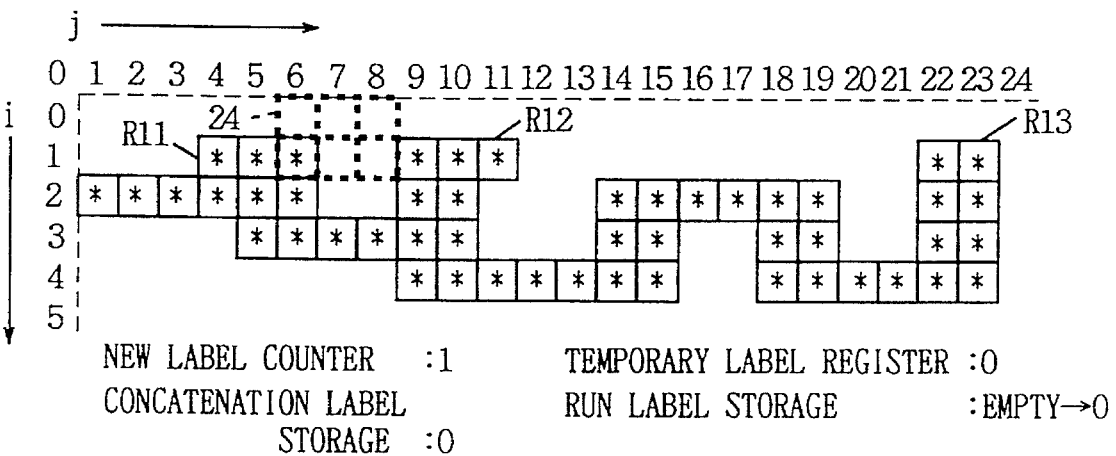
Figure 79A:
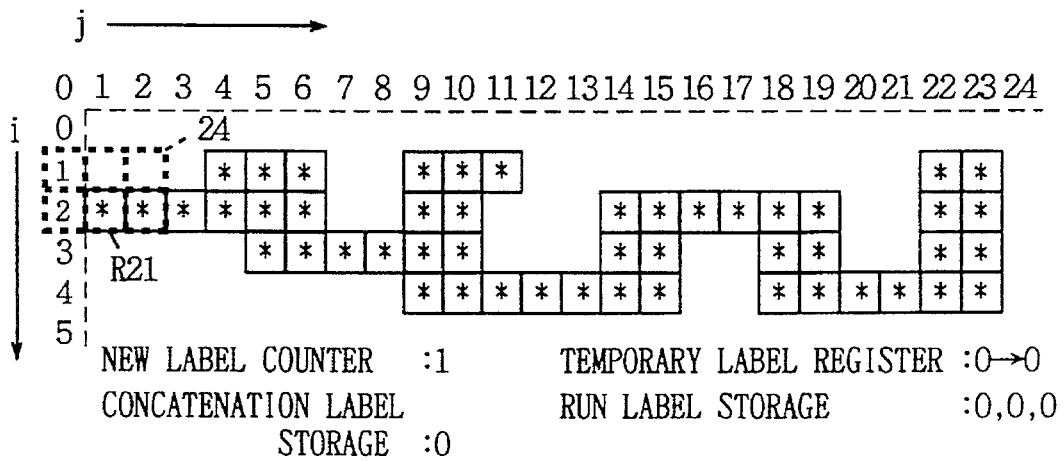
FIGS. 79A–79C show forms of the binary image during an operation of the conventional labeling circuit.
Figure 79B:
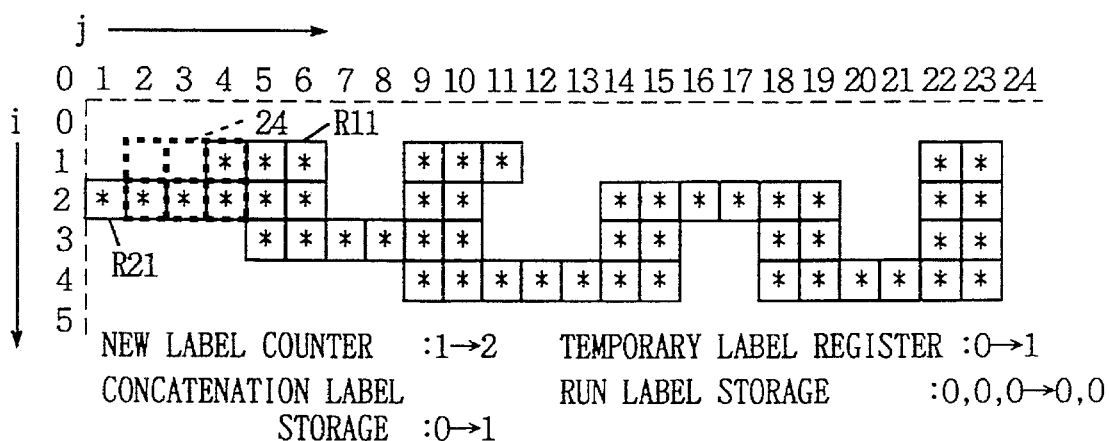
Figure 79C:
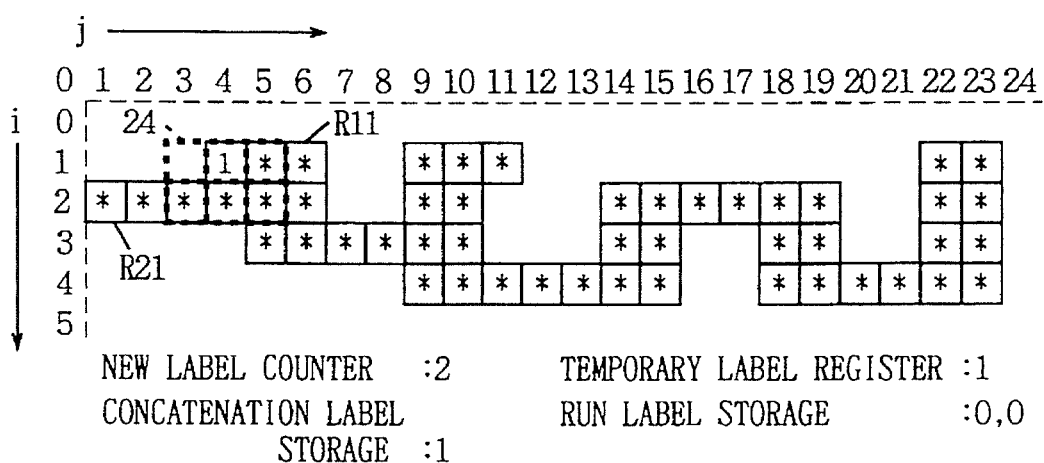
Figure 80A:
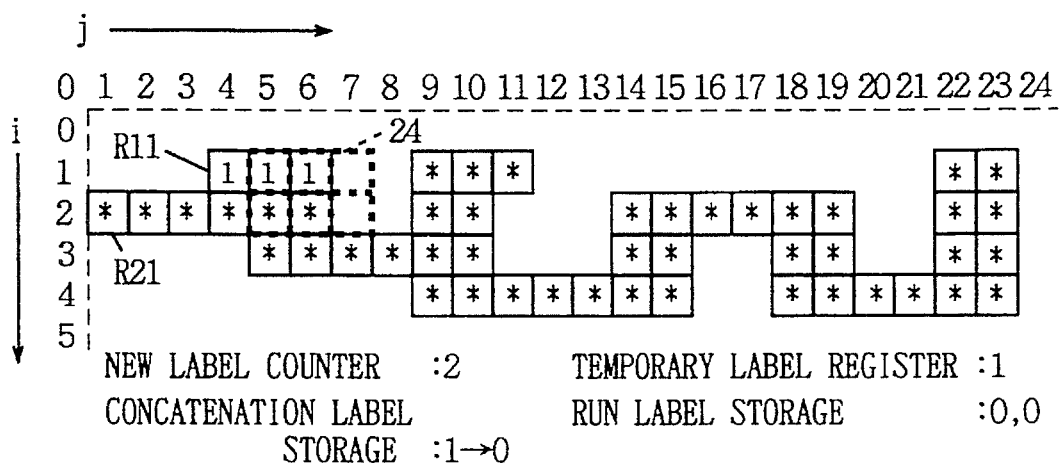
FIGS. 80A–80C show forms of the binary image during an operation of the conventional labeling circuit.
Figure 80B:
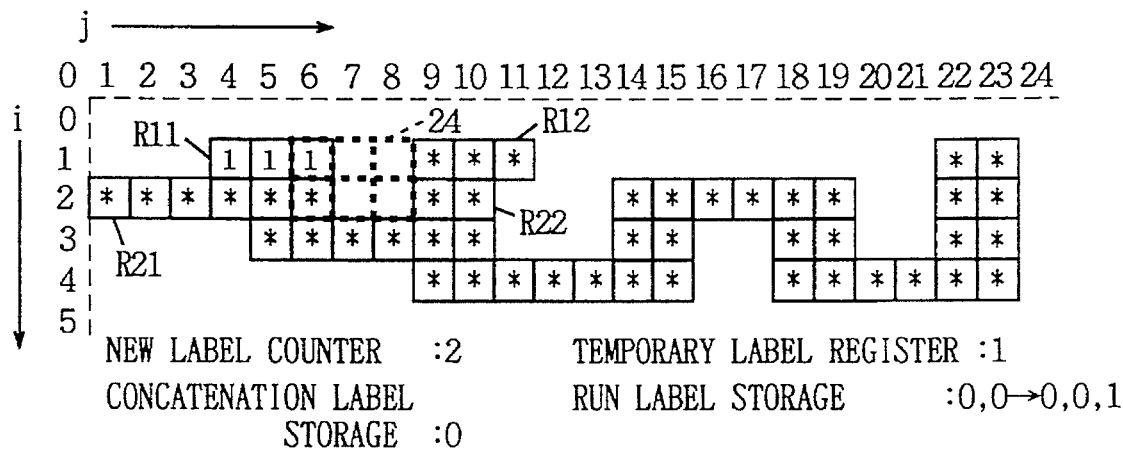
Figure 80C:
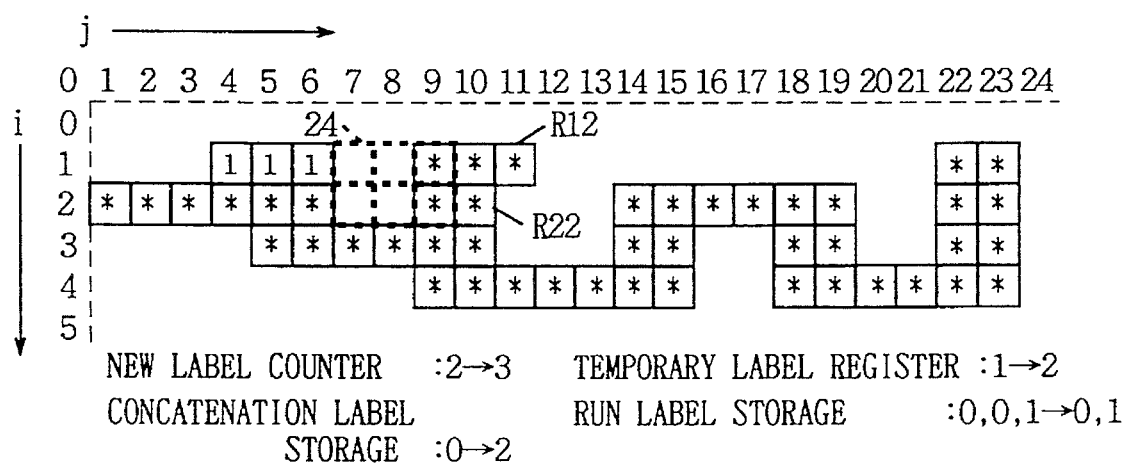
Figure 81A:
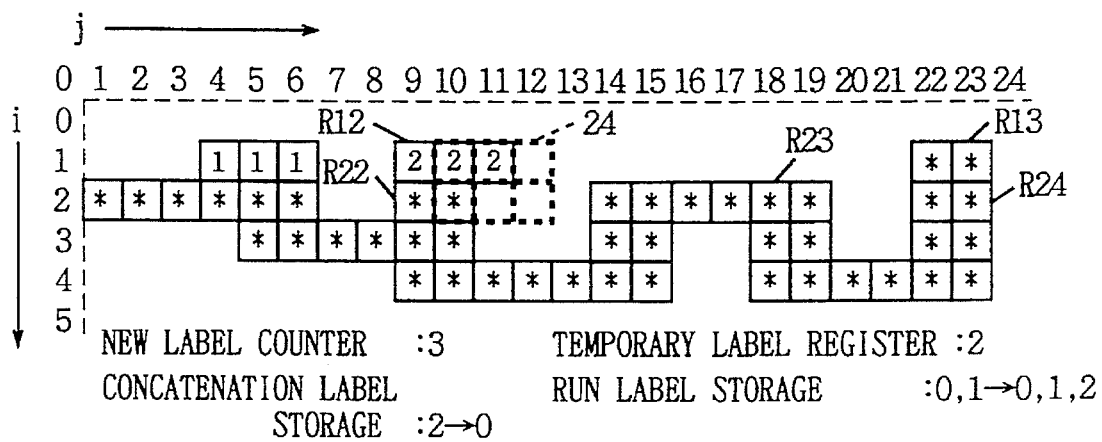
FIGS. 81A–81C show forms of the binary image during an operation of the conventional labeling circuit.
Figure 81B:
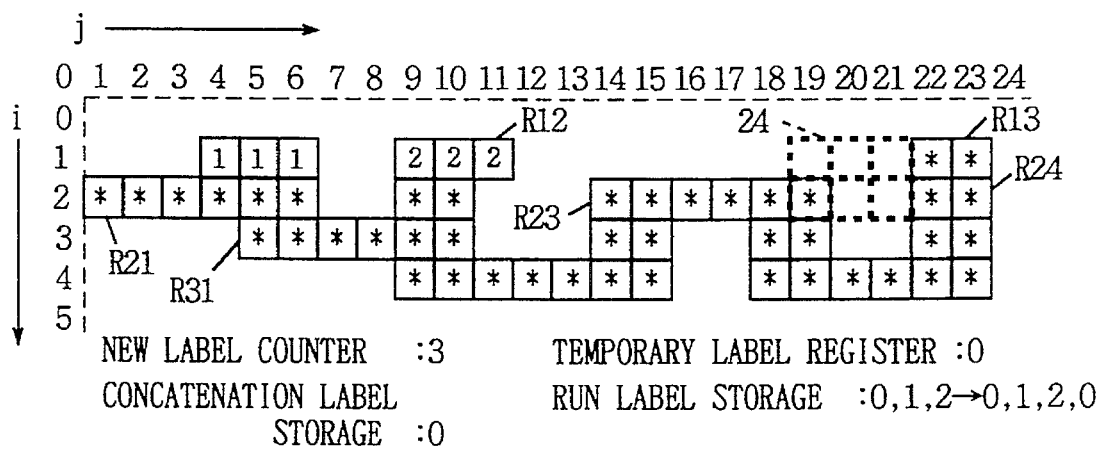
Figure 81C:
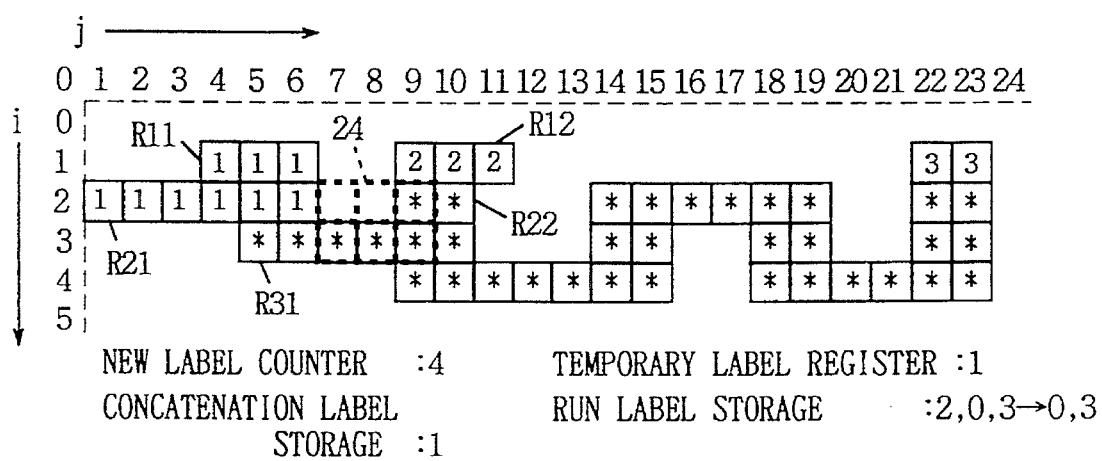
Figure 82A:
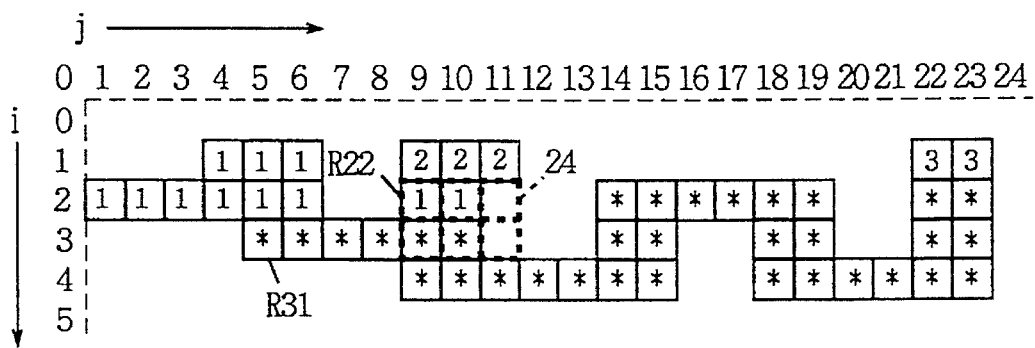
FIGS. 82A–82C show forms of the binary image during an operation of the conventional labeling circuit.
Figure 82B:
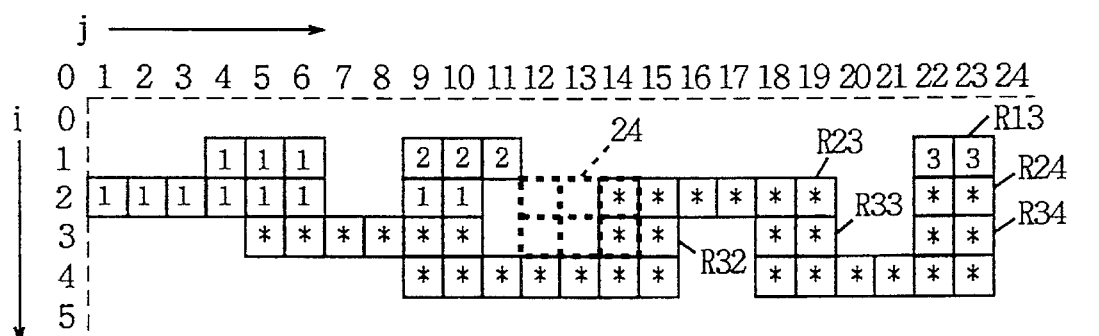
Figure 82C:
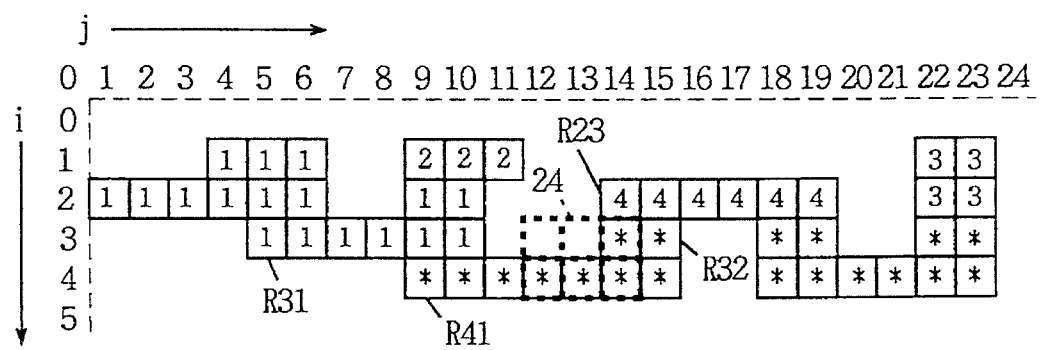
Figure 83A:
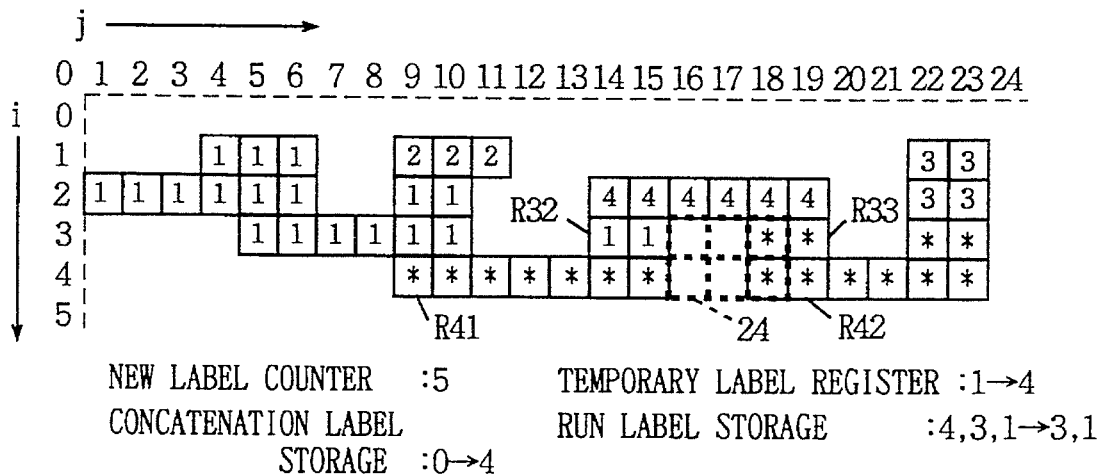
FIGS. 83A–83C show forms of the binary image during an operation of the conventional labeling circuit.
Figure 83B:
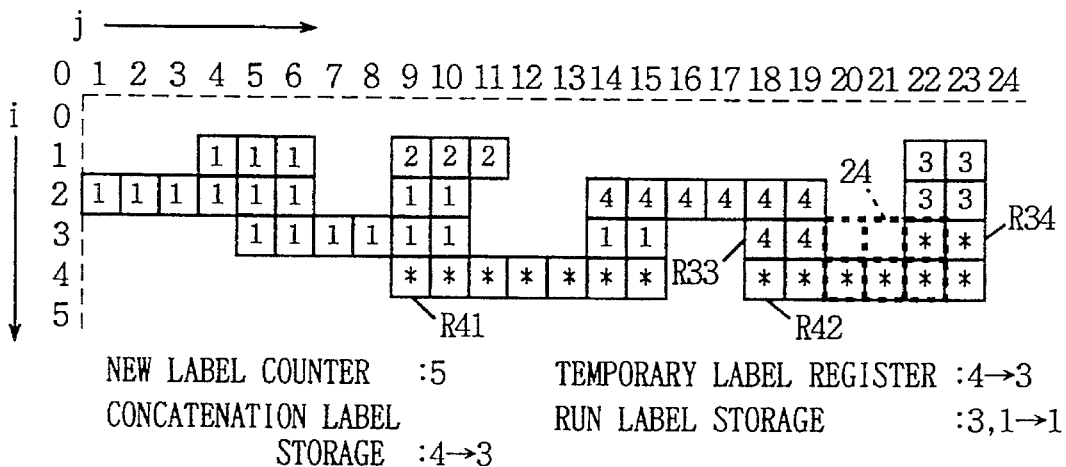
Figure 83C:
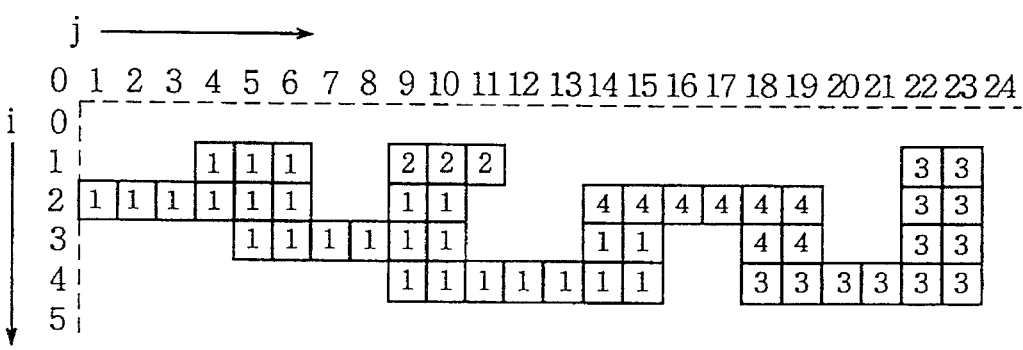
Figures 84, 85A, 85B, 85C, 85D:
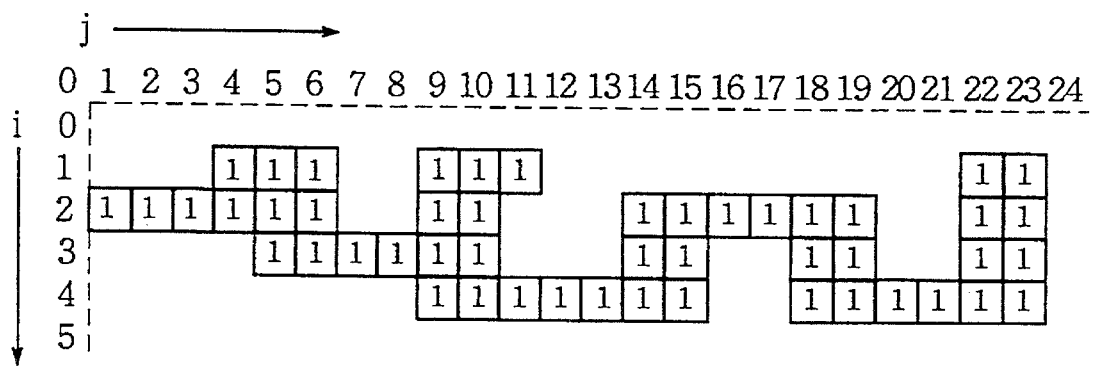
FIG. 84 shows a form of a labeled image obtained by a labeling process.
FIGS. 85A–85D show contents of a concatenation table using in a conventional label integrating process.
Figure 86:
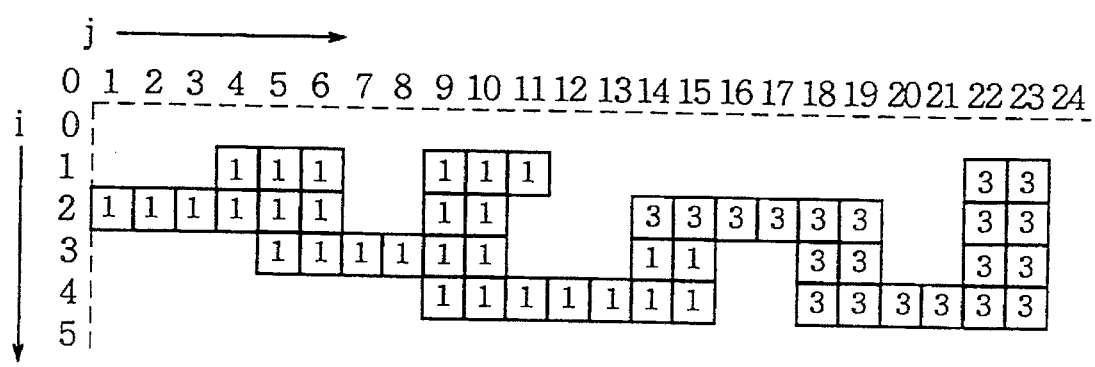
FIG. 86 shows a form of a labeled image obtained by a label integrating process using the concatenation table of the conventional labeling method.

For comparison with the prior art described previously, description will be made on the labeling process for the binary image including the objects of the same shapes as those of the binary image shown in FIG. 78A.

In the initial state shown in FIG. 3, the leading end of the reference run is not yet detected. Therefore, the new label counter, temporary label counter, concatenated label storage and run label storage maintain the contents in the initial state. In order to clarify difference over the prior art, it is assumed that the new label counter for producing a new label for the run is used, a register is provided at a portion producing the temporary label, and the concatenated label and run label have the same structures as corresponding ones in the prior art. In this state, the concatenation table has the contents shown in FIG. 2, in which the data stored at the addresses have the same values as corresponding addresses.

When the leading ends of the reference runs R11, R12 and R13 are detected, adjacent runs do not exist, so that the run labels are set to 0. These run labels 0 are stored in the run label storage in response to the trailing ends of the reference runs R11, R12 and R13.

Referring to FIG. 4, during a period from detection of the leading end of reference run R21 to detection of the leading end of adjacent run, the adjacent run does not yet exist, so that the temporary label is set to 0, and 0 is generated as the run label for the run R21 (but is not yet stored in the run label storage).

Figure 5:
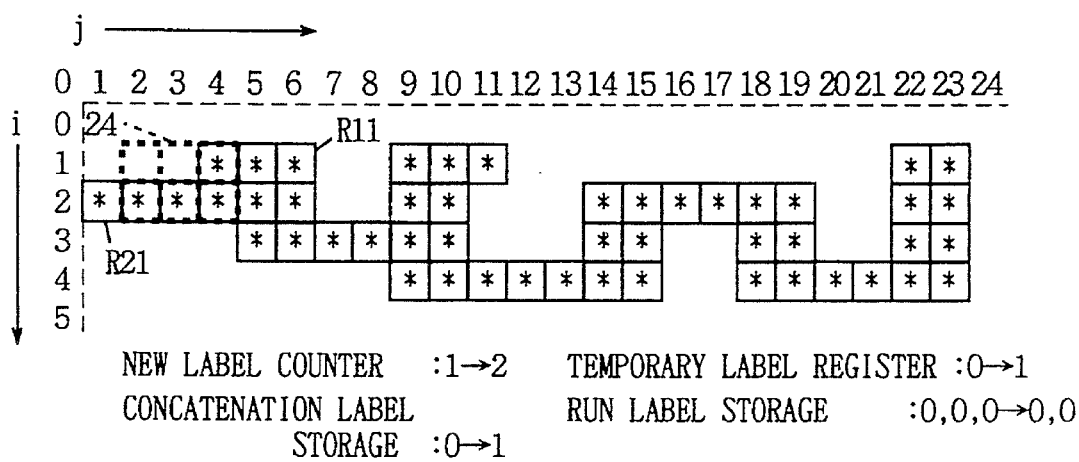

Referring to FIG. 5, the binary mask 24 scans the leading end of adjacent run R11. This adjacent run R11 bears the run label 0 which was assigned thereto when it was scanned as the reference run. In response to detection of the leading end of this adjacent run R11, the run label 0 is read, and the concatenation table is referred to using the run label 0 thus read as the address. Data 0 is stored at the address 0 in the concatenation table. Therefore, both the concatenated label and concatenation table data are 0, so that the adjacent run R11 is determined as a new object in accordance with the first condition for temporary label selection, and the new label (output 1 of the new label counter) is selected as the temporary label. The count of new label counter is incremented by one to 2, and the concatenated label is set to 1, i.e., the same value as this new temporary label.

Since the diversion or divergence of the label has not yet occurred, the contents of concatenation table are not yet changed.

Figure 6:
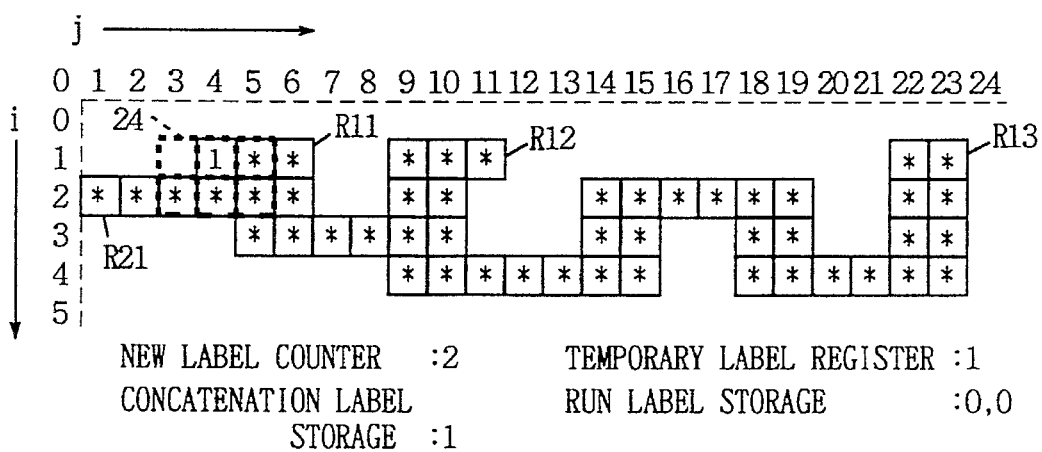

As shown in FIG. 6, when the binary mask 24 shifts rightward by one pixel, the temporary label supplied from the temporary label register maintains 1 because the adjacent run R11 is continuous. The adjacent reference pixel has the output label value of 1.

Figure 7:
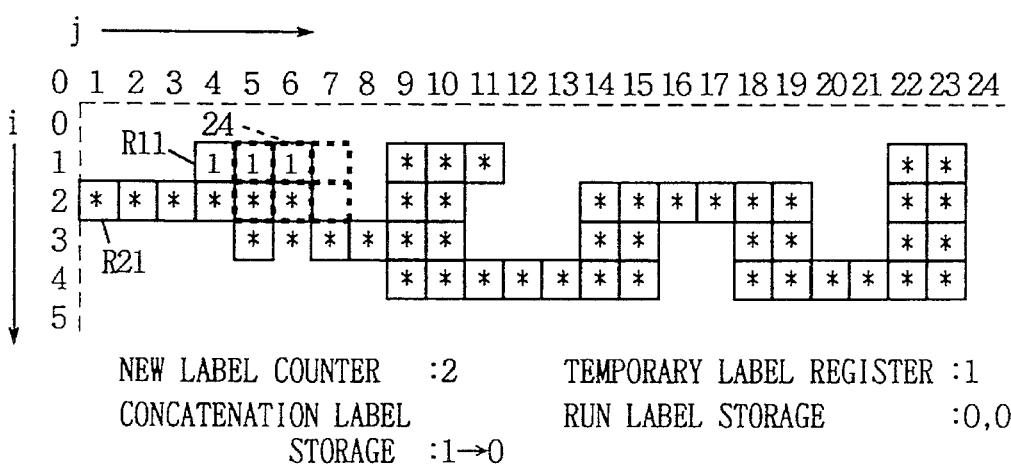

In the state shown in FIG. 7, when both the data of pixels on the upper and lower rows in the binary mask 24 go to 0, the concatenated label stored in the concatenated label storage is reset to 0. Since the trailing ends of the adjacent run R11 and reference run R21 are not detected, contents of the new label counter, the temporary label counter and the run label storage do not change.

Figure 8:
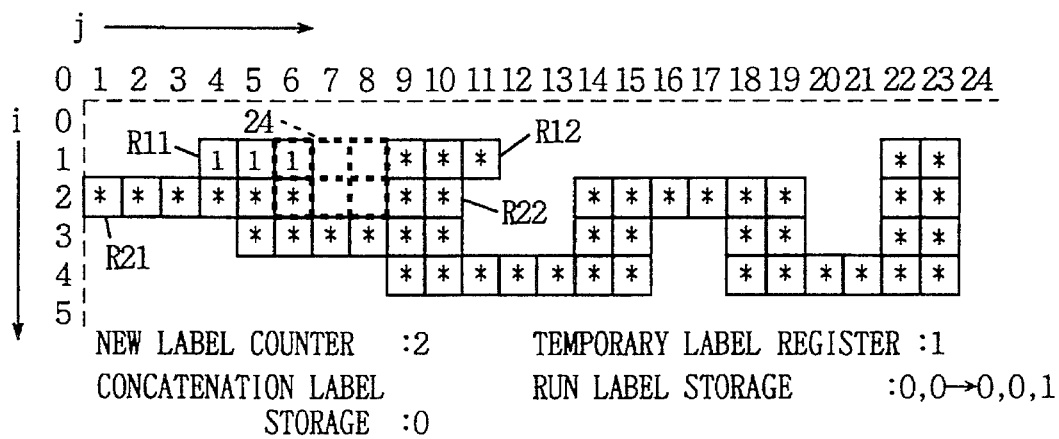

As shown in FIG. 8, when the binary mask 24 further shifts rightward by one pixel, the trailing ends of reference run R21 and adjacent run R11 are detected. In response to detection of the trailing end of reference run R21, the label value 1 supplied from the temporary label register is stored in the run label storage as the run label for this run label R21. Although the label value supplied from the temporary label register is 1, the output label value is 0 because the data of the adjacent reference pixel is 0 in the binary mask 24.

Figure 9:
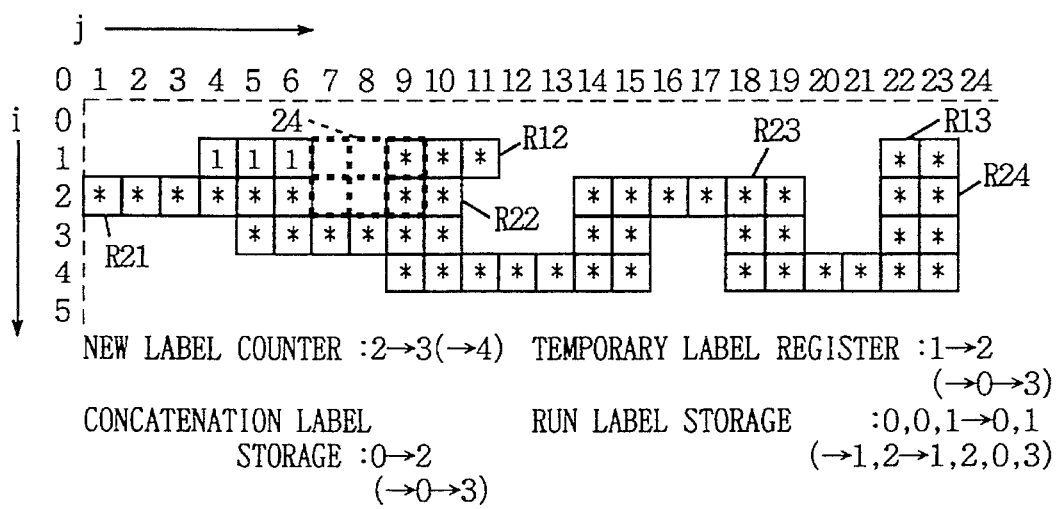

As shown in FIG. 9, when the binary mask 24 reaches the leading ends of adjacent run R21 and reference run R22, the leading end of adjacent run R12 is first detected, and the run label assigned to this adjacent run R12 is read from the run label storage. Since the run label assigned to the adjacent run R12 is 0, the content at the address 0 in this concatenation table is read. Since the contents of the concatenation table maintain the initial state, read out the concatenation table data is 0. Therefore, in accordance with the first condition for temporary label selection, the count of the new label counter, i.e., 2 is selected as the temporary label, and both the data stored in the concatenated label storage and the temporary label register go to 2. The label value of the new label counter goes to 3.

At this time, the data of the adjacent reference pixel is still 0, and hence the output label value is 0. Upon detection of the trailing end of reference run R22, the run label 2 for the reference run R22 is stored in the run label storage. When the binary mask 24 further shifts rightward and scans the reference run R23, the data stored in the concatenated label storage attains 0, which was attained by resetting at the trailing ends of reference run R22 and adjacent run R12, because no adjacent run adjoins to the reference run R23. When the trailing end of reference run R23 is detected, this temporary label, i.e., label value 0 is stored in the run label storage.

In the subsequent operation of scanning the reference run R24 and adjacent run R13, the concatenation table data 3 is read in accordance with the run label 3 of the adjacent run R13, and the concatenation table data 3 is selected as the temporary label in accordance with the third condition for temporary label selection. Correspondingly, the stored data in the concatenated label storage goes to 3. In response to detection of the trailing end of reference run R24, the run label 3 is stored in the run label storage.

Stored data in the run label storage are label values 1, 2, 0 and 3 for the reference runs R21, R22, R23 and R24, respectively.

Figure 10:
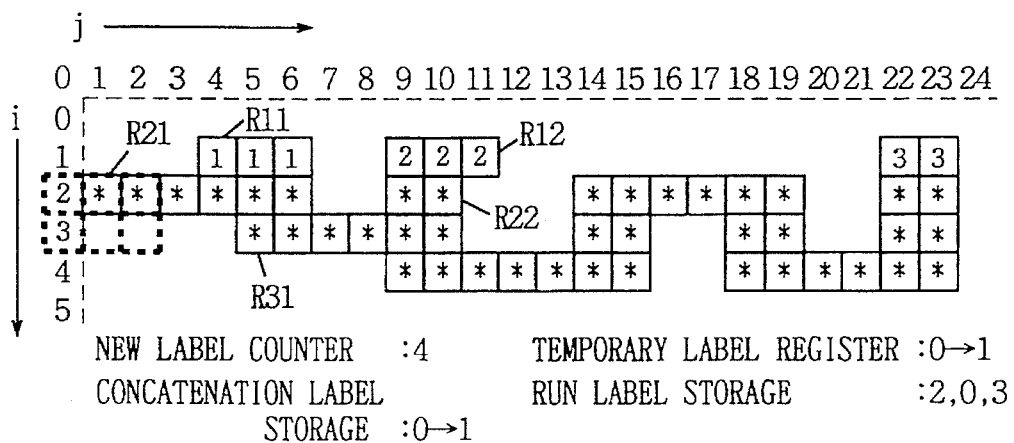

As shown in FIG. 10, when the run R21 is scanned as the adjacent run, the run label of this run R21 is read from the run label storage. At this time, 0 is stored in the concatenated label storage (which is reset during a blanking period in the horizontal scan). In response to detection of the leading end of the adjacent run R21, the run label 1, which was assigned when the adjacent run R21 was the reference run, is read from the run label storage. The concatenation table is referred to using the run label 1 thus read as the address, whereby the concatenation table data 1 is read. Since the concatenated label is 0 and the concatenation table data is 1, the temporary label is set to 1 in accordance with the third condition for temporary label selection. The temporary label 1 set in this temporary label register is stored in the concatenated label storage, and the concatenated label goes to 1. Thereby, the run R21 bears the same label as the temporary label image shown at (C) in FIG. 64.

As shown in FIG. 11, when the binary mask 24 scans the run R22 as the adjacent run, the run label 2 of the adjacent run R22 is read from the run label storage in response to detection of the leading end of adjacent run R22. Using the run label 2 thus read as the address, data is read from the concatenation table. At this time, the concatenation table data of 2 is read from the concatenation table. The concatenated label storage holds the concatenated label of 1. In this state, the concatenated label of a smaller label value is selected to obtain the temporary label 1 in accordance with the fifth condition for temporary label selection.

At this time, the concatenated label and run label are 1 and 2, respectively, and therefore different labels are assigned to the same object. Therefore, label diversion has occurred, so that writing is carried out in such a manner that the unselected run label 2 is used as the address and the selected concatenated label 1 is used as the write data. Thereby, contents of the concatenation table shown in FIG. 12 are obtained. The temporary label is set to 1, and the concatenated label goes to 1. Therefore, the label value 1 is assigned to each pixel belonging to the adjacent run R22 (i.e., the temporary label 1 is outputted as the output label value).

For the adjacent runs R23, operations are carried out similarly to those for the adjacent runs R11, R12 and R13. More specifically, as shown in FIG. 13, the concatenated label of the concatenated label storage is reset to 0 before the leading end of adjacent run R23 is detected. When the leading end of adjacent run R23 is detected, the run label 4 assigned to the adjacent run R23 is read from the run label storage. This run label 4 is used as the address, so that the concatenation table data of 4 is found at this address 4 in the concatenation table. Therefore, the label value 4 is selected as the temporary label from the concatenation table in accordance with the third condition for temporary label selection, and the data of temporary label register and concatenated label storage are set to 4.

When the leading end of adjacent run R24 is then detected, the run label 3 of this adjacent run R24 is read. The data stored at the address 3 in the concatenation table is 3. The concatenated label was reset to 0 before detection of the leading end of adjacent label R24. In this case, therefore, the concatenation table data 3 is selected as the temporary label in accordance with the third condition for temporary label selection, and both the temporary label and concatenated label go to 3. Since the label diversion has not occurred, the contents of the concatenation table do not change.

For the adjacent run R31, operations are carried out similarly to those for the adjacent run R21. More specifically, when the leading end of adjacent run R31 is detected, the run label 1 assigned to this adjacent run R31 is read from the run label storage. The concatenation table stores at the address 1 the data 1. At this time, the concatenated label is 0. Therefore, the concatenation table data 1 is selected as the temporary label in accordance with the third condition for temporary label selection, and the concatenated label storage stores the data 1. The temporary label 1 is assigned to each pixel in the adjacent run R31. The run label 1 of adjacent run R31 will be held until the leading end of the next adjacent run R32 is detected.

Then, the binary mask 24 detects the leading end of adjacent run R32 as shown in FIG. 14. In response to this detection, the run label 4 of this adjacent run R32 is read from the run label storage. Correspondingly, the data 4 at the address 4 in the concatenation table is read. The concatenated label, to which the label value 1 of adjacent run R31 has been propagated through the reference run R41, has the value of 1. Therefore, the concatenated label 1 of a smaller value is selected as the temporary label in accordance with the fifth condition for temporary label selection. The label diversion has occurred, so that the data 4 at the address 4 in the concatenation table is converted to 1. This state is shown in FIG. 15.

As shown in FIG. 16, when the binary mask 24 detects the leading end of adjacent run R33, the run label 4 of this adjacent run R33 is read from the run label storage in response to this detection of leading end. Using this run label 4, the concatenation table is referred to, whereby it is found that, as shown in FIG. 15, the contents of concatenation table have been changed in accordance with the diversion of label occurred at the adjacent run R32, and the content at address 4 is 1. The concatenated label has been reset to 0 in accordance with interruption of the adjacent run R32 and reference run R41. That is; the concatenated label is 0. Therefore, in accordance with the third condition for temporary label selection, the concatenation table data 1 is selected as the temporary label, and the data 1 is stored in the temporary label register and concatenated label storage. When the binary mask 24 shifts rightward, the temporary label 1 is supplied as the output label values for the two pixels belonging to the adjacent run R33.

As shown in FIG. 17, when the binary mask 24 detects the leading end of adjacent run R34, the run label 3 for the adjacent run R34 is read from the run label storage. The data at the address 3 in the concatenation table is 3. The concatenated label has been 1 since the adjacent run R33 was processed. Therefore, the concatenated label 1 is selected as the temporary label in accordance with the fifth condition for temporary label selection. Since the label diversion has occurred, the contents at the address 3 in the concatenation table are changed into the data 1, as shown in FIG. 18.

When the trailing end of reference run R42 is detected, the currently generated temporary label 1 is stored in the run label storage as the run label of reference run R42.

As shown in FIG. 19, when the binary mask 24 detects the leading end of adjacent run R41, the run label 1 assigned to the adjacent run R41 is read from the run label storage. The data stored at the address 1 in the concatenation table is 1, and the concatenated label is still 0 at this time. Therefore, the concatenation table data 1 is selected as the temporary label in accordance with the third condition for temporary label selection, and the concatenated label is changed into 1. Thereby, the label 1 is assigned to each pixel in adjacent run R41.

Similar operations are effected on the adjacent run R42, and the label value 1 is applied thereto by referring to the concatenation table.

Figure 20:
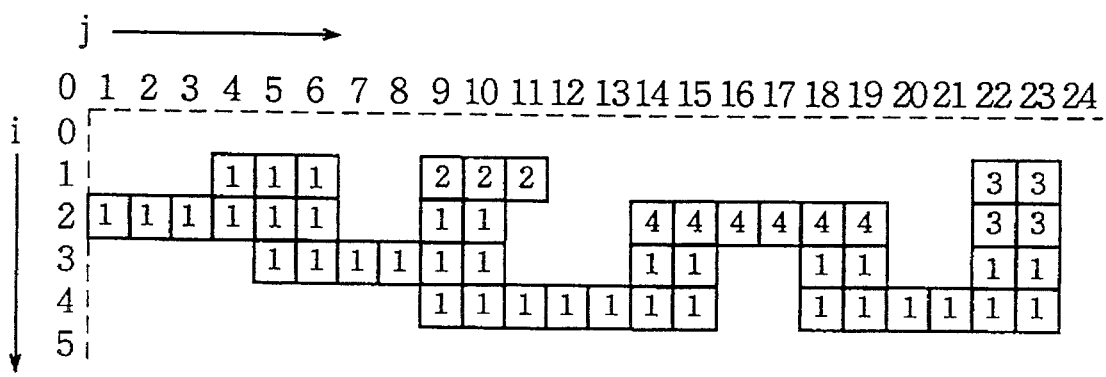
FIG. 20 shows a form of a temporary label image at the time of completion of the binary mask scanning according to the first embodiment.
Figure 21:
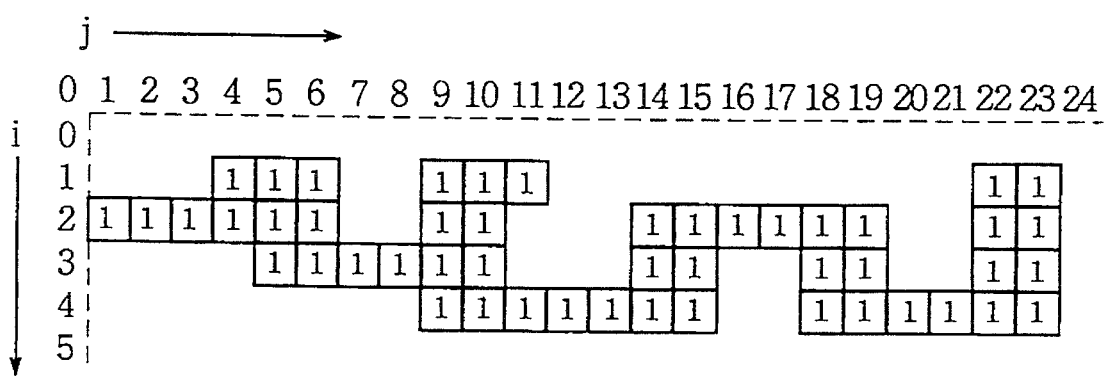
FIG. 21 shows distribution of labels of the binary image relabeled after completion of a label unification process.

The temporary label image shown in FIG. 20 is finally obtained by one raster scan operation. Relabeling is effected on the temporary label image shown in FIG. 20 using the concatenation table shown in FIG. 18. More specifically, the concatenation table is referred to using the temporary label as the address, and each temporary label is replaced with the concatenation table data. Thereby, all the temporary labels 2, 3 and 1 are converted into 1, so that the binary image shown in FIG. 21 is obtained. This processing is performed merely by referring to the concatenation table and replacing each label with the concatenation table data. Concatenation relationship between pixels in the concatenation table is not analyzed in any way. Therefore, integration of labels is achieved without analyzing the concatenation table, and the perfect label image in which each object bears only one label is obtained.

Then, the label integrating operation for another binary image will be described below.

Figures 22, 23:
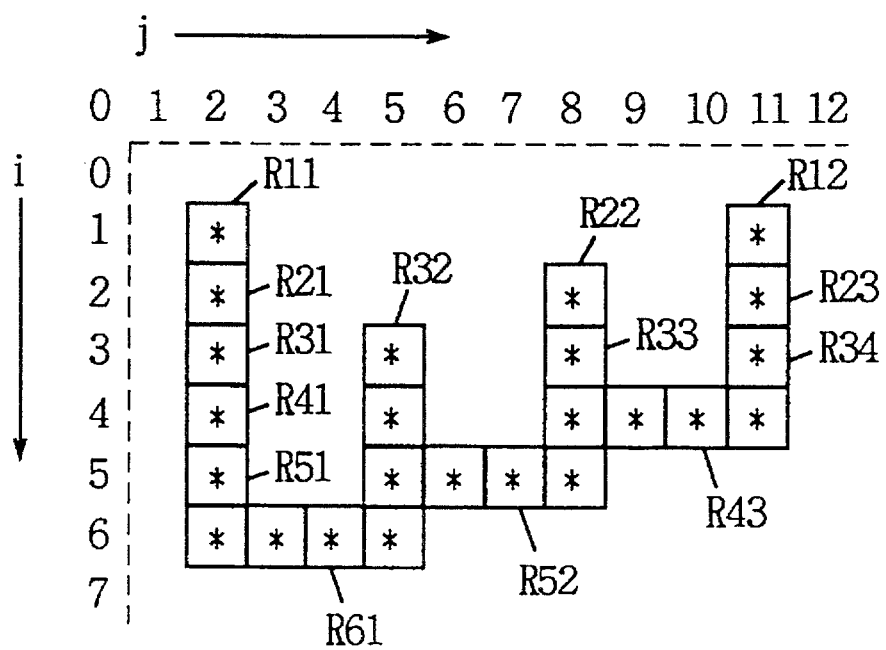
FIG. 22 shows a form of another binary image to which the labeling method of the first embodiment is applied.
FIG. 23 shows contents of the concatenation table used in the labeling process for the another binary image shown in FIG. 22.

Labeling is effected on the binary image shown in FIG. 22. According to the concatenation table in the initial state, as shown in FIG. 23, data stored at the addresses are coincident in value with corresponding addresses. The binary mask 24 starts scanning from the upper left end in the binary image. When the runs R21 and R12 are scanned as the reference runs, there is no labeled run adjacent thereto, so that the run label 0 is applied at each trailing end.

When the run R21 is detected as the reference run, the run R11 is correspondingly detected as the adjacent run. The run label 0 is read in response to detection of the adjacent run R11. Since the concatenated label is 0, the label 1 is assigned as the temporary label to the adjacent run R11 in accordance with the first condition for temporary label selection. When the run R22 is scanned as the reference run, there is no adjacent run concatenated thereto, so that the run label 0 is applied to the reference run R22.

When the run R23 is scanned as the reference run, the run R12 is scanned as the adjacent run. Since the run label of adjacent run R12 is 0 and the concatenated label, which was reset in response to disconnection of pixels, is also 0, a new label 2 is assigned to the label R12 in accordance with the first condition for temporary label selection. Similarly, when the runs R22 and R32 are scanned as the adjacent runs, temporary labels 3 and 4 are assigned to them, respectively.

When the binary mask 24 scans the run R33, the label 3 assigned to the run R33 is read. The concatenation table is referred to using the run label 3. Since the contents of the concatenation table are not yet changed, the concatenation table data is 3. In accordance with the third condition for temporary label selection, the temporary label of this adjacent run R33 is determined to be 3, and the concatenated label is also set to 3.

Figures 24A, 24B:
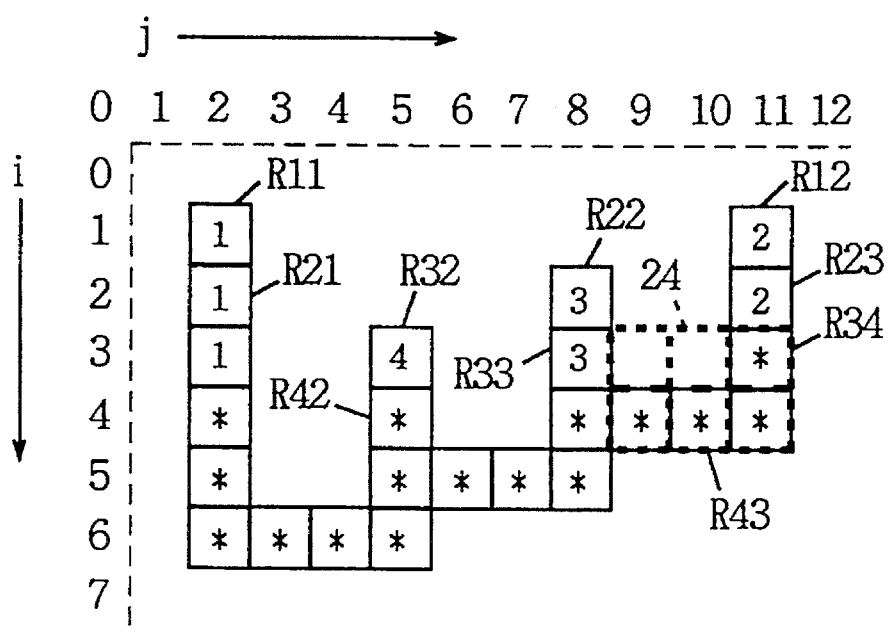
FIGS. 24A and 24B show a form of further another binary image during binary mask scanning and contents of the concatenation table at the same time, respectively.

As shown in FIG. 24A, the binary mask 24 detects the leading end of adjacent run R34. The label value 2 has been propagated, as the run label of this adjacent run R34, from the starting point, i.e., run R12 (or pixel (binary image data) (1, 11)). Since the concatenation table still maintains the initial state, the concatenation table data is 2 and the concatenated label is 3. Therefore, the concatenation table data having a smaller label value is selected as the temporary label, and both the temporary data and concatenated label go to 2. Since label diversion has occurred, this label diversion is described in the concatenation table, whereby the data at the address 3 in the concatenation table is changed into 2 as shown in FIG. 24B. At the leading end of reference run R43, this temporary label 2 is stored as the run label of the reference run R43.

When the binary mask 24 detects the leading end of adjacent run R42, both the temporary label and concatenated label go to 4 in accordance with the third condition for temporary label selection, because the run label of adjacent run R42 is 4, concatenation table data is 4 and concatenated label is 0.

Figures 25A, 25B:
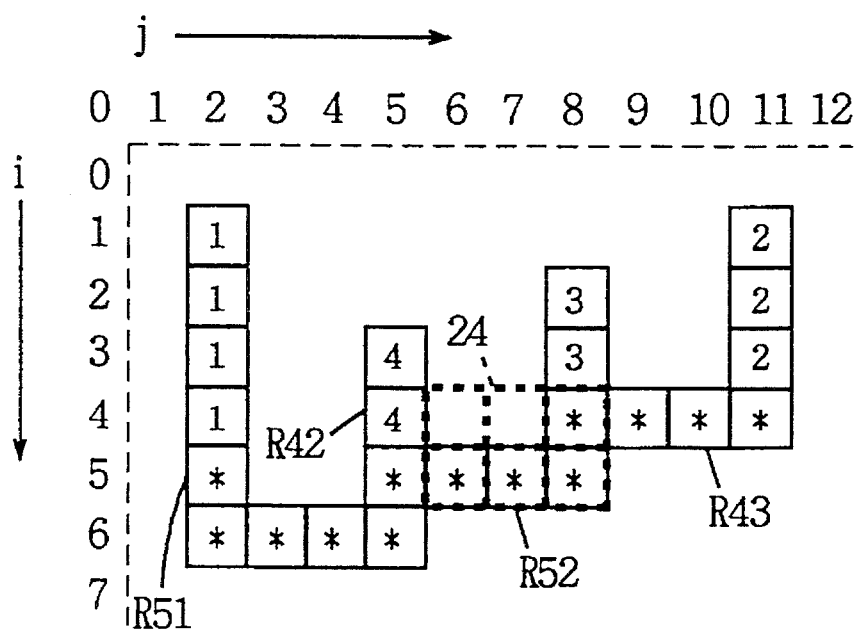
FIGS. 25A and 25B show a form of further another binary image during binary mask scanning and contents of the concatenation table at the same time, respectively.

As shown in FIG. 25A, when the binary mask 24 detects the leading end of adjacent run R43, the run label 2 of adjacent run R43 is read in response to this detection. Since the data at the address 2 in the concatenation table is 2, the concatenation table data of a smaller value, i.e., 2 is selected as the temporary label, and the concatenated label 4 is changed into 2. At this time, the label diversion has already occurred, so that the data at the address 4 in the concatenation table is changed into 2 as shown in FIG. 25B. At the trailing end of reference run R52, the run label 2 is applied to the reference run R52.

Then, the binary mask 24 detects the leading end of adjacent run R51. Since the label value 1 has been propagated to the adjacent run R51 from the run R11 or (pixel P (1, 2)), i.e., starting point, the run label thereof is 1. Since the concatenation table data is 1 and the concatenated label is 0, both the temporary label and concatenated label go to 1 in accordance with the third condition for temporary label selection.

Figures 26A, 26B:
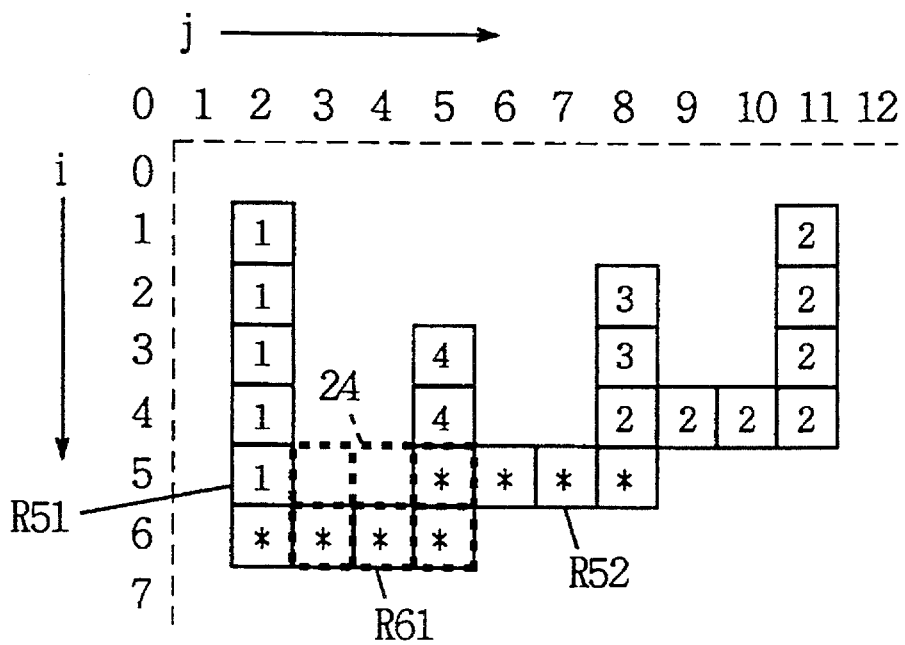
FIGS. 26A and 26B show a form of still further another binary image during binary image scanning and contents of the concatenation table at the same time, respectively.

As shown in FIG. 26A, when the binary mask 24 detects the leading end of adjacent run R52, the run label 2, which was assigned thereto when the adjacent run R52 was the reference run, is read. Since the data at the address 2 in the concatenation table is 2, the concatenation table data is 2 and the concatenated label is 1, so that both the temporary label and concatenated label go to 1 in accordance with the fifth condition for temporary label selection. At this time, the concatenation table is changed as shown in FIG. 26B, and specifically, the data at the address 2 is changed into 1. At the trailing end of reference run R61, the temporary label 1 is stored as the run label of reference run R61. In the adjacent run R52, the temporary label 1 is assigned to each pixel until the trailing end thereof is detected.

When the run R61 is scanned as the adjacent run, the run label 1 which was assigned thereto when it was the reference run is selected as the temporary label (concatenation table data=1 and concatenated label 1), and the temporary label 1 is assigned to each pixel in this run R61.

Each pixel bears the label as shown in FIG. 27 when the scan with the binary mask 24 is completed. Thus, each pixel in runs R11, R21, R31, R4 and R51 bears the label 1, and each pixel in runs R12, R23, R34 and R43 bears the label 2. Each pixel in runs R22 and R33 bears the label 3, and each pixel in runs R32 and R42 bears the label 4. Each pixel in runs R52 and R61 bears the label 1. Further, the concatenation table has such contents that data 0, 1, 1, 2 and 2 are stored at the addresses 0, 1, 2, 3 and 4, respectively, as shown in FIG. 26B.

From analysis of the contents of concatenation table shown in FIG. 26B, it is easily understood that the temporary label 2 is concatenated to the temporary label 1, the temporary label 3 is concatenated to the temporary label 2 and the temporary label 4 is concatenated to the temporary label 2. Thus, it is easily understood that the temporary labels 1 to 4 are the temporary labels assigned to the same object, and pixels bearing these temporary labels form the same concatenated object. Therefore, according to the contents of concatenation table shown in FIG. 26B, separation and diversion of the labels do not exist in any way, so that the table contents can be analyzed easily, and thereby all of these temporary labels can be changed into 1 in the label integrating process (table analysis) as shown in FIG. 28.

The concatenation table shown in FIG. 28 is utilized as the look-up table for relabeling the temporary label image shown in FIG. 27. Thereby, as shown in FIG. 29, the label value 1 can be assigned to every pixel, so that the final result image in which only one label is assigned to one object can be easily obtained.

According to the labeling method of the first embodiment of the invention, as described hereinbefore, the concatenation table is referred to using the run labels produced at the leading end of the adjacent run, and the temporary label is determined in accordance with the current concatenated label and concatenation table data, so that the frequency of occurrence of label diversion can be remarkably suppressed, and the concatenation relationship between the pixels can be easily identified for the relabeling process.

(ii) Second Embodiment

Figure 30:
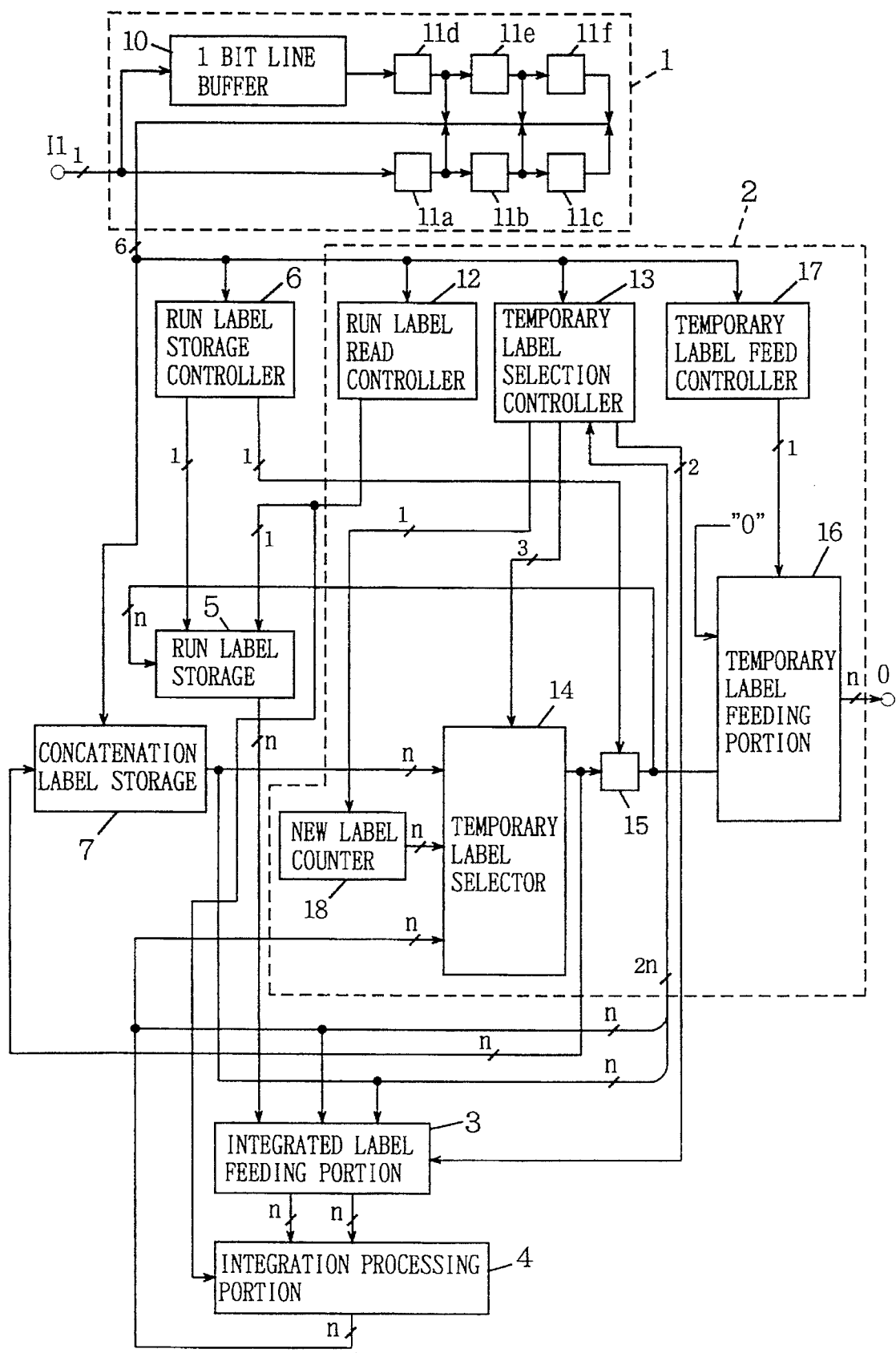
FIG. 30 shows a whole structure of a labeling circuit of a second embodiment of the invention.

FIG. 30 shows a specific structure of a labeling circuit according to a second embodiment of the invention. In FIG. 30, the labeling circuit includes the mask forming portion 1, which receives pixels of a binary image data series obtained by the raster scan of a binary image one by one in response to a clock signal and produces the binary mask in two rows by three columns. The labeling circuit also includes the run label storage 5 which stores the run label of the reference run and outputs the run label corresponding to the reference run when this reference run is detected as the adjacent run, and the concatenated label storage 7 which latches the temporary label as the concatenated label when the leading end of the adjacent run is detected. The labeling circuit further includes the run label storage controller 6 which controls the writing operation of the run label storage 5, the integrated label feeding portion 3 which selectively outputs the concatenated label and concatenation table data when label diversion occurs, the integration processing portion 4 which stores the label value applied from the integrated label feeding portion 3 in the concatenation table, and the temporary label determining portion 2 which determines the temporary label in accordance with the concatenation table data and concatenated label when the leading end of the adjacent run is detected.

The run label storage 5 has the FIFO structure, and its output is sent only to the integrated label feeding portion 3. The run label storage controller 6 writes the temporary label into the run label storage 5 when the trailing end of the reference run is detected. It also sets the temporary label to 0 when the leading end of the reference run is detected, if the data of all pixels on the adjacent row (upper row) in the binary mask are 0. The concatenated label storage 7 stores the determined temporary label as the concatenated label in response to detection of the leading end of the adjacent run. The concatenated label storage 7 is reset when pixels on both the upper and lower rows in the binary mask have a data of 0. The concatenated label supplied from the concatenated label storage 7 is also sent to the integrated label feeding portion 3.

The integrated label feeding portion 3 makes an access (i.e., write and read of the concatenated label data) to the concatenation table contained in the integration processing portion 4 in accordance with the control signal sent from the temporary label selection controller 13 contained in the temporary label determining portion 2. The integration processing portion 4, which responds to the read control signal sent from the run label read controller 12 contained in the temporary label determining portion 2, reads the concatenation table data at the address which is equal in value to the run label sent from the run label storage 5 via the integrated label feeding portion 3, and applies the read concatenation table data to the temporary label selector 14 contained in the temporary label determining portion 2 and the temporary label selection controller 13.

The concatenation table contained in the integration processing portion 4 has a n-bit by $2^n$-word structure, and, at the initial state, stores such data equal in value to the corresponding addresses as shown in FIG. 23.

The run label read controller 12 detects the leading end of the adjacent run, and applies the read instruction signal to the run label storage 5 and integration processing portion 4 when it detects the leading end of the adjacent run.

The temporary label selection controller 13 determines the temporary label in accordance with the five conditions for temporary label selection described before when the leading end of the adjacent run is detected, and applies the control signal according to the determined result to the temporary label selector 14.

The temporary label selector 14 operates in accordance with the control signal sent from the temporary label selection controller 13, and more specifically, selects one of the concatenated label sent from the concatenated label storage 7, the count sent from the new label counter 18 and the concatenation table data sent from integration processing portion 4 for applying the selected one to the temporary label register 15. The new label counter 18 responds to the control signal sent from the temporary label selection controller 13 to increment its count by one when its count is selected as the temporary label. The count of new label counter 18 is selected as the temporary label when the label diversion occurs (fifth condition for temporary label selection).

The temporary label register 15 latches as the temporary label the label value supplied from the temporary label selector 14. The temporary label register 15 is reset when the temporary label feeding portion 16 detects the leading end of reference run and all the pixel data on the upper row in the binary mask are 0. The temporary label supplied from the temporary label register 15 is applied to the temporary label feeding portion 16. The temporary label feeding portion 16 operates under the control of the temporary label feed controller 17, and more specifically, selects one of the temporary label sent from the temporary label register 15 and the fixed value 0 for producing and outputting the output label value. The label value supplied from the temporary label feeding portion 16 is stored in the temporary label image memory (not shown).

The temporary label feed controller 17 operates in accordance with the data value of the adjacent reference pixel which is the labeled object pixel, and more specifically, applies a signal, which designates one of the temporary label supplied from the temporary label register 15 and the fixed value 0, to the temporary label feeding portion 16. Then, an operation will be described below.

When the binary image data P(i, j+1) is inputted, the mask forming portion 1 outputs the binary mask formed of the local image region including pixels of two rows and two columns and consisting of binary image data P(i, j+1), P(i, j), P(i, j−1), P(i−1, j+1), P(i−1, j) and P(i−1, j−1). The run label read controller 12 receives this binary mask, and applies the read control signal to the run label storage 5 and integration processing portion 4 when it detects the leading ends (P(i−1, j)=0 and P(i−1, j+1)=1) of the adjacent run.

Since the run label storage 5 has the FIFO structure, it outputs to the integrated label feeding portion 3 the run label data which was stored first among the stored but not read data. In this state, the integrated label feeding portion 3 has not yet received the write instruction signal from the temporary label selection controller 13, so that the run label applied from the run label storage 5 is sent to the integration processing portion 4. The integration processing portion 4 accesses the internal concatenation table, using this run label applied from the integrated label feeding portion 3 as the address, for reading and transmitting the data to the temporary label selection controller 13.

The temporary label selection controller 13 receives the concatenated label (n bits) supplied from the concatenated label storage 7 and the concatenation table data (n bits) supplied from the integration processing portion 4, and inspects their values and which is greater. The temporary label selection controller 13 selects one of the five conditions for temporary label selection to be applied based on the result of this inspection, and applies the control signal for selecting a label to be selected as the temporary label to the temporary label selector 14.

The temporary label selection controller 13 supplies a control signal, which is used for selecting the data to be sent to the integration processing portion 4, to the integrated label feeding portion 3, if the fifth condition for temporary label selection is selected to indicate that label diversion has occurred.

The integrated label feeding portion 3 receives the concatenated label, which is applied to the temporary label selection controller 13, and the concatenation table data. The integrated label feeding portion 3 operates in accordance with the selection control signal sent from the temporary label selection controller 13, and specifically, transmits the label value, which is selected as the temporary label, as the write data as well as the unselected label value as the address to the integration processing portion 4 for writing the data in the concatenation table. In other words if the concatenation table data is larger than the concatenated label, the concatenation table data is treated as the address and the concatenated label is treated as the write data. Conversely, if the concatenated label is larger than the concatenation table data, the concatenated label is treated as the address, and the concatenation table data is treated as the write data. In this manner, the data is written into the concatenation table.

The temporary label selector 14 selects one of the concatenated label sent from the concatenated label storage 7, new label sent from the new label counter 18 and concatenation table data in accordance with the selection control signal sent from the temporary label selection controller 13, and transmits the selected one to the temporary label register 15. After the output data to the temporary label selector 14 is decided, and writing of data into the concatenation table contained in the integration processing portion 4 is completed if the label diversion occurred, the concatenated label storage 7 latches and outputs the temporary label supplied from the temporary label selector 14. Thereby, change of the concatenated label can be reliably performed even when the label diversion occurred, because the concatenated label before the change is used for changing the concatenation table.

The temporary label feed controller 17 operates in accordance with the value of adjacent reference pixel (P(i−1, j)), and more specifically, applies to the temporary label feeding portion 16 the signal for selecting one of the temporary label supplied from the temporary label register 15 and the fixed value 0. The temporary label feeding portion 16 selects and outputs the output label value in accordance with the feed control signal sent from the temporary label feed controller 17.

When the run label storage controller 6 detects the trailing end (P(i, j−1)=1 and P(i, j)=0) of the reference run, it applies the write instruction signal to the run label storage 5. The run label storage 5 stores the temporary label supplied from the temporary label register 15 in accordance with the write instruction signal. Thereby, the run label for the reference run is stored.

By labeling the binary image with the circuit structure described above, it is possible to reduce remarkably the frequency of occurrence of label diversion, i.e., assignment of different labels to the same object, and thus it is possible to detect the concatenation relationship between labels only with the concatenation table without requiring the temporary label image in the label integrating process, so that the label integrating process can be performed at a high speed. Then, specific structures of the respective parts and portions will be described below.

Figure 31:
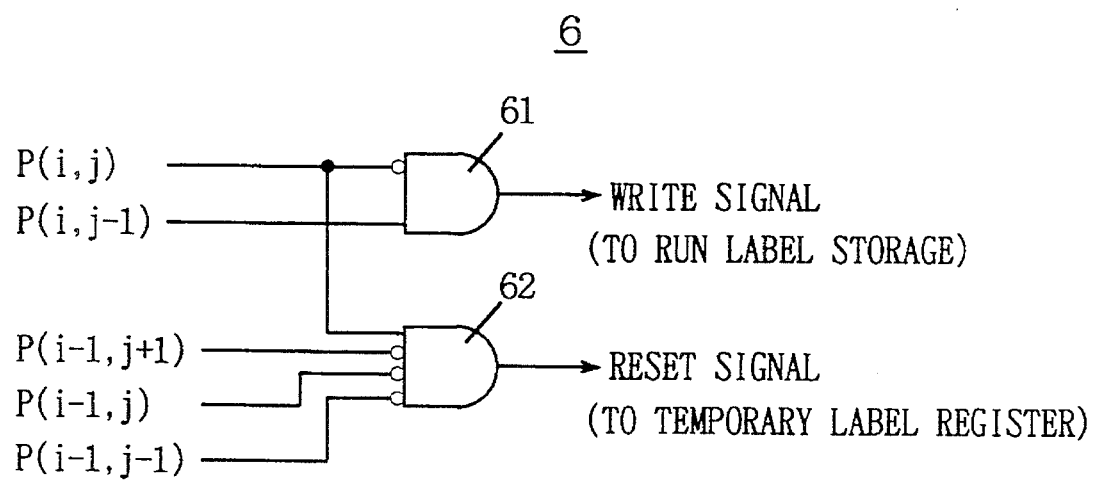
FIG. 31 shows an example of a structure of a run label storage controller shown in FIG. 30.

FIG. 31 shows an example of a structure of the run label storage controller 6 shown in FIG. 30. In FIG. 31, the run label storage controller 6 includes a 2-input gate circuit 61 receiving the binary image data P(i, j) and P(i, j−1), and a 4-input gate circuit 62 receiving binary image data P(i, j), P(i−1, j+1), P(i−1, j) and P(i−1, j−1).

The gate circuit 61 outputs a signal of "1" when the binary image data P(i, j) is 0 and the binary image data P(i, j−1) is 1. The output of gate circuit 61 is applied as the write instruction signal (i.e., write signal) to the run label storage 5. Here, the binary image data 0 and 1 correspond to logic 0 and logic 1, respectively.

The gate circuit 62 generates a reset signal of logic 1 when the binary image data P(i, j) is 1 and all the binary image data P(i–1, j+1), P(i–1, j) and P(i–1, j–1) are 0. The reset signal is applied from the gate circuit 62 to the temporary label register 15.

Owing to the above structure, a run label is stored in the run label storage 5 when a trailing end of a reference run is detected, and the run label register is reset to 0 for setting the label of the adjacent reference pixel (pixel to be labeled) to 0 if the adjacent run is not present in connection with the reference pixel.

Figure 32:
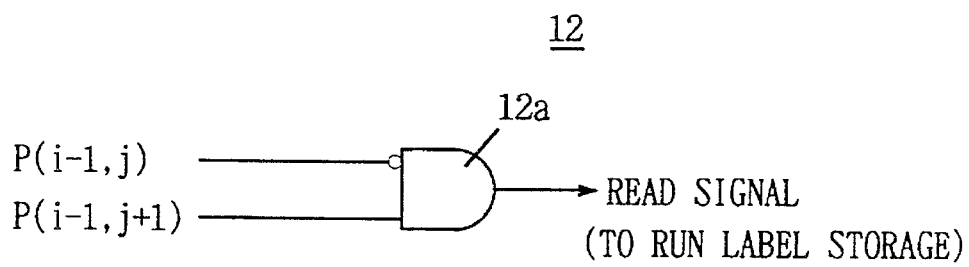
FIG. 32 shows an example of a specific structure of a run label read controller shown in FIG. 30.

FIG. 32 shows an example of a structure of the run label read controller FIG. 30. In FIG. 32, the run label read controller 12 includes a 2-input gate circuit 12a receiving the binary image data P(i–1, j) and P(i–1, j+1). The gate circuit 12a sets the read signal to 1 when the binary image data P(i–1, j) is 0 and the binary image data P(i–1, j+1) is 1. The read signal is applied from the gate circuit 12a to the run label storage 5. Thereby, the run label can be read from the run label storage when the leading end of the adjacent run is detected, and also the data can be read from the concatenation table in the integration processing portion.

Figure 33:
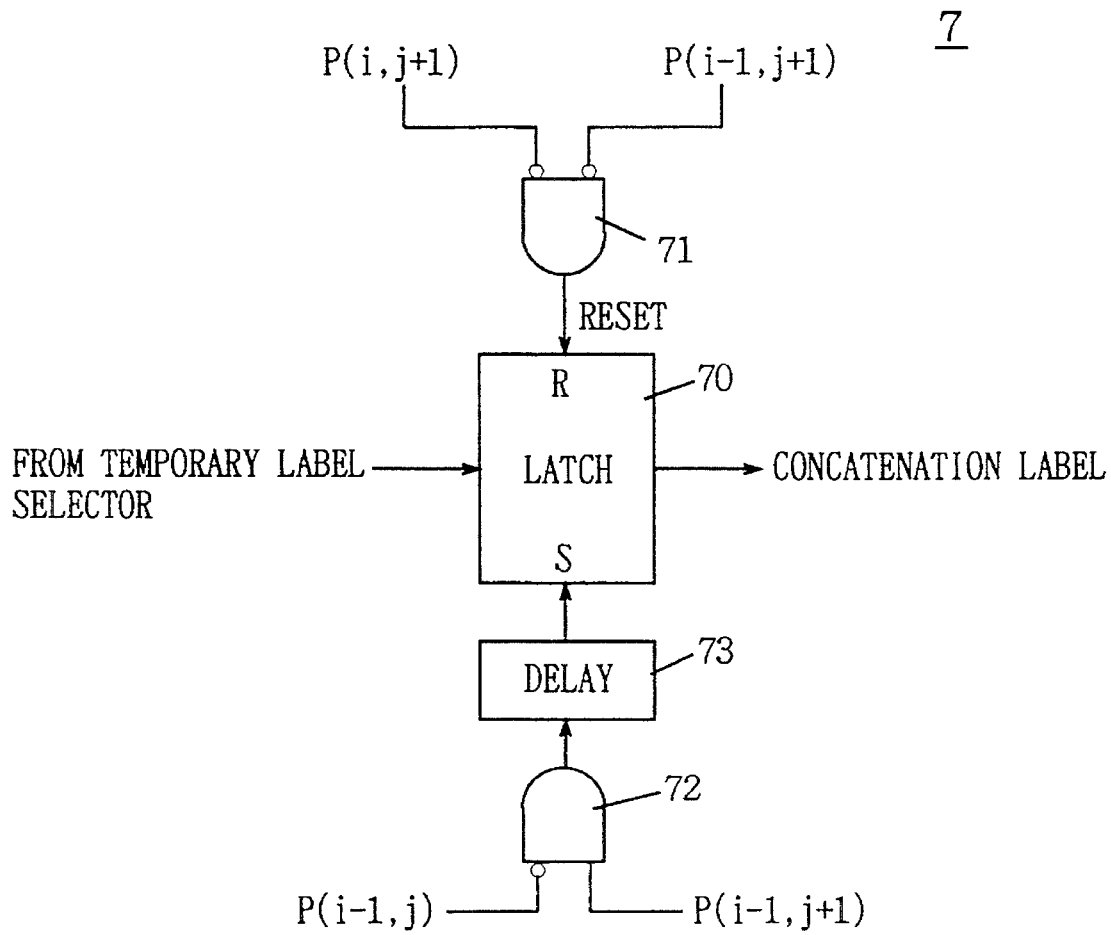
FIG. 33 shows an example of a specific structure of a concatenated label storage shown in FIG. 30.

FIG. 33 shows an example of a structure of the concatenated label storage shown in FIG. 30. In FIG. 33, the concatenated label storage 7 includes a 2-input gate circuit 71 receiving the binary image data P(i, j+1) and P(i–1, j+1), a 2-input gate circuit 72 receiving the binary image data P(i–1, j) and P(i–1, j+1), a delay circuit 73 delaying the output of gate circuit 72 by a predetermined time, and a latch circuit 70 which is responsive to the output of delay circuit 73 to latch the temporary label outputted from the temporary label selector and is also responsive to the output of gate circuit 71 to reset its own contents.

The gate circuit 71 generates a signal of 1 when both the binary image data P(i, j+1) and P(i–1, j+1) are 0. Thereby, the latch circuit 70 is reset when pixels on both the upper and lower rows in the binary mask go to 0, so that the concatenated label can be set to 0 at the interruption of the reference run and adjacent run, and thus propagation of the concatenated label can be prevented.

The gate circuit 72 outputs a signal of 1 when the binary image data P(i–1, j) is 0 and the binary image data P(i–1, j+1) is 1. The delay circuit 73 is provided for performing a latch operation after the output of temporary label selector is decided. More specifically, the temporary label is determined in accordance with the fifth condition for temporary label selection, and the value of temporary label is also determined after this determination of the temporary label. The delay circuit 73 is provided for surely latching the temporary label determined as the concatenated label. This ensures that the accurate run label is held when the leading end of the adjacent run is detected.

Figure 34:
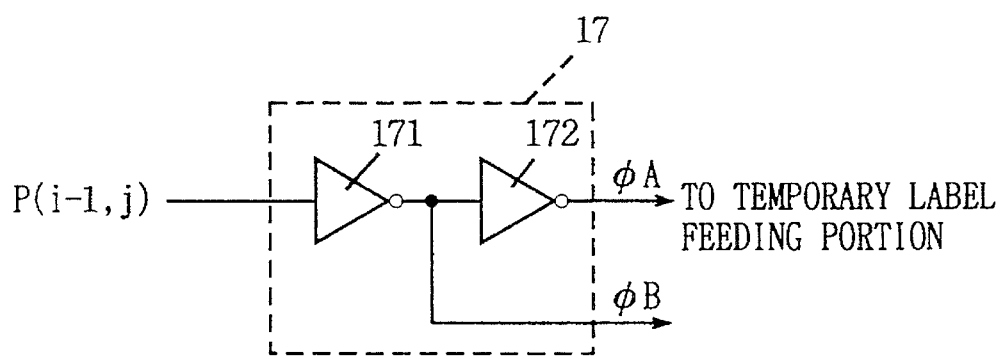
FIG. 34 shows an example of a specific structure of a temporary label feed controller shown in FIG. 30.

FIG. 34 shows a structure of the temporary label feed controller 17 shown in FIG. 30. In FIG. 34, the temporary label feed controller 17 includes inverter circuits 171 and 172 coupled in tandem for receiving the binary image data P(i–1, j). The inverter circuit 171 generates a control signal $\phi B$, and the inverter circuit 172 generates a control signal $\phi A$. These inverter circuits 171 and 172 includes a delay function, so that the control signals $\phi A$ and $\phi B$ are generated at such a timing that the temporary label feeding portion 16 selects and outputs the temporary label after the temporary label selector fixes the temporary label data and the temporary label register 15 stores the temporary label data.

Figure 35:
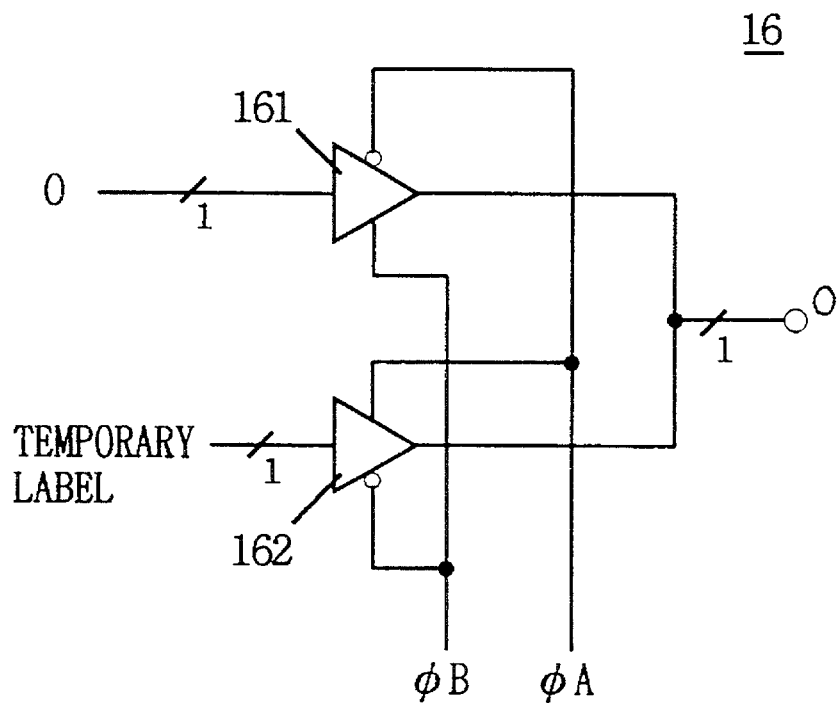
FIG. 35 shows an example of a specific structure of a temporary label feeder shown in FIG. 30.

FIG. 35 shows a structure of the temporary label feeding portion 16 shown in FIG. 30. The temporary label feeding portion 16 includes the shown structure arranged in parallel by n bits, and FIG. 35 shows the structure of the temporary label feeding portion related to one bit. In FIG. 35, the temporary label feeding portion 16 includes three-state buffers 161 and 162 which are selectively enabled in response to the control signals $\phi A$ and $\phi B$ applied from the temporary label feed controller 17 shown in FIG. 34, respectively. The three-state buffer 161 receives a data bit 0, and the three-state buffer 162 receives the temporary label applied from the temporary label register 15. When the control signal $\phi A$ is 0 and the control signal $\phi B$ is 1, the three-state buffer 161 is enabled. When the control signal $\phi A$ is 1 and the control signal $\phi B$ is 0, the three-state buffer 162 is enabled. The three-state buffers 161 and 162 attain an output high impedance state when disabled.

By utilizing the temporary label feeding portion 16 shown in FIG. 35, it is possible to select and output the temporary label data or fixed data in accordance with the value of the adjacent reference pixel. The three-state buffers 161 and 162 shown in FIG. 35 may be replaced with other components such as CMOS transmission gates.

Figure 36:
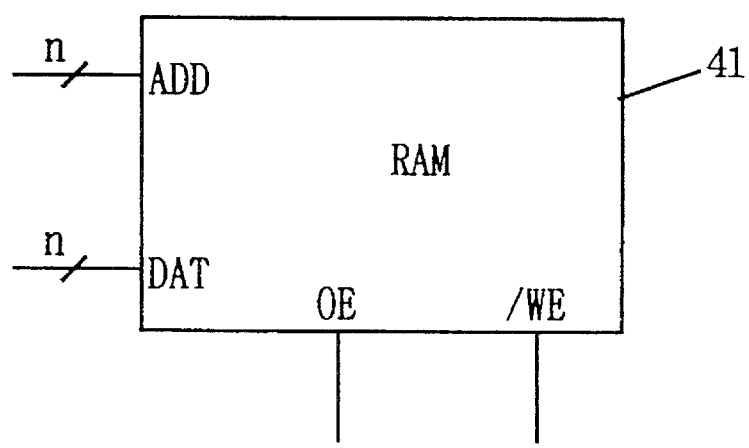
FIG. 36 shows an example of a specific structure of a concatenation table contained in an integration processing portion shown in FIG. 30.

FIG. 36 shows a structure of the concatenation table included in the integration processing portion 4 shown in FIG. 30. In 36, the concatenation table includes a RAM (random access memory) 41 to which writing and reading data can be performed a random sequence. RAM 41 includes an address input ADD of an n-bit width and a data input DAT of an n-bit width as well as a read input OE and a write input /WE which receive the read and write instruction signals, respectively. The read and write inputs OE and /WE attain the data read state and data write state when they receive signals of 1 and 0, respectively. RAM 41 may be any memory such as a register file, a DRAM (dynamic random access memory) or an SRAM (static random access memory) provided that read and write of data can be performed. In the initial set state of the RAM 41, stored data are equal in value to the corresponding addresses. For achieving this initial setting, a not shown counter of n bits is used, and its output is applied to the address input ADD and data input DAT and the count is incremented successively for writing data.

The integration processing portion 4 includes a processing device which reads the contents of the concatenation table, i.e., the contents of RAM 41 and performs the table analysis for effecting the label integrating process on the temporary label image. However, this device is not shown in the figure.

Figures 37A, 37B:
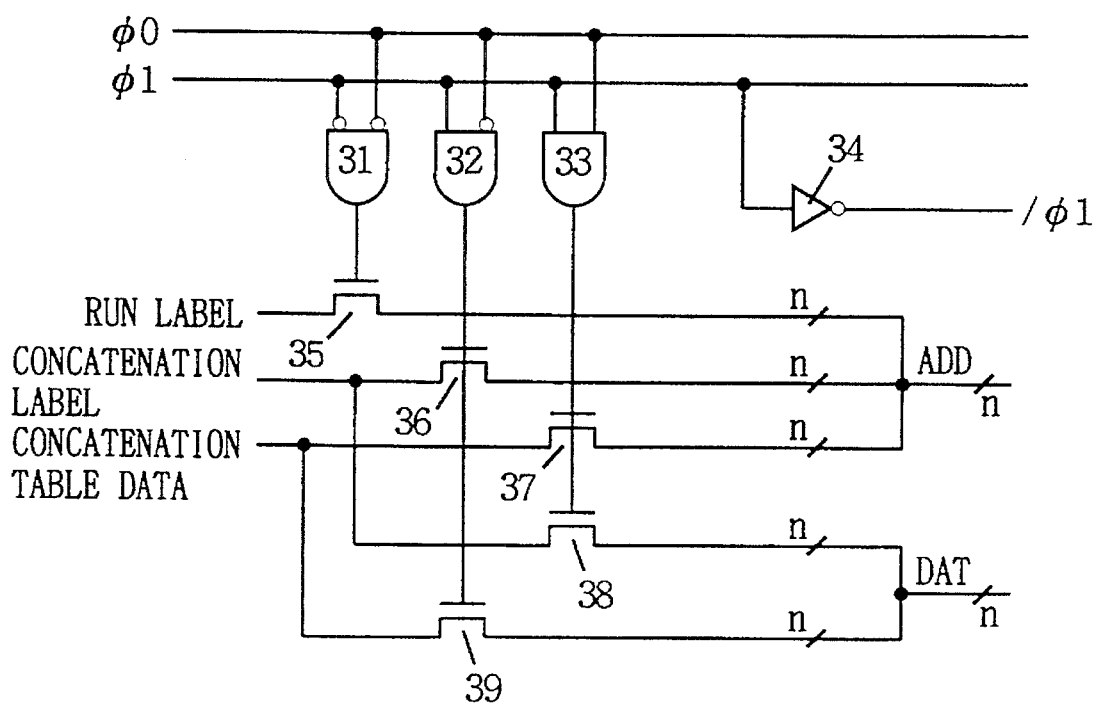
FIGS. 37A and 37B show a specific structure of an integrated label feeder shown in FIG. 30 and a logic thereof, respectively.

FIGS. 37A and 37B show an example of a structure of the integrated label feeder shown in FIG. 30 and its logic in a list form, respectively. In FIG. 37A, the integrated label feeding portion 3 includes two-input gate circuits 31, 32 and 33 which receive control signals $\phi 0$ and $\phi 1$ (which will be described later) from the temporary label selection controller 13, an inverter circuit 34 inverting the control signal $\phi 1$, a switching element 35 which transmits the run label data onto an address bus of the concatenation table in response to the output of gate circuit 31, a switching element 36 which transmits the concatenated label data onto the address bus ADD in response to the output of gate circuit 32, a switching element 37 which transmits the concatenated label data onto the address bus ADD in response to the output of gate circuit 33, a switching element 38 which transmits the concatenated label data onto the data bus (data input) DAT of the concatenation table in response to the output of gate circuit 33, and a switching element 39 which transmits the concatenation table data onto the data bus DAT in response to the output of gate circuit 32.

The gate circuit 31 outputs a signal of 1 when both the control signals $\phi 0$ and $\phi 1$ are 0. The gate circuit 32 outputs a signal of 1 when the control signal $\phi 1$ is 1 and the control signal $\phi 0$ is 0. The gate circuit 33 outputs a signal of 1 when both the control signals $\phi 0$ and $\phi 1$ are 1. An output /$\phi 1$ of the inverter circuit 34 is applied to the write instruction input (/WE) of the concatenation table (RAM 41).

Each of the switching elements 35–39 shown in the FIG. 37A is formed of n-channel MOS transistors, and becomes conductive when the signal of "1" is applied to its control electrode. Then, an operation thereof will be described below with reference to FIG. 37B.

When both the control signals $\phi 1$ and $\phi 2$ are 0, the output of gate circuit 31 goes to 1, so that the switching element 35 becomes conductive to transmit the run label onto the address bus ADD. At this time, the run label read controller 12 shown in FIG. 30 applies the read signal to the output enable input OE of RAM 41, and the data is read from the address equal to this run label. The switching elements 36–39 are unconductive because the outputs of gate circuits 32 and 33 are 0.

When the control signal $\phi 1$ is 1 and the signal $\phi 0$ is 0, the output of gate circuit 32 is 1. In this state, the switching elements 36 and 39 become conductive, so that the concatenated label data is applied onto the address bus ADD and the concatenation table data is transmitted onto the data bus DAT. The control signal /$\phi 1$ generated from the inverter circuit 34 goes to 0, the write enable input /WE of RAM 41 becomes active, and the RAM 41 attains the write enabled state. Thereby, the data writing is performed in such a manner that the concatenated label data is used as the address and the concatenation table data is used as the write data, so that the contents of the concatenation table are changed.

If both the control signals $\phi 1$ and $\phi 0$ are 1, the output of gate circuit 33 is 1, and the switching elements 37 and 38 become conductive. In this state, the concatenation table data is transmitted onto the address bus ADD, and the concatenated label data is transmitted onto the data bus DAT. Since the control signal /$\phi 1$ is 0 at this time, the data is written into the concatenation table (RAM 41) in such a manner that the concatenation table data is used as the address and the concatenated label is used as the write data.

If the control signal $\phi 1$ is 0 and the control signal $\phi 0$ is 1, outputs of the gate circuits 31, 32 and 33 are 0, and all the switching elements 35–39 become nonconductive, so that the address bus ADD and data bus DATA attain an output high impedance state (Z).

According to the structure described above, when the label diversion occurs (i.e., when the fifth condition for temporary label selection is satisfied), the data is written into the concatenation table (RAM 41) in such a manner that the smaller label value is used as the write data and the larger label value is used as the address.

The switching elements 35–39 shown in FIG. 37A may be replaced with CMOS transmission gates or three-state buffers.

Figure 38:
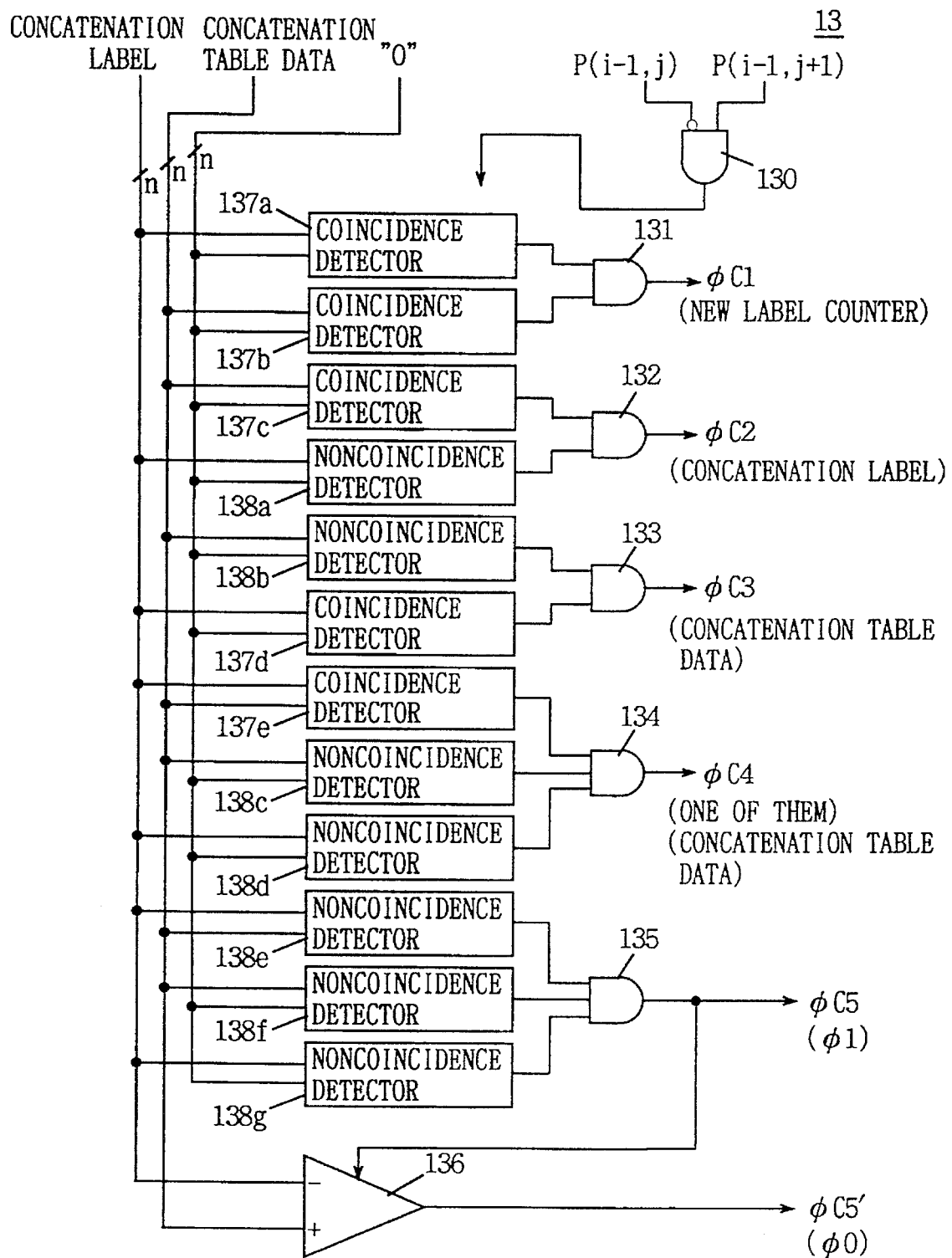
FIG. 38 shows an example of a specific structure of a temporary label selection controller shown in FIG. 30.

FIG. 38 shows an example of a structure of the temporary label selection controller shown in FIG. 30. In FIG. 38, the temporary label selection controller 13 includes two-input gate circuit 130 receiving the binary image data P(i−1, j) and P(i−1, j+1). The gate circuit 130 outputs a signal of 1 when the binary image data P(i−1, j) is 0 and the binary image data P(i−1, j+1) is 1. Thus, the gate circuit 130 detects the leading end of the adjacent run. When the gate circuit 130 supplies the output of 1, the temporary label selection controller 13 is enabled, so that the respective components which will be described below attain the operation enabled state.

The temporary label selection controller 13 further includes a coincidence detecting circuit 137a detecting coincidence between the concatenated label and fixed data 0, a coincidence detecting circuit 137b detecting coincidence between the concatenation table data and fixed data 0, a two-input gate circuit 131 receiving outputs of the coincidence detecting circuits 137a and 137b, a coincidence detecting circuit 137c detecting coincidence between the concatenation table data and fixed data 0, a noncoincidence detecting circuit 138a detecting noncoincidence between the concatenated label data and fixed data 0, a two-input gate circuit 132 receiving outputs of the coincidence detecting circuit 137c and noncoincidence detecting circuit 138a, a noncoincidence detecting circuit 138b detecting noncoincidence between the concatenation table data and fixed data 0, a coincidence detecting circuit 137d detecting coincidence between the concatenated label data and fixed data 0, and a two-input gate circuit 133 receiving outputs of the noncoincidence detecting circuit 138b and coincidence detecting circuit 137d.

Each of the coincidence detecting circuits 137a–137d outputs a signal of 1 when data values at both of its inputs are coincident with each other. Each of the noncoincidence detecting circuits 138a and 138b outputs a signal of 1 when data applied to both of its inputs are uncoincident with each other. Each of the gate circuits 131–133 outputs a signal of 1 when both of its inputs are 1. The gate circuit 131 generates a control signal $\phi C1$ for selecting the new label counter. The gate circuit 132 generates a control signal $\phi C2$ for selecting the concatenated label. The gate circuit 133 generates a control signal $\phi C3$ for selecting the concatenated label data.

Thus, the gate circuit 131 supplies the control signal $\phi C1$ of 1 when the first condition for temporary label selection (concatenated label=concatenation table data=0) is satisfied.

The gate circuit 132 supplies the control signal $\phi C2$ of 1 when the second condition for temporary label selection (concatenation table data=0 and concatenated label data≠0) is satisfied. The gate circuit 133 supplies the control signal $\phi C3$ of 1 when the third condition for temporary label selection (concatenation table data≠0 and concatenated label data=0) is satisfied.

The temporary label selection controller 13 further includes a coincidence detecting circuit 137e detecting coincidence between the concatenated label and concatenation table data, a noncoincidence detecting circuit 138c detecting noncoincidence between the concatenation table data and fixed data, a noncoincidence detecting circuit 138d detecting noncoincidence between the concatenated label data and fixed data 0, a three-input gate circuit 134 receiving outputs of the coincidence detecting circuit 137e, noncoincidence detecting circuit 138c and noncoincidence detecting circuit 138d, a noncoincidence detecting circuit 138e detecting noncoincidence between the concatenated label and concatenation table data, a noncoincidence detecting circuit 138f detecting noncoincidence between the concatenation table data and fixed data 0, a noncoincidence detecting circuit 138g detecting noncoincidence between the concatenated label and fixed data 0, a three-input gate circuit 135 receiving outputs of the noncoincidence detecting circuits 138e, 138*f* and 138*g*, and a comparator 136 comparing magnitudes of the concatenated label and concatenation table data.

The coincidence detecting circuit 137*e* outputs a signal of 1 when the applied data are coincident with each other. Each of the noncoincidence detecting circuits 138*c*–138*g* outputs a signal of 1 when the applied data are noncoincident with each other. Each of the gate circuits 134 and 135 outputs a signal of 1 when all of the three inputs applied thereto are 1. The comparator 136 outputs a signal of 1 when the value of the concatenation table data is larger than the value of the concatenated label.

The gate circuit 134 sets a control signal φC4 to 1 when the fourth condition for temporary label selection (concatenation table data≠0, concatenated label≠0 and concatenation table data=concatenated label) is satisfied. When the fourth condition for temporary label selection is satisfied, either the concatenation table data or concatenated label is selected, and the case is shown in FIG. 38 where the concatenation table data is selected.

The gate circuit 135 sets a control signal φC5 to 1 when the fifth condition for temporary label selection (concatenation table data≠0, concatenated label≠0, and concatenation table data≠concatenated label) is satisfied. At this time, the comparator circuit 136 is activated to perform comparison. If the concatenation table data is larger than the concatenated label, the control signal φC5' is set to 1. Otherwise, the control signal φC5' is set to 0. These control signals φC5 and φC5' are applied as the control signals φ1 and φ0 shown in FIG. 37 to the integrated label feeding portion 3. FIG. 37B shows a state in which the integrated label feeding portion 3 attains an output high impedance state when the control signals φ1 and φ0 are 0 and 1, respectively. In this state, the comparator circuit 136 shown in FIG. 38 is in the disabled state. The disabled comparator circuit 136 pulls up its output φC5' to 1.

The structure shown in FIG. 38 includes components respectively corresponding to the five conditions for temporary label selection. Several components perform the same operations, and these components are commonly used, whereby efficient circuitry including reduced number of components is achieved.

Figure 39:
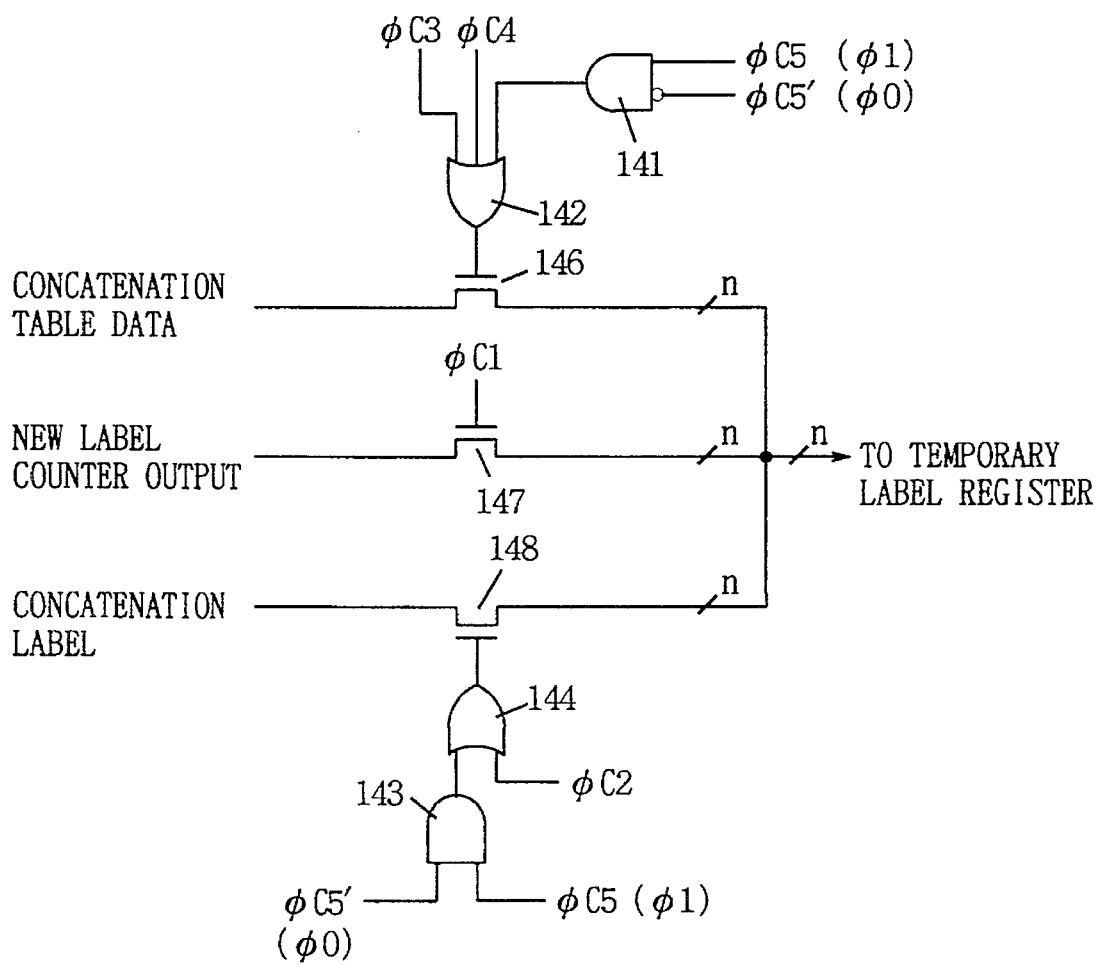
FIG. 39 shows an example of a specific structure of a temporary label selector shown in FIG. 30.

FIG. 39 shows an example of a specific structure of the temporary label selector shown in FIG. 30. In FIG. 39, the temporary label selector 14 includes a two-input gate circuit 141 receiving the control signals φC5 (φ1) and φC5' (φ0), a two-input gate circuit 142 receiving the output of gate circuit 141 as well as control signals φC3 and φC4, a two-input gate circuit 143 receiving control signals φC5 (φ1) and φC5' (φ0), a two-input gate circuit 144 receiving the output of gate circuit 143 and the control signal φC2, a switching element 146 which is responsive to the output of gate circuit 142 to become conductive and pass the concatenation table data therethrough, a switching element 147 which is responsive to the control signal φC1 to become conductive and pass the output of the new label counter therethrough, and a switching element 148 which is responsive to the output of gate circuit 144 to become conductive and pass the concatenated label therethrough.

The gate circuit 141 outputs a signal of 1 when the control signal φC5 (φ1) is 1 and the control signal φC5' (φ0) is 0. The gate circuit 142 outputs a signal of 1 when any one of the output of gate circuit 141, control signal φC3 and control signal φC4 is 1. The switching element 146 becomes conductive when the output of gate circuit 142 is 1. Thus, when one of the third to fifth conditions for temporary label selection is satisfied, the concatenation table data is selected and is transmitted as the temporary label to the temporary label register.

The switching element 147 becomes conductive when the control signal φC1 is 1. Thus, when the first condition for temporary label selection is satisfied, the output of the new label counter is selected as the temporary label and is transmitted to the temporary label register.

The gate circuit 143 outputs a signal of 1 when both the control signals φC5 (φ1) and φC5' (φ0) are 1. The gate circuit 144 outputs a signal of 1 when one of the output of gate circuit 143 and control signal φC2 is 1. The switching element 148 becomes conductive when the output of gate circuit 144 is 1. Therefore, the concatenated label is selected when the second or fifth condition for temporary label selection is satisfied.

When the fifth condition for temporary label selection is satisfied, whether the concatenation table data is selected or whether concatenated label is selected depend on the values of the control signals φC5 (φ1) and φC5' (φ0). If the value of the concatenation table data is larger than the value of the concatenated label, the control signal φC5' (φ0) is 0, and the concatenated label is transmitted as the temporary label via the switching element 148 to the temporary label register. If the concatenation table data is smaller than the concatenated label, the control signal φC5' (φ0) is 0, so that the concatenation table data is transmitted as the temporary label via the switching element 146 to the temporary label register.

In the structure shown in FIG. 39, the gate circuits 141–144 may be included in the temporary label selection controller 13.

The structures of circuits shown in FIGS. 31 to 39 have been described merely as an example, and any other circuit structures achieving the same logic may be employed.

The new label counter 18 increments its count merely in response to a control signal φCA1, so that it can be formed of conventional an n-bit binary counter. The temporary label register 15 is formed of a conventional latch circuit having a reset function, and latches its output after the output of temporary label selector 14 is decided.

According to the second embodiment, as described above, the concatenation table is referred to upon detection of the leading end of the adjacent run, and the temporary label is determined in accordance with the concatenation table data thus referred to and the concatenated label. Also, the contents of the concatenation table are changed if the label diversion occurred. Therefore, occurrence of the label diversion can be suppressed remarkably, so that a load in the table analysis is remarkably reduced, and thus relabeling for the temporary labels can be performed at a high speed.

(iii) Third Embodiment

Figure 40:
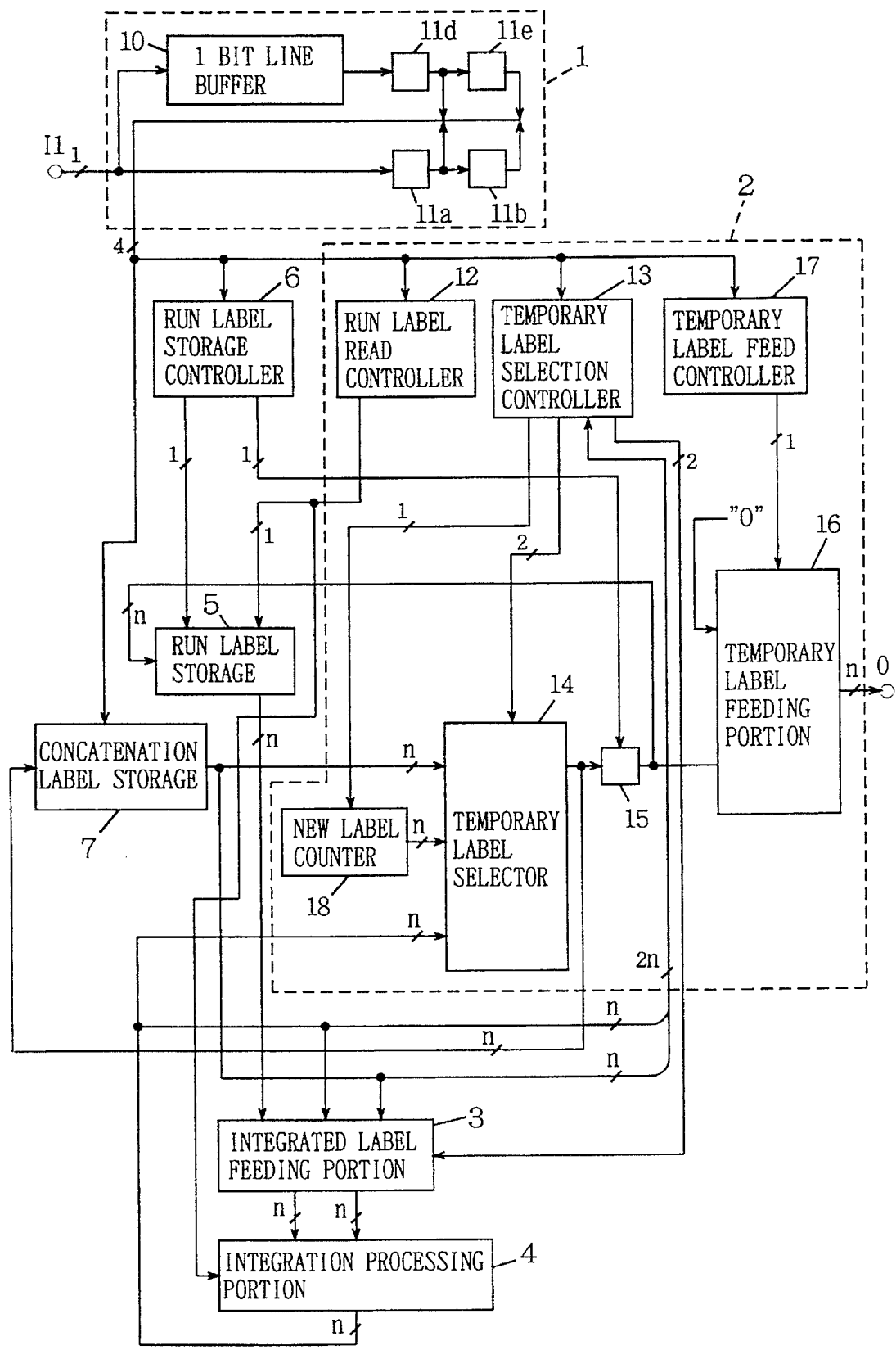
FIG. 40 shows a whole structure of a labeling circuit of a third embodiment of the invention.

FIG. 40 shows a structure of a labeling circuit according to a third embodiment of the invention. The labeling circuit shown in FIG. 40 differs from the labeling circuit of the second embodiment in that the mask forming portion 1 produces a binary mask formed of a local image region of pixels in two rows and two columns. Other circuits have functions similar to those of the second embodiment, and corresponding portions and parts bear the same reference numbers.

Figure 41:
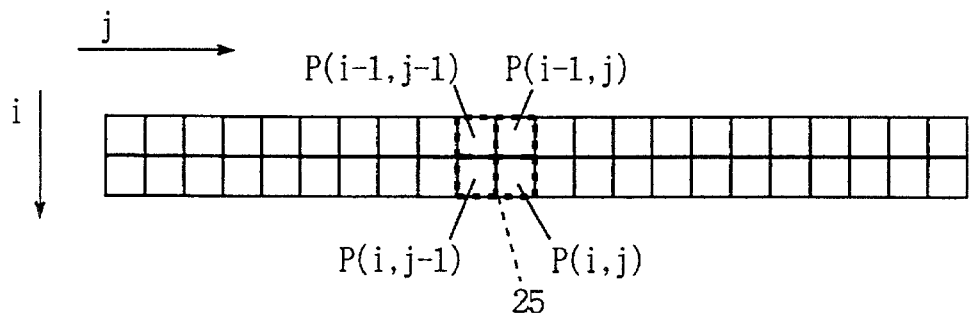
FIG. 41 shows a structure of a binary mask produced by the labeling circuit of the third embodiment.

The mask forming portion 1 includes the one-bit line buffer 10 which delays the input binary image data (I1) by a time period corresponding to one row, the shift register or one-bit register 11*a* which delays the input binary image data by one pixel's worth of time period, the shift register or one-bit register 11b which further delays the output of one-bit register 11a by one pixel's worth of time period, the shift register or one-bit register 11d which delays the output of line buffer 10 by one pixel's worth of time period, and the shift register or one-bit register 11e which delays the output of one-bit register 11d by one pixel's worth of time period. The binary mask is produced from outputs of one-bit registers 11a, 11b, 11d and 11e. Therefore, the produced binary mask includes the binary image data P(i, j), P(i, j–1), P(i–1, j) and P(i–1, j–1) as shown in FIG. 41.

The reference run and adjacent run are scanned by the upper and lower rows of a binary mask 25. The leading end of the reference run is detected in accordance with the condition of P(i, j–1)=0 and P(i, j)=1. The trailing end of the reference run is detected in accordance with the condition of P(i, j–1)=1 and P(i, j)=0.

Similarly, the leading end of adjacent run is detected in accordance with the condition of P(i–1, j–1)=0 and P(i–1, j)=1. Interruption of the adjacent run and reference run is detected in accordance with the condition of P(i, j)=P(i–1, j)=0. The five conditions used for temporary label selection are the same as those in the second embodiment except for these positional conditions for detection. Operations will be described below.

In the initial state, the count of the new label counter has been set to 1, the data held in the temporary label register has been set to 0 and the data held in the concatenated label storage has been set to 0. No run label is stored in the run label storage.

Figure 42:
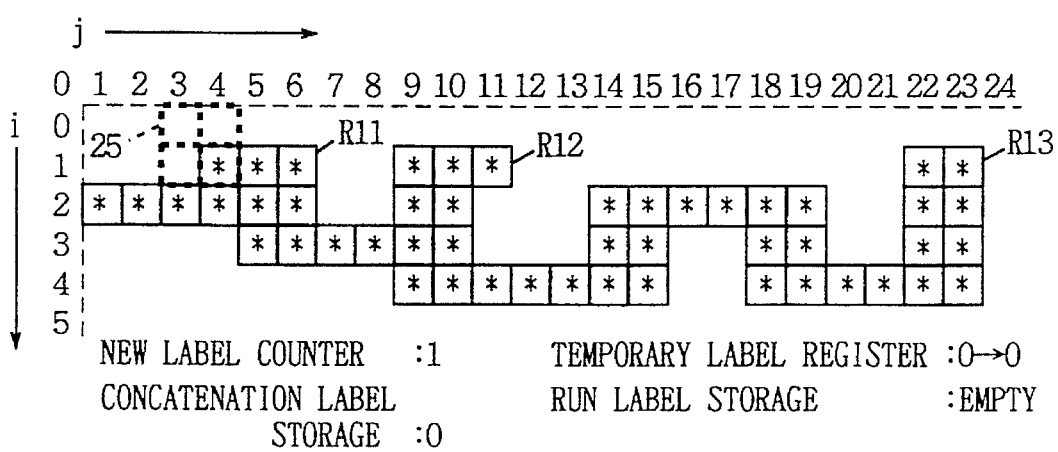
FIGS. 42–52 each show forms of a binary image in each operation step of the labeling circuit of the third embodiment.

As shown in FIG. 42, when the binary mask 25 detects the leading end of reference run R11, the run label storage controller 6 resets the temporary label register 15 to 0, because a pixel of 1 is not present except for the reference pixel P(1, 4). Since the run label storage 5 has stored no run label, the concatenation table is not accessed in any way.

Figure 43:
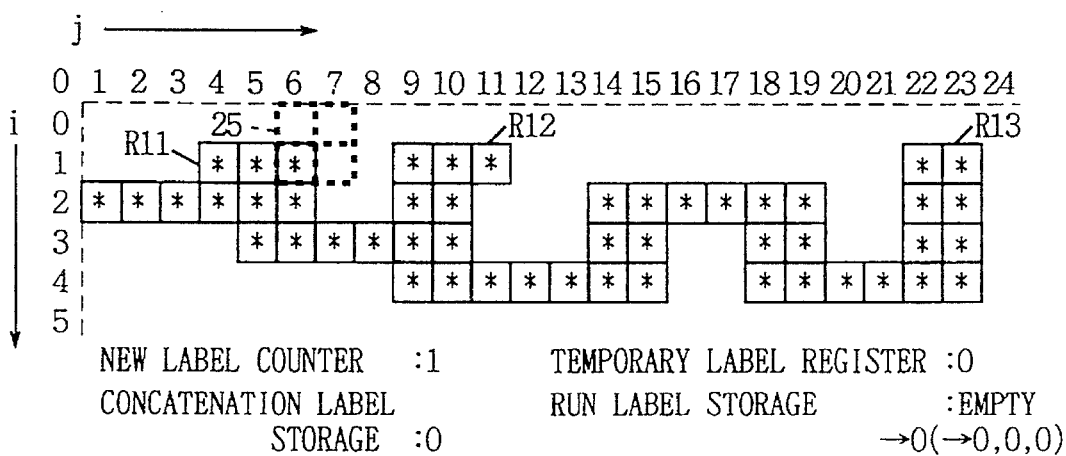

As shown in FIG. 43, when the binary mask 25 reaches the trailing end of reference run R11, the output of temporary label register 15 is stored in the run label storage 5 in response to detection of the trailing end of reference run R11. Since no adjacent run has been present for the reference run R11, the output data 0 of temporary label register 15 is stored as the run label for this reference run R11 in the run label storage 5.

The binary mask 25 successively scans the reference runs R12 and R13. Similarly to the operation for the reference run R11, the run label 0 is assigned to each of these reference runs R12 and R14 before storage in the run label storage 5. In the state where the scanning of this row is completed, the run label storage has stored the run labels 0 for the respective runs R11, R12 and R13.

Figure 44:
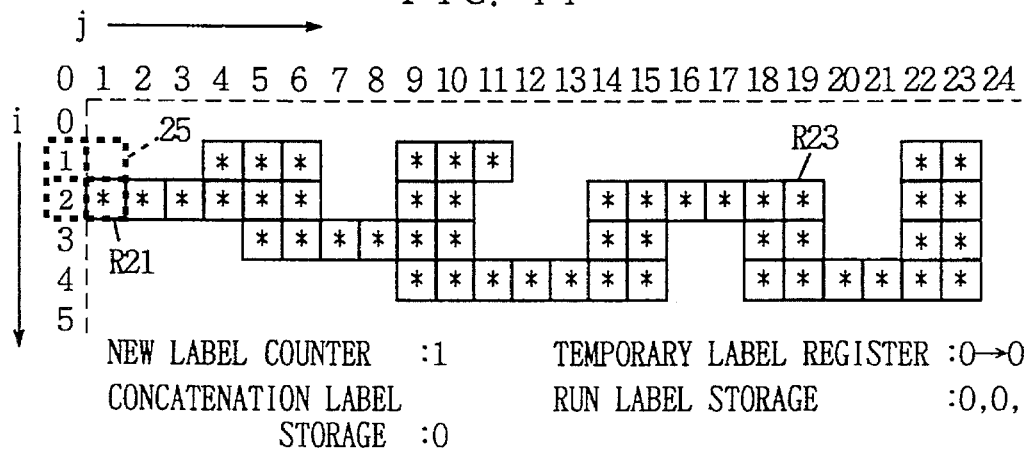

As shown in FIG. 44, when the binary mask 25 scans the next row and detects the leading end of reference run R21, the temporary label register is reset to 0 and the concatenated label supplied from the concatenated label storage 7 maintains 0, because all the pixels on the upper row in the binary mask 25 are 0 also in this case.

Figure 45:
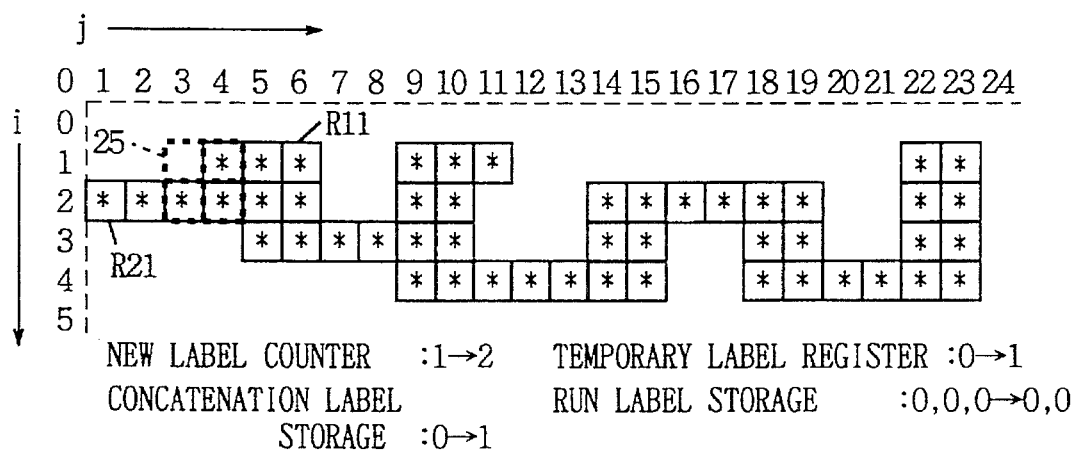

As shown in FIG. 45, when the binary mask 25 detects the leading end of the adjacent run R11, the run label 0 is read from the run label storage 5 under the control of the run label storage controller 6, and the read instruction signal (read signal) is applied from the run label read controller 12 to the integration processing portion 4. In response to this read signal, the integration processing portion 4 reads the contents of the concatenation table using the run label, which is applied through the integrated label feeding portion 3, as the address. The data stored at the address 0 in the concatenation table is in the initial state and hence is 0.

The temporary label selection controller 13 receives the concatenated label 0 and the concatenation table data 0 from the concatenated label storage 7 and integration processing portion 4, respectively, and determines the count 1 supplied from the new label counter 18 as the temporary label in accordance with the first condition for temporary label selection. The temporary label selector 14 selects the output count of new label counter 18 in accordance with the result of determination applied from the temporary label selection controller 13, and transmits the same to the temporary label register 15. Thereby, the temporary label register 15 holds the value of 1. In accordance with satisfaction of the first condition, the count of new label counter 18 is counted up from by one to 2. The concatenated label storage 7 latches the data 1 supplied from the temporary label selector 14, and outputs the concatenated label 1.

Figure 46:
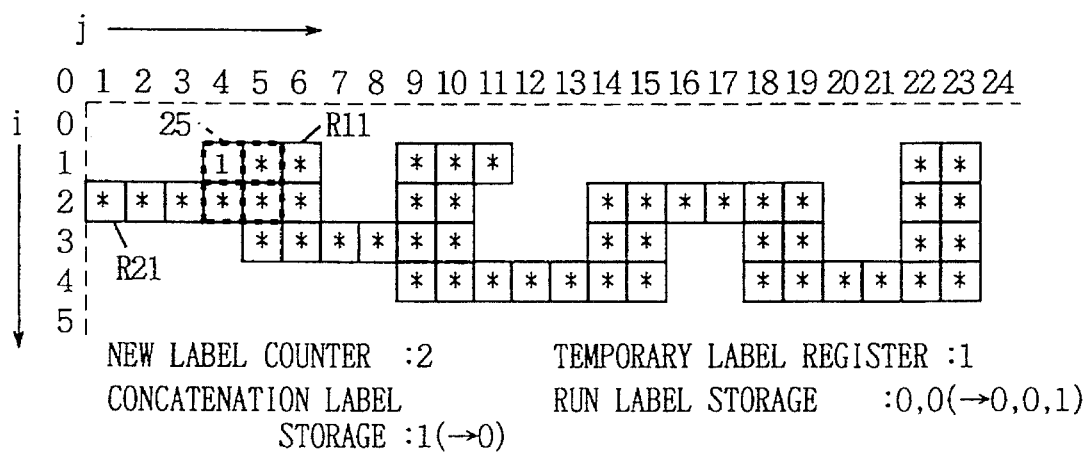

As shown in FIG. 46, when the binary mask 25 shifts rightward by one pixel, data of the left upper pixel in the binary mask 25 goes to 1. Data supplied from the temporary label register 15 is 1, and the temporary label feed controller 17 applies the control signal for selecting this output of temporary label register 15 to the temporary label feeding portion 16. The temporary label feeding portion 16 selects and outputs the data, which is supplied from the temporary label register 15, as the temporary label in accordance with the selection control signal sent from the temporary label feed controller 17. Thus, the temporary label 1 is assigned to the pixel (1, 4).

When the binary mask 25 further shifts rightward by two pixels, both the data of pixels at the right ends of the upper and lower runs go to 0. Thereby, the concatenated label storage 7 detects interruption in the reference run and adjacent run. In accordance with detection of the trailing end of the adjacent run, the label value 1 supplied from the temporary label register 15 is stored in the run label storage 5, and the concatenated label supplied from the concatenated label storage is reset to 0.

Figure 47:
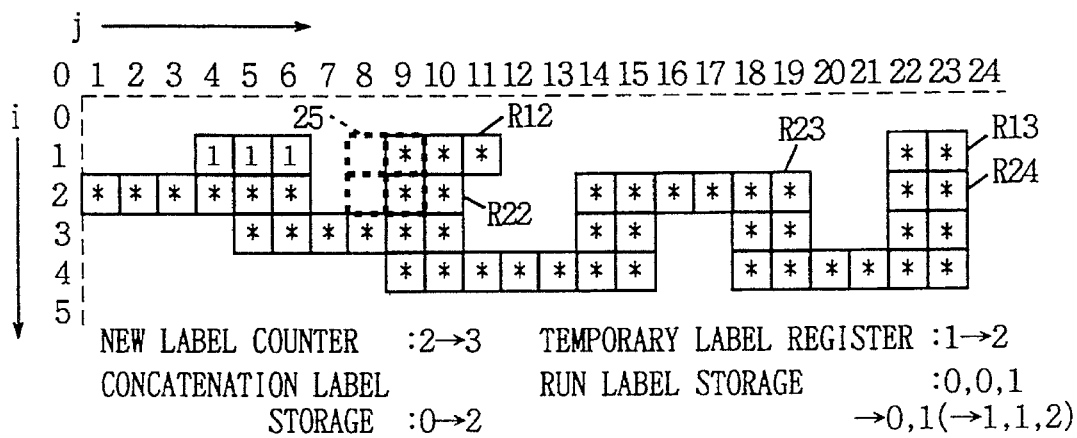

When the binary mask 25 further shifts rightward to a position shown in FIG. 47, the leading ends of reference run R22 and adjacent run R12 are simultaneously detected. In response to detection of the leading end of adjacent run R12, the run label 0 related to this adjacent run R12 is read from the run label storage 5. Using this read run label 0 as the address, data is read from the concatenation table contained in the integration processing portion 4. Since the data 0 is stored at the address 0 in the concatenation table, and the concatenated label supplied from the concatenated label storage 7 is 0, the count 2 supplied from the new label counter 18 is selected as the temporary label in accordance with the first condition for temporary label selection. This temporary label 2 is also applied to the concatenated label storage 7, so that the concatenated label changes from 0 to 2. The count of new label counter 18 is changed by one to 3. The label 2 is supplied for the pixel in the adjacent run R12.

When the trailing end of reference run R22 is detected, the run label storage 5 stores this temporary label 2 as the run label for the reference run R22 under the control of the run label storage controller 6.

In the operation for scanning the reference run R23, the run label 0 is stored in the run label storage 5 (i.e., temporary label register 15 is reset to 0) when the trailing end of this reference run R23 is detected, because a run concatenated to the reference run R23 does not exist.

For the adjacent run R13 and reference run R24, operations are performed similarly to those for the runs R12 and R22. The run label 3 is assigned to the reference run R24 and stored in the run label storage 5. For each pixel in the adjacent run R13, the temporary label 3 is supplied.

Figure 48:
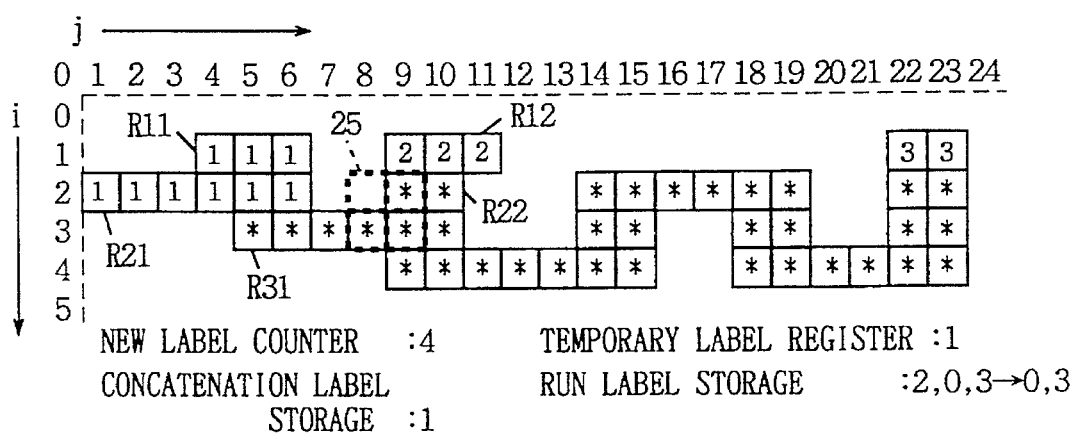

As shown in FIG. 48, after the binary mask 25 starts scanning of the next rows, i.e., second and third rows, the leading end of adjacent run R21 is first detected. Since the run label of adjacent run R21 is 1 and the concatenation table has still maintained the initial state, the concatenation table data is 1. Since the concatenated label is 0, the temporary label selection controller 13 selects the concatenation table data 1 as the temporary label and concatenated label in accordance with the third condition for temporary label selection. This label value 1 is selected and supplied as the temporary label for the pixel in the adjacent run R21.

When the binary mask 25 detects the reference run R31, the concatenated label value 1 is propagated to each pixel in the reference run R31, because the concatenated label storage 7 continuously holds the label value 1 for the reference run R31.

When the binary mask 25 detects the leading end of adjacent run R22, the run label 2 is read from the run label storage 5 for the adjacent run R22. Since the concatenation table has still maintained the initial state, the read concatenation table data is 2. Since the concatenated label is 1 and the concatenation table data is 2, the temporary label selection controller 13 determines the concatenated label 1 of a smaller label as the temporary label in accordance with the fifth condition for temporary label selection. Under the control of the temporary label selection controller 13, the temporary label selector 14 selects the concatenated label 1 supplied from the concatenated label storage 7 as the temporary label, and transmits it to the temporary label register 15.

In the above process, since the fifth condition for temporary label selection was satisfied, the label diversion has occurred, so that the data of the address 2 in concatenation table is changed into 1. The state of the concatenation table at this time is the same as that shown in FIG. 12.

The temporary label value 1 is appended to the pixel belonging to the adjacent run R22 and is outputted. When the trailing end of reference run R31 is detected, the run label 1 supplied from the temporary label register 15 is stored in the run label storage 5.

Figure 49:
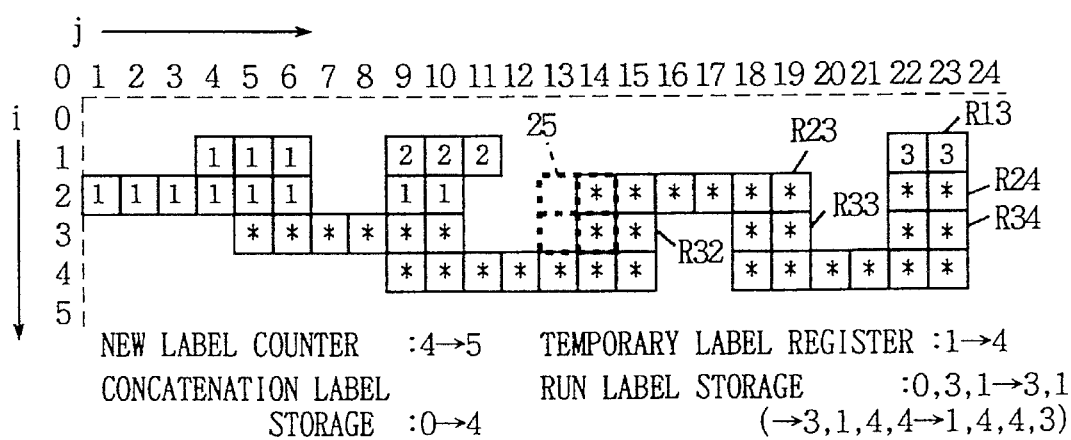

As shown in FIG. 49, when the binary mask 25 detects the leading end of adjacent run R23, the run label 0 of this adjacent run R23 is read from the run label storage 5. The concatenated label was reset in response to interruption of the reference run and adjacent run, and hence is 0. Meanwhile, the data 0 is stored at the address 0 in the concatenation table. Therefore, the count 4 of new label counter 18 is selected as the temporary label in accordance with the first condition for temporary label selection, and both the temporary label and concatenated label go to 4. The temporary label 4 is assigned to the pixel forming the adjacent run R23 and is outputted.

Meanwhile, for the reference runs R32 and R33, the temporary label 4 is stored as the run label in the run label storage 5 when each trailing end thereof is detected.

For the adjacent run R24, the label of the run R13 on the upper row is propagated, and the data at the address 3 in the concatenation table is 3, so that the label 3 is assigned in accordance with the third condition for temporary label selection.

When the binary mask 25 further scans the subsequent rows, i.e., third and fourth rows, the leading end of adjacent run R31 is first detected. In response to this detection, the run label and concatenation table are searched, and the run label 1 and the concatenation table data 1 are obtained. Since the concatenated label is 0, the relationship of temporary label=concatenated label=1 is obtained in accordance with the third condition for temporary label selection. The concatenated label 1 thus determined is propagated to the reference run R41.

Figure 50:
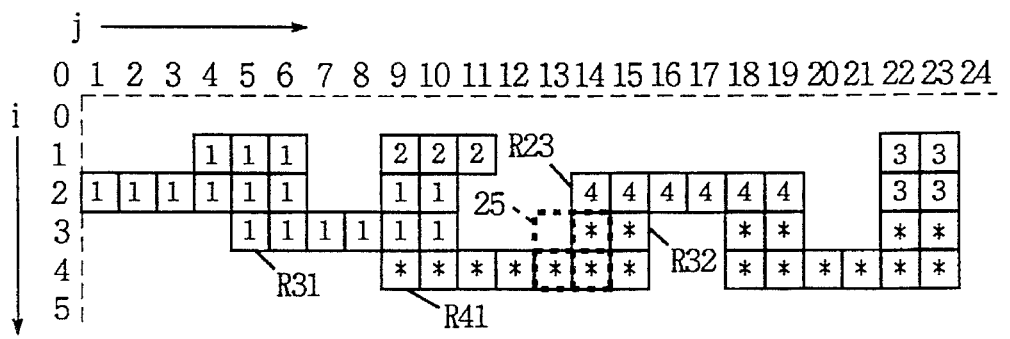

When the binary mask 25 detects the leading end of adjacent run R32 as shown in FIG. 50, the data 4 is read from the concatenation table in accordance with the corresponding run label 4. Since the concatenated label is 1 and the concatenation table data is 4, the temporary label is equal to the concatenated label which is equal to 1 in accordance with the fifth condition for temporary label selection. Since different labels are assigned to the same object, the contents of the concatenation table are changed, and the data of 1 is stored at the address 4 in the concatenation table. At this state, the contents of the concatenation table are the same as those shown in FIG. 15. To the pixel belonging to the adjacent run R32 is applied the temporary label value 1. When the trailing end of reference run R41 is detected, the run label 1 is stored in the run label storage 5.

Figure 51:
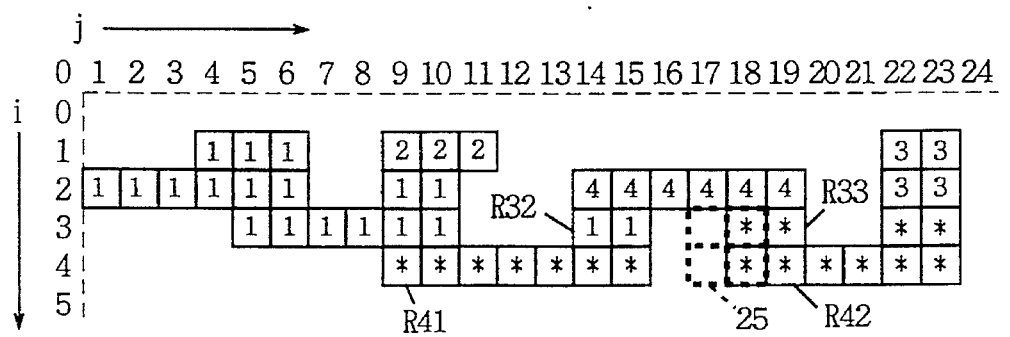

When the binary mask 25 detects the leading end of adjacent run R33 as shown in FIG. 51, the run label 4 is read from the run label storage 5 again, and the data at the address 4 is read from the concatenation table. The data at the address 4 in the concatenation table has already been changed into the data 1 in accordance with detection of the adjacent run R32. Since concatenated label is 0, the temporary label 1 is selected for each pixel in the adjacent run R33 in accordance with the third condition for temporary label selection, so that the temporary label equals the concatenated label which is equal to 1. The temporary label value 1 is applied to each pixel belonging to the adjacent run R33.

Figure 52:
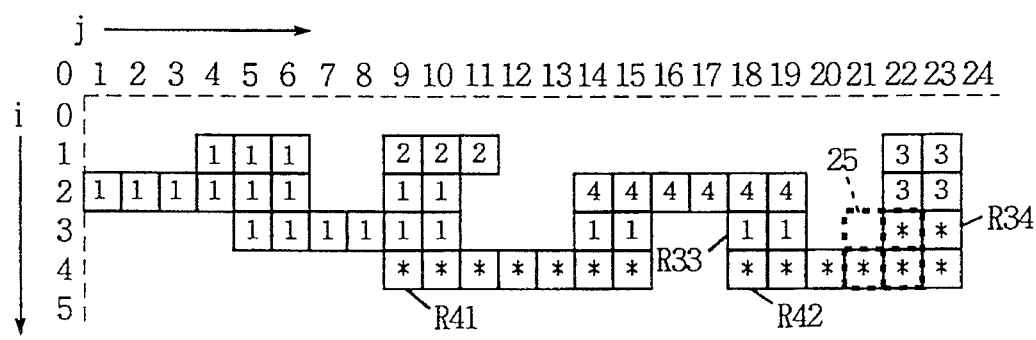

As shown in FIG. 52, when the binary mask 25 detects the leading end of adjacent run R34, the run label 3 is read from the run label storage 5. The data 3 is stored at the address 3 in the concatenation table. At this time, the concatenated label storage 7 has stored the concatenated label 1 propagated from the adjacent run R33 via the reference run R42. Therefore, both the temporary label and concatenated label go to 1 in accordance with the fifth condition for temporary label selection. At this time, the data at the address 3 in the concatenation table is changed into 1, since the label diversion has occurred. As a result, the concatenation table has the same contents as those shown in FIG. 18.

In accordance with detection of trailing end of reference run R42, the run label 1 for the reference run R42 is stored in the run label storage 5.

When the binary mask 25 scans the final row, the label 1 is applied to the adjacent runs R41 and R42, and the temporary label 1 is assigned to each pixel. The obtained temporary label image is the same as that shown in FIG. 20. The temporary label image ultimately obtained and the contents of the concatenation table are the same as those shown in FIGS. 18 and 20, so that the label integrating process can be performed only by using the concatenation table. It is analyzed that the runs bearing the labels 2, 3 and 4, respectively, are concatenated to the run (or pixels) bearing the label 1. Therefore, the result of label integrating process is stored in the concatenation table without performing the label integrating process.

The temporary label image is relabeled using the concatenation table of which integrating process has been completed, whereby the same labeling image as that shown in FIG. 21 is obtained.

As described above, even in the case where the labeling of the binary image is performed using the binary mask in two rows by two columns, the labeling circuit which can remarkably reduce the load in the process of integrating the labels is obtained, as is done in the first and second embodiments. Further, the binary mask extracts only the local image region formed of pixels in two rows by two columns, so that the device scale can be remarkably reduced.

Each component of the labeling circuit in the third embodiment can have the structure similar to that used in the second embodiment. The difference between the second and third embodiments is merely the pixel positions of the binary image data utilized when the leading end of the adjacent run and the trailing end and the leading end of the reference run are detected. Control circuits used in the third embodiment can have the completely same structures as those in the second embodiment.

(iv) Fourth Embodiment

Figure 53:
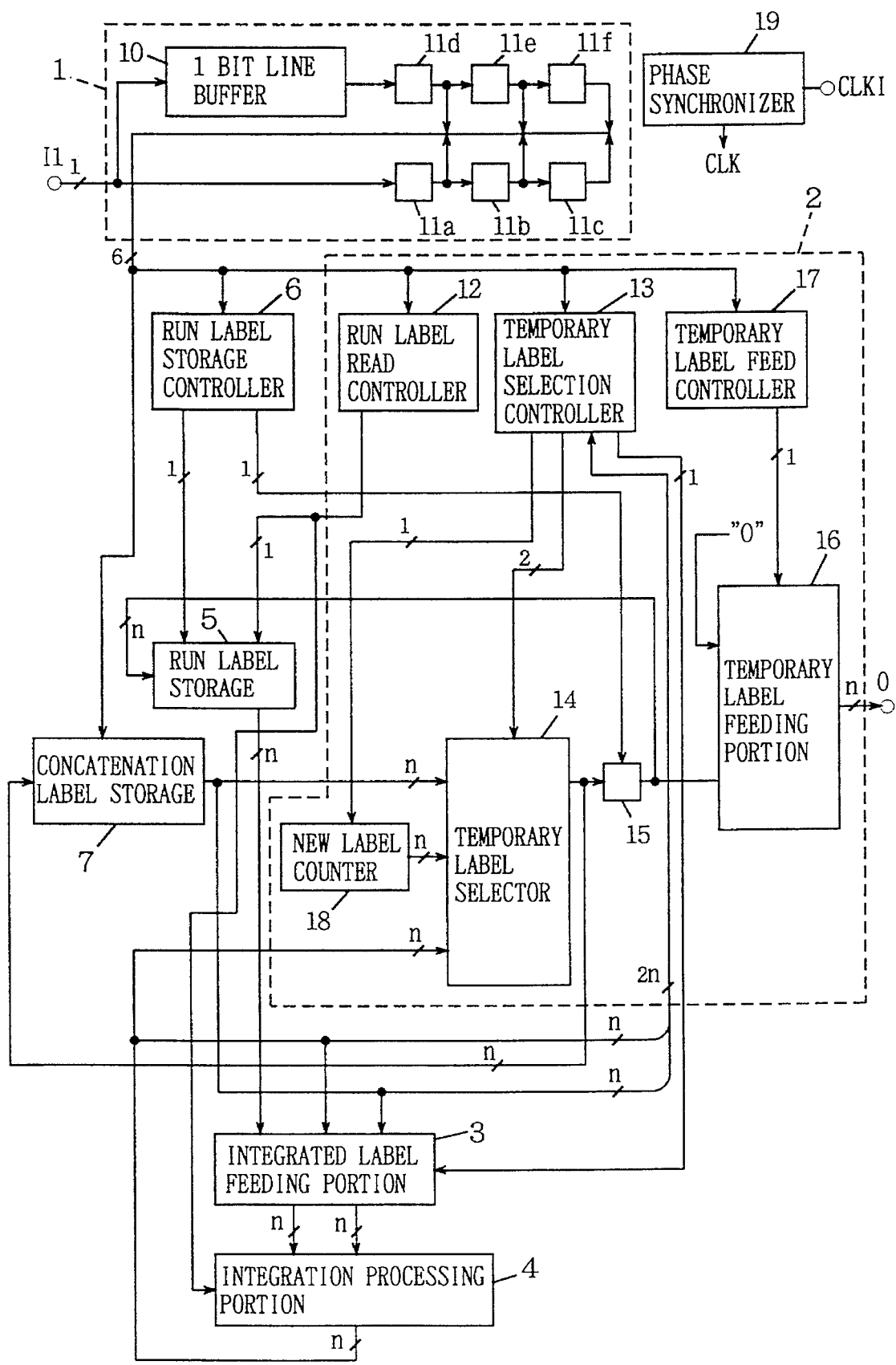
FIG. 53 shows a whole structure of a labeling circuit of a fourth embodiment of the invention, respectively.

FIG. 53 shows a structure of a labeling circuit of a fourth embodiment of the invention. The labeling circuit shown in FIG. 53 includes a phase synchronizer 19 in addition to the structure of the labeling circuit shown in FIG. 30. The phase synchronizer 19 performs frequency multiplication of an external clock signal CLKI to generate an internal clock signal CLK. The external clock signal CLKI has the same frequency as an input frequency of the binary image data applied to the mask forming portion 1. The mask forming portion 1 receives the binary image data in synchronization with the external clock signal CLKI. The mask forming portion 1 takes in the binary image data in synchronization with this external clock signal CLKI, and produces and outputs the binary mask. The components such as the temporary label determining portion 2, integrated label feeding portion 3, integration processing portion 4, run label storage controller 6, run label storage 5 and concatenated label storage 7 operate in synchronization with the internal clock signal CLK sent from the phase synchronizer 19.

Figure 54A:
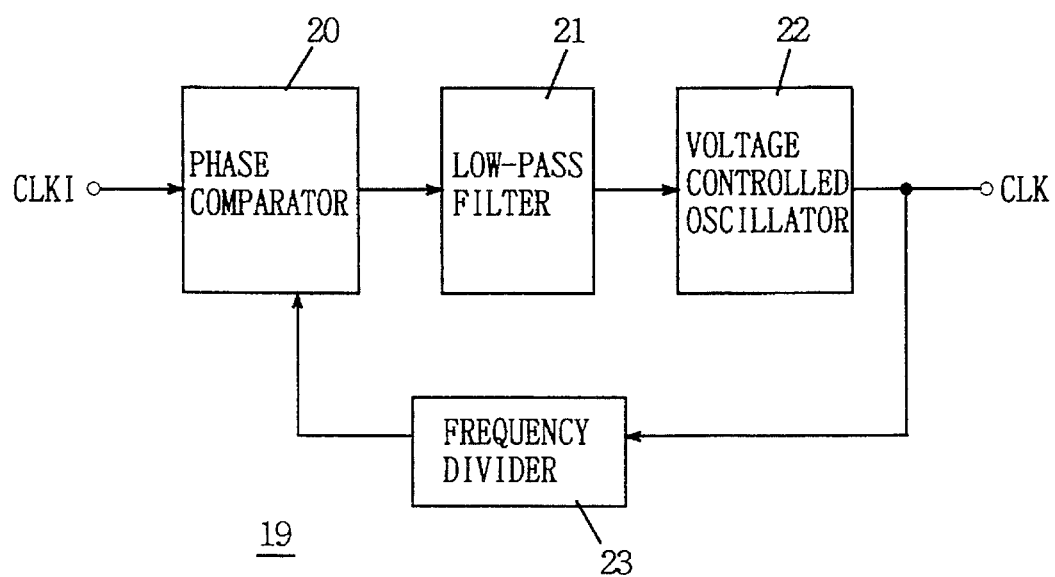
FIGS. 54A and 54b show a specific structure of a phase synchronizing circuit shown in FIG. 53 and an operation waveform thereof, respectively.
Figure 54B:

FIGS. 54A and 54B show the structure and operation of the phase synchronizing circuit, respectively. In FIG. 54A, the phase synchronizer circuit 19 includes a frequency divider 23 which divides the frequency of the applied signal by a constant number, a phase comparator 20 which compares the phases of the external clock signal CLKI with the divided clock signal sent from the frequency divider 23, a low-pass filter 21 which passes only a low frequency component of the phase difference signal sent from the phase comparator 20, and a voltage controlled oscillator 22 which produces the internal clock signal CLK in accordance with the output of low-pass filter 21. The clock signal CLK is supplied from the voltage control oscillator 22 to the frequency divider 23. Now, an operation will be briefly described below.

The phase comparator 20 detects a phase difference between the externally applied clock signal CLKI and the clock signal which the frequency divider 23 produces by dividing the clock signal CLK by a constant number, and produces an output signal corresponding to the detected phase difference. The low-pass filter 21 removes harmonic components and noises contained in the phase difference signal sent from the phase comparator 20, and produces a voltage for controlling an oscillation of the voltage controlled oscillator 22. The voltage controlled oscillator 22 produces a clock signal CLK having a frequency proportional to the signal voltage applied from the low-pass filter 21. The clock signal CLK is divided in frequency by the frequency divider 23 to have a lower frequency, and is applied to the phase comparator 20. The output of voltage control oscillator 22 is divided by the frequency divider 23 and is applied to the phase comparator 20, whereby one feedback loop is formed.

The phase synchronizer 19 produces the clock signal CLK, which is synchronized with the external clock signal CLKI and has the frequency equal to the product of the constant number and the frequency of the externally applied clock signal CLKI. FIG. 54B shows a waveform in the case where the frequency of external clock signal CLKI is multiplied by a factor of five to produce the clock signal CLK.

In the initial state of the phase synchronizer 19, the external clock signal CLKI and the clock signal CLK have different phases, and the clock signal CLK does not have an intended frequency.

The output signal of voltage controlled oscillator 22 is fed back to the phase comparator 20 via the frequency divider 23 for detecting the phase difference, and this phase difference is converted into a voltage to change the frequency of the clock signal produced by the voltage controlled oscillator 22. This operation is converged by a feedback loop, so that the clock signal CLK produced by the voltage controlled oscillator 22 stably has the intended frequency as shown in FIG. 54B and also has the phase synchronized with the external clock signal CLKI.

Meanwhile, the process carried out by the labeling circuit includes a plurality of steps as shown in the process flow in FIG. 1. The respective steps are performed in a pipeline form in accordance with the clock signal CLK. Therefore, a plurality of processes required per the input of data of one pixel are surely performed within one cycle of the external control signal CLKI. The temporary label feeding portion 16 supplies the temporary label or the fixed data 0, which is internally determined in accordance with 1 or 0 of data of the labeled object pixel (adjacent reference pixel: upper central pixel in the binary mask 24). This outputted temporary label value changes with the same frequency as the external clock signal CLKI.

In the process flow diagram of FIG. 1, when the run on the upper row, i.e., the leading end of the adjacent run is detected, the run label is read from the run label storage 5, and the contents of concatenation table contained in the integration processing portion 4 are referred to. The temporary label is determined using the concatenation table data thus referred to and the concatenated label supplied from the concatenated label storage 7. If it is found that the label diversion occurred when the temporary label is determined, it is necessary to rewrite the contents of the concatenation table. For this rewrite, it is necessary to use the concatenated label before the change. The concatenated label storage 7 has finally stored the data value equal to the determined temporary label. Thus, the operation for making the concatenated label equal to the temporary label is carried out. Therefore, when the label diversion occurred, it is necessary to perform the data latching by the concatenated label storage 7 after the writing data into the concatenation table. In connection with this, the processes can be surely pipelined by using the internal clock signal CLK, and thus the processes can be surely performed without causing offsetting in the timing for writing and reading data.

Such a structure may be employed that the integration processing portion 4 is provided with a latch circuit which latches the concatenated label supplied from the concatenated label storage 7 upon detection of the adjacent run, and the contents of concatenation table are changed by using the concatenated label latched in this latch circuit. According to this structure, the concatenated label storage 7 can latch the temporary label when the temporary label supplied from the temporary label selector 14 is decided, so that the process for equalizing the concatenated label to the temporary label can be performed in parallel with the change of the concatenation table.

In order to write data into the concatenation table, the read signal (output enable signal) supplied from the run label read controller 12 must be inactive. Therefore, the operation for reading and writing data from and into the concatenation table can be surely performed in a pipeline form by using the clock signal CLK sent from the phase synchronizer 19, and the process can be easily performed without using a delay circuit for timing adjustment.

Also, by using the internal clock signal CLK, the operation timings of process blocks, which follows the respective determining blocks shown in the process flow diagram of FIG. 1, can be the same regardless of whether diversion occurs, so that the same processes can be always performed at the same timing regardless of the state of the run in the local image region extracted by the binary mask, and the process can be surely performed within one clock cycle of the external clock signal CLKI.

The pipelined processes described above can be easily implemented by such a structure that a clock counter (not shown) is provided for counting the clock signal CLK generated by the phase synchronizer 19 and each circuit is activated in accordance with specific counts. The timing at which the temporary labels from the temporary label feeding portion 16 is decided may be equal to or different from the input timing of the externally supplied binary image data. It is required only to use the same frequency for the input of the binary image data and the output of the temporary label.

According to the fourth embodiment, as described above, the labeling circuit which processes the binary mask formed of the binary image data in two rows by three columns has such a structure that each component operates in accordance with the clock signal having the frequency formed by frequency-multiplying external clock signal. Therefore, the labeling processes and operations required for the input of one pixel are surely completed within one cycle period of the external clock signal. Also, the internal components can be driven and operated in the pipeline form, so that the relabeling process can be surely performed at a high speed.

(v) Fifth Embodiment

Figure 55:
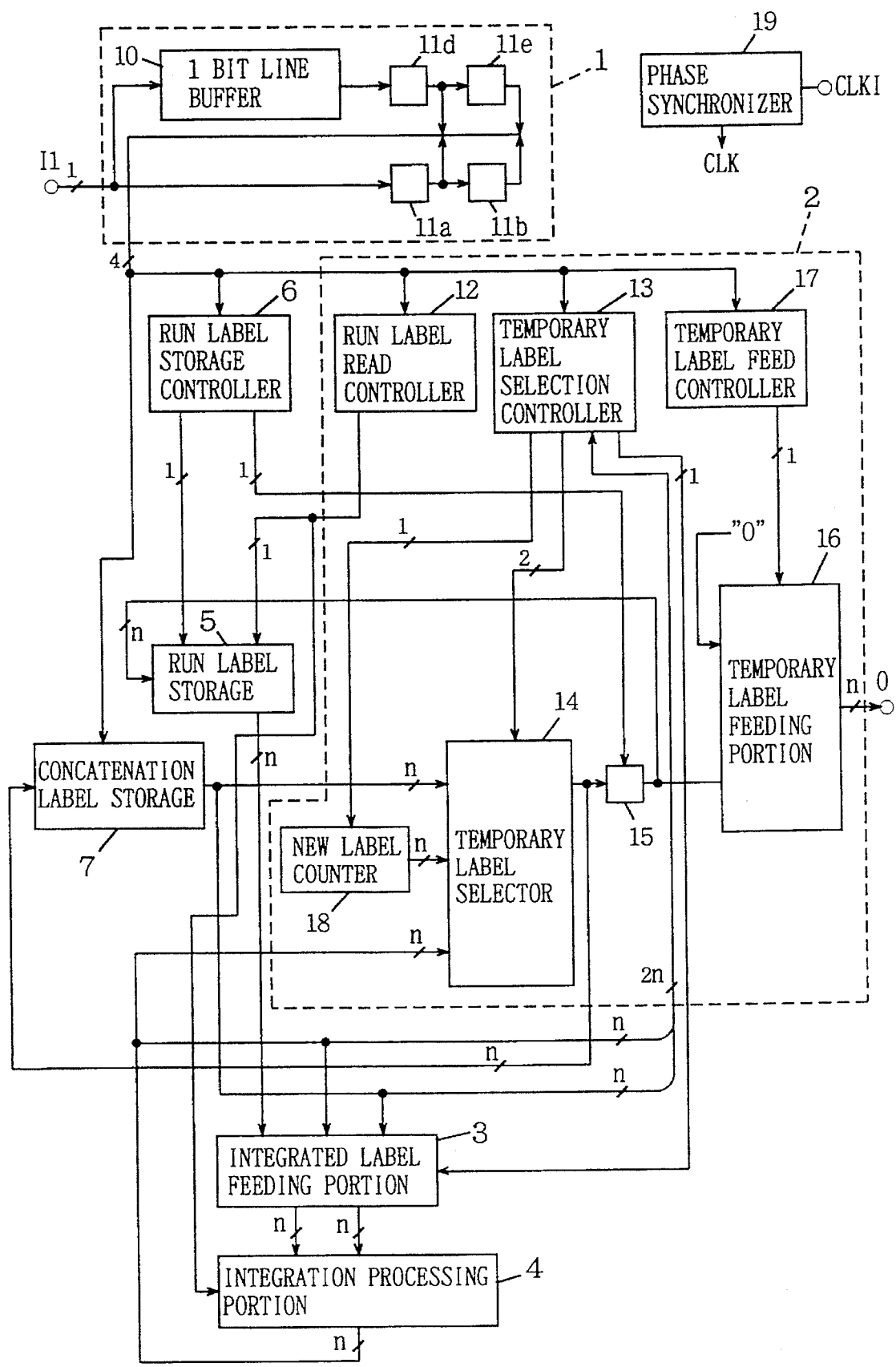
FIG. 55 shows a whole structure of a labeling circuit of a fifth embodiment of the invention.

FIG. 55 shows a structure of a labeling circuit according to a fifth embodiment of the invention. The labeling circuit shown in FIG. 55 includes the phase synchronizer 19 in addition to the structures of the labeling circuit shown in FIG. 40. The phase synchronizer 19 has the structure similar to that shown in FIG. 53, and thus generates the clock signal CLK having a multiplied frequency of and the phase-synchronized with the external clock signal CLKI. Each component in the labeling circuit operates in accordance with the clock signal sent from the phase synchronizer 19. An operation of the circuit structure shown in FIG. 55 will be briefly described below.

The clock signal CLKI having the frequency equal to the frequency of application of an input binary image data I1 is applied to the phase synchronizer 19. The input binary image data may be applied to the mask forming portion 1 in synchronization with the external clock signal CLKI. Each component in the labeling circuit operates in accordance with the clock signal CLK which has the frequency equal to a product of the frequency of external clock signal CLKI and a constant number as well as the phase synchronized with the phase of the external clock signal CLKI.

At each cycle of the external clock signal CLKI, binary image data is externally applied to the mask forming portion 1. The mask forming portion 1 produces the binary mask 25 which extracts a local image region including two pixels in the horizontal direction and two pixels in the vertical direction, i.e., pixels in two rows by two columns. Each of the controllers 12 and 13 included in the temporary label determining portion as well as the run label storage controller 6 and concatenated label storage 7 decode the binary mask 25 and perform necessary processing. In these operations, each circuit component operates in accordance with the clock signal CLK having the multiplied frequency and produced by the phase synchronizer 19, whereby a plurality of processes (steps shown in FIG. 1) required per input of one binary image can be surely performed within one cycle of the external clock signal CLKI.

The temporary label feeding portion 16 supplies either the determined temporary label or the fixed data 0 in accordance with data of the pixel to be labeled (i.e., upper left pixel in the binary mask 25). The output temporary label supplied from the temporary label feeding portion 16 changes at the same frequency as the external clock signal CLKI. The output temporary label may be outputted at a timing not synchronized with the external clock signal CLKI.

All the processes such as reference to the concatenation table upon detection of the leading end of the adjacent run, change of the contents of the concatenated label upon occurrence of label diversion and change of the concatenated label are performed in synchronization with the clock signal CLK supplied from the phase synchronizer 19. Since the components operate using the frequency-multiplied clock signal CLK, it is not necessary to provide a delay circuit 73, for example, in the structure of the concatenated label storage shown in FIG. 73, and the processes can be surely performed. The operation for reading from and writing into the concatenation table contained in the integration processing portion 4 can be surely performed in a pipeline manner and a time division multiplexing manner, and thus the labeling process can be surely performed.

In the structure already described with reference to FIG. 36, the RAM 41 receives the output enable input OE and write enable input /WE through separate pin terminal. Alternatively, RAM 41 may be provided with a common pin for receiving them. This is allowed because there is difference in time between the generation of the read signal applied from the run label read controller 12 and the write of data into the concatenation table which is performed via the integrated label feeding portion 3 under the control of the temporary label selection controller 13, and the read and the write with respect to the concatenation table are performed in a time divisional manner. The clock signal CLK supplied from the phase synchronizer 19 is used, and therefore the write signal can be applied from the integrated label feeding portion 3 to the concatenation table after inactivation of the read signal sent from the run label read controller 12. The timing control described above can be achieved easily by using the clock signal CLK.

According to the fifth embodiment, as described above, the device scale can be reduced by using the binary mask which extracts the local image region of pixels in two rows by two columns. Also, each component operates using the frequency-multiplied clock signal CLK sent from the phase synchronizer 19, whereby a plurality of labeling steps required for one binary mask can be surely completed within one cycle period of one pixel input. Therefore, a plurality of steps required for the labeling processing can be surely performed at a high speed.

Although the embodiments 1 to 5 have been described in connection with the binary masks each including pixels in two rows and two columns or two rows and three columns, the binary mask may have another structures which extracts the local image region including pixels in multiple rows and multiple columns.

In the case of the binary mask of pixels in two rows and three columns, the leading end of the adjacent run is detected by the condition of P(i−1, j)=0 and P(i−1, j+1)=1. This allows pre-reading of the leading end of the adjacent run with respect to the reference pixel scanning, so that the temporary label can be surely and accurately assigned to the pixel to be labeled (adjacent reference pixel).

(vi) Sixth Embodiment

In connection with the first to fifth embodiment, description has been made on preparation of the concatenation table representing a concatenation relationship between temporary labels of image data. Now, a method of analyzing the concatenation table and performing final labeling for the temporary label image data will be described below.

Figure 75:
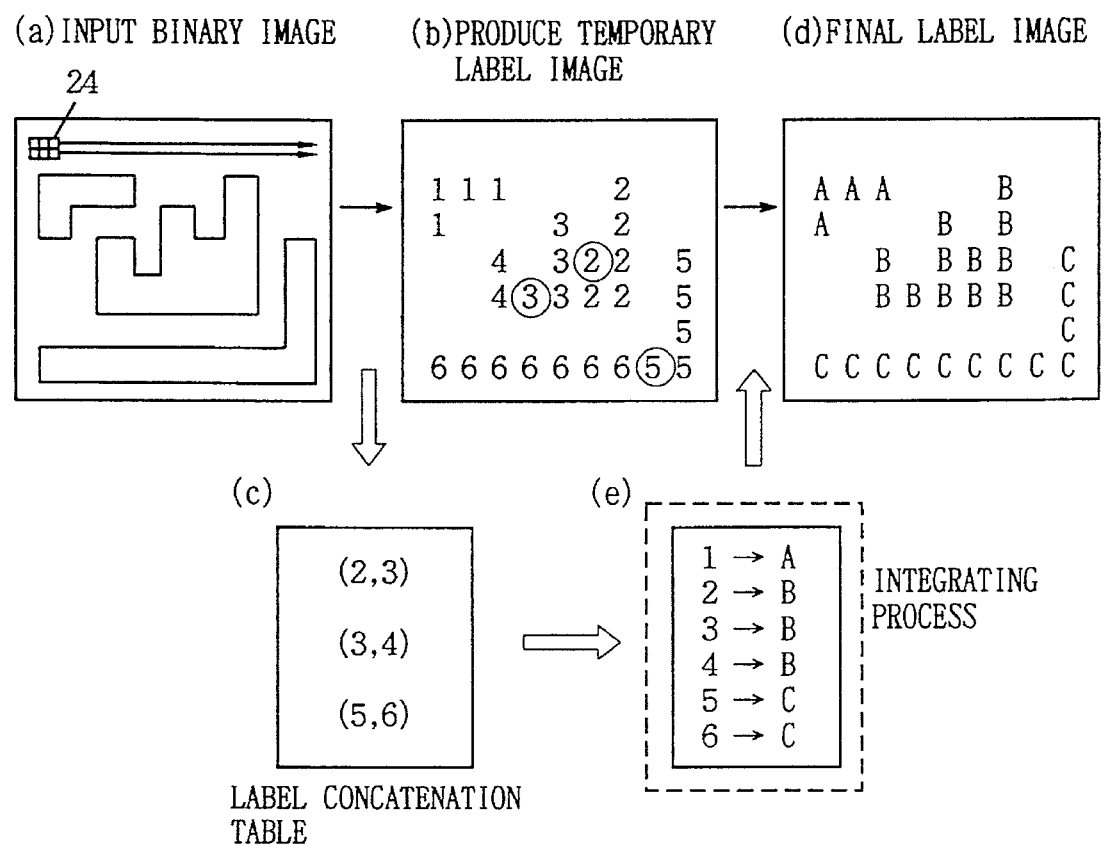
FIG. 75 shows a labeling process.

A method and circuitry for the concatenation table analysis which will be described below can be used in combination with the labeling circuit and labeling method of the first to fifth embodiments already described. They may also be applied to a structure shown in FIG. 75. The concatenation table analyzing method which will be described below can be applied to the labeling method which includes the following steps of: (a) scanning image data in units of local image regions, (b) in the case where a plurality of labels are concatenated to the same image region, a smaller label value is employed as the label value to be propagated in subsequent scanning operations, (c) the label value thus employed is used as the write data, which is written into the table using the nonselected label value as the address, and thereby storing the concatenation relationship between temporary labels, and (d) assigning temporary labels to the scanned image data, and converting these temporary labels into final labels in accordance with the result of analysis of the table.

Therefore, the following description will be made on the method of analyzing the concatenation table, apart from the first to fifth embodiments.

More specifically, the following description will be made on a method by which a temporary label image 200 shown in FIG. 56 is converted into a final label image 201 shown in FIG. 57. In FIG. 56, the temporary label image 200 includes regions I, II and III. Temporary labels 1 are assigned to the region 1. Temporary labels 2, 3 and 4 are concatenated in the region II. Temporary labels 5 and 6 are assigned to the region III. The concatenation table has stored the concatenation relationship among the temporary labels as shown in FIG. 58. More specifically, the temporary label data 1, 2, 2, 3, 5 and 5 are stored at the addresses 1, 2, 3, 4, 5 and 6 in the concatenation table, respectively, as shown in FIG. 58.

The addresses represent the respective temporary labels in the temporary label image 200, and the data represent destinations of concatenation of the temporary labels. For example, the data 3 at the address 4 represents that, in the temporary label image 200, the temporary label 4 is concatenated to the temporary label 3. The concatenation table shown in FIG. 58 is analyzed, and the concatenation relationship among the temporary labels is integrated. Also, label values are added in the ascending order of magnitude. Thereby, such a final label image is obtained that final labels 1, 2 and 3 are assigned to the regions I, II and III as shown in FIG. 57.

Figure 59:
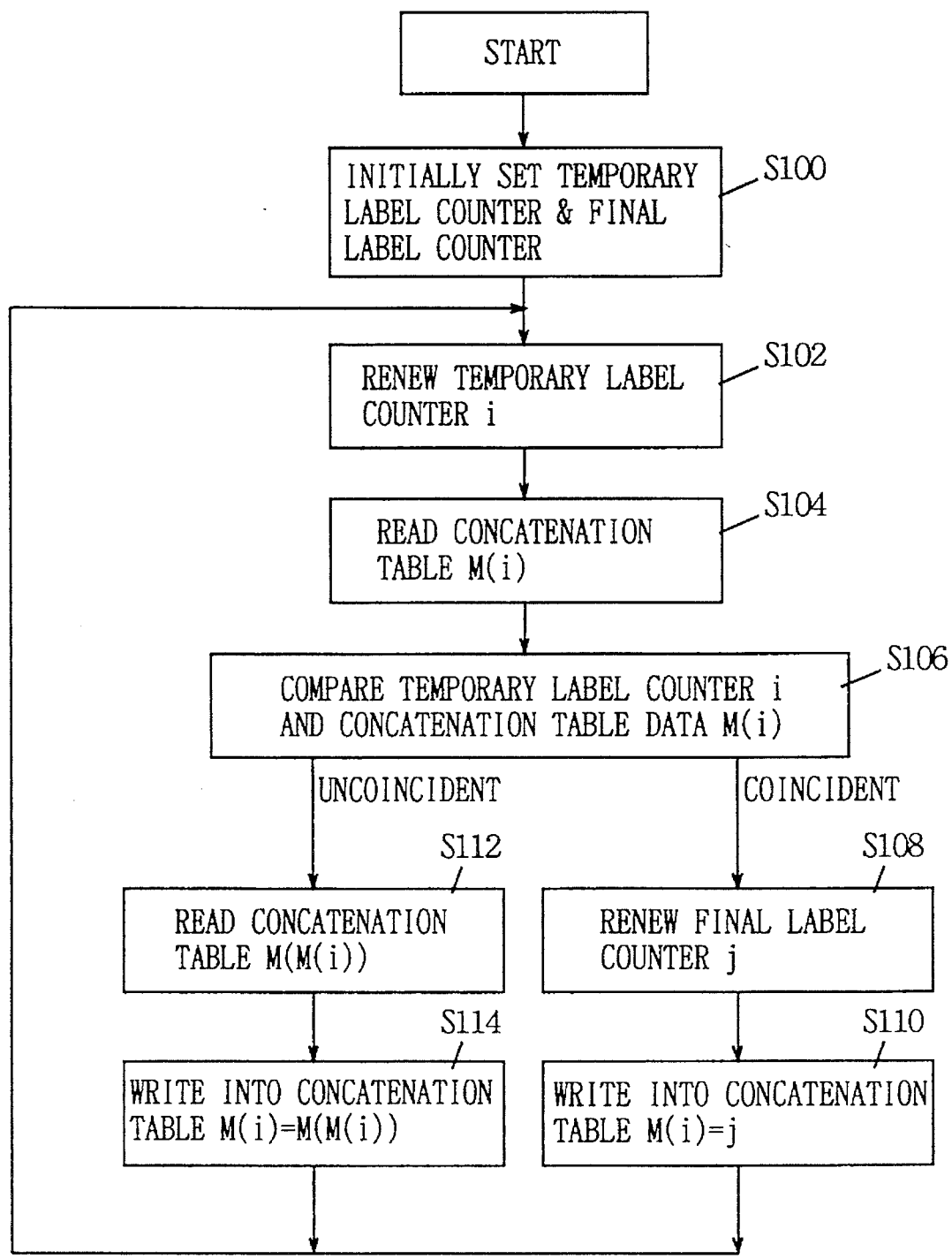
FIG. 59 is a flow diagram showing operations in a labeling method of the sixth embodiment.

FIG. 59 is an operation flow diagram showing the labeling method according to the sixth embodiment of the invention. The labeling method of the sixth embodiment will be described below particularly in connection with processing operation for analyzing a concatenation table with the concatenation table shown in FIG. 58 as an example.

The labeling method of the sixth embodiment utilizes a temporary label counter for generating temporary label values, and a final label counter for generating final label values. The assignment of temporary label starts with the minimum label value of 1. The process starts with the count of 1 which is first applied from the temporary label counter to the concatenation table. In this case, the temporary label counter is initially set to have the count of 0. The final labels, which are assigned to different regions (concatenation regions: e.g., region I in the temporary label image 200 in FIG. 56), respectively, start at the number of 1. Also in this case, the initial value of the final label counter is set to 0 (step S100).

First, the temporary label counter is updated at step S102. In the initial state, the initial value of the temporary label counter is 0, so that the temporary label counter has the count i of 1 (i=1). Using the count i=1 of the temporary label counter as the address, contents M(i) of the concatenation table are read (step S104).

As shown in FIG. 60A, data 1 is stored at the address 1 in the concatenation table. It is determined whether the count applied from the temporary label, i.e., address i in the concatenation table is coincident with the data M(i) read from the concatenation table or not (step S106). Since both of them are 1 and hence equal to each other, the count of the final label counter is updated. Since the initial value of the final label counter is 0, the updated value j equal to 1 (step S108). The updated value j of the final label counter is written at the address i in the concatenation table (M(i)=j).

If the count i of the temporary label counter is not coincident with the data M(i) read from the concatenation table at step S106, the data M(i) read from the concatenation table is used as the address, and data is read from the concatenation table. The data thus read is indicated M(M(i)) (step S112). Then, the data M(M(i)) read from the concatenation table is written at the address i in the concatenation table (step S114).

Thus, in the concatenation table, the address represents the temporary label, and the data represents a destination to which the temporary label is concatenated. If the address is not coincident with the data, this fact represents that the temporary label is concatenated to another temporary label. Therefore, by writing the destination, i.e., temporary label to which it is concatenated, it is identified where the temporary label is to be concatenated.

If the address in the concatenation table is coincident with the data stored thereat, it represents that the temporary label is concatenated only to itself. Therefore, by writing the count of the temporary label counter at this time, the temporary label value can be changed into a small value. Then, specific operations will be described below.

FIGS. 60A to 60D and 61A to 61C show operations for analyzing the concatenation table shown in FIG. 58. The labeling method according to the sixth embodiment of the invention will be described below with reference to FIGS. 60A to 61C.

As shown in FIG. 60A, the count of the temporary label counter is set to 1. The concatenation table is accessed using the count 1 of the temporary label counter as the address. In the concatenation table, data 1 is stored at the address 1. In this case, the address value and the data are coincident with each other, so that the count of the final label counter is updated from the initial value of 0 to 1, and the count 1 is written at the address 1 in the concatenation table.

Then, the count of the temporary label counter is updated from 1 to 2. As shown in FIG. 60B, data 2 is stored at the address 2 in the concatenation table. Also in this case, the count of the final label counter is updated, and the count 2 is written at the address 2 in the concatenation table.

As shown in FIG. 60C, the concatenation table is accessed in accordance with the count 3 of the temporary label counter. Data 2 is stored at the address 3 in the concatenation table. The address in the concatenation table is not coincident with the stored data. This represents the fact that the region bearing the temporary label value 3 is concatenated to the region bearing the temporary label value 2. This results from the fact that, in the operation of assigning the temporary label, when it was found that different labels are concatenated to the local image region as shown in FIG. 56, the smaller label value was selected as the label value for the subsequent assignment of temporary label, and the concatenation destination label value 2 was stored in the concatenation table using the nonselected label value 3 as the address. In this processing operation, the stored data in the concatenation table does not have a value larger than the corresponding address value in any case.

If the address in the concatenation table is different from the data, such a case may occur that an employed temporary label for the concatenated two temporary labels, i.e., data is further concatenated to another temporary label. Also in this case, the concatenation table analysis in this embodiment is performed in such a manner that the processing is performed in the order from the minimum value of the temporary label value to a larger value (the temporary label counter carries out the count-up operation from the minimum value), so that the analysis of an address in the concatenation table is already completed if it is found that the address in the concatenation table is not coincident with the corresponding stored data. Therefore, the accurate final label is obtained by reading the concatenation table two times at the most.

The data 2 at the address 3 in the concatenation table is used as the address again, and data is read from the concatenation table. The data 2 is stored at the address 2 in the concatenation table. This data 2 represents the final label of the temporary label 3. This data 2 is written, as the concatenation destination of the temporary label 3, at the address 3 in the concatenation table. Thereby, analysis for the temporary label 3 is completed, and the process for the next temporary label will start.

As shown in FIG. 60D, the count of the temporary label counter is incremented by 1 to 4. The data 3 is stored at the address 4 in the concatenation table. Also in this case, the address value in the concatenation table is not coincident with the corresponding stored data. In this case, the stored data is read from the concatenation table using the stored data 3 as the address, and the data 2 thus read is written at the address 4 in the concatenation table. Thereby, the data stored at the address 4 in the concatenation table is changed from 3 to 2. The count of the final label counter does not change and maintains 2.

As shown in FIG. 61A, the temporary label counter increments its count by one to 5. The data 5 is stored at the address 5 in the concatenation table. In this case, the address value in the concatenation table is coincident with the corresponding data. Therefore, the final label counter increments its count by one, and the count of this final label counter is written at the address 5 in the concatenation table. In this manner, the final label can be successively increased from the minimum value 1.

As shown in FIG. 61B, the temporary label counter increments its count by one to 6. The data 5 is stored at the address 6 in the concatenation table. Since the address value is not equal to the data, operation similar to those for the temporary labels 3 and 4 are performed, and specifically, data is newly read from the concatenation table using the stored data 5 as the address. The data 3 thus read is stored at the address 6 in the concatenation table. Thereby, the process for the temporary label 6 is completed.

As a result of analysis of the concatenation table by a series of operations described above, the concatenation table shown in FIG. 61A is obtained. The label conversion is effected on the temporary label image 200 shown in FIG. 56 with this concatenation table, whereby the final label image shown in FIG. 57 is obtained. Thus, the concatenation table can be used as a look-up table for converting the temporary label image into the final label image. A conversion table independent from the concatenation table is not required, so that a required storage region can be reduced.

(vii) Seventh Embodiment

The labeling process of the sixth embodiment may be performed with a software. However, it is preferable to use a hardware in view of high-speed operations. A hardware structure for performing the processing operations shown in FIG. 59 is shown in FIG. 62.

Figure 62:
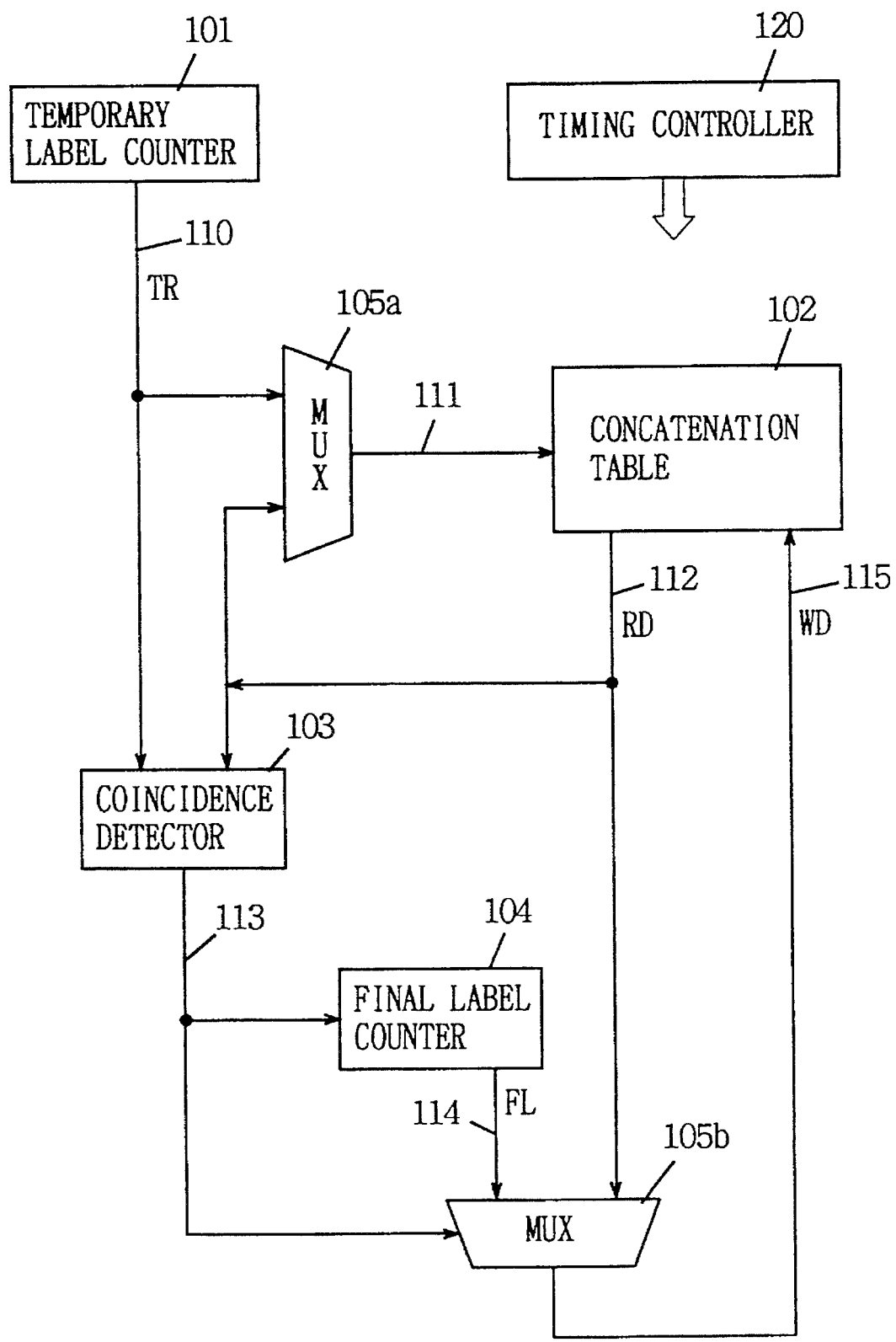
FIG. 62 schematically shows a structure of a labeling circuit according to a seventh embodiment of the invention.

In FIG. 62, a circuit for analyzing the concatenation table includes a concatenation table 102 storing the concatenation relationship among temporary labels in a table form, a temporary label counter 101 generating a temporary label value TR, a selector circuit 105a which selectively passes a count TR sent from the temporary label counter 101 and the data RD read from the concatenation table, a coincidence detector 103 which detects coincidence and noncoincidence between the count TR sent from the temporary label counter 101 and the data RD read from the concatenation table 102, a final label counter 104 which counts up in response to detection of coincidence by the coincidence detector 103, and a selector circuit 105b which selects one of a count FL of final label counter 104 and the data RD read from the concatenation table 102.

The output of selector circuit 105b is transmitted as write data WD for the concatenation table 102 onto a signal line 115. A timing controller 120 determines an operation timing of each circuit, and also selects or determines read/write operations with respect to the concatenation table 102, the selecting operations of the selector circuit 105a, a coincidence detecting timing of the coincidence detector 103 and a selection output timing of the selector circuit 105b.

The temporary label counter 101 and final label counter 104 have initial values of 1. Operations will be described below.

Figure 63:
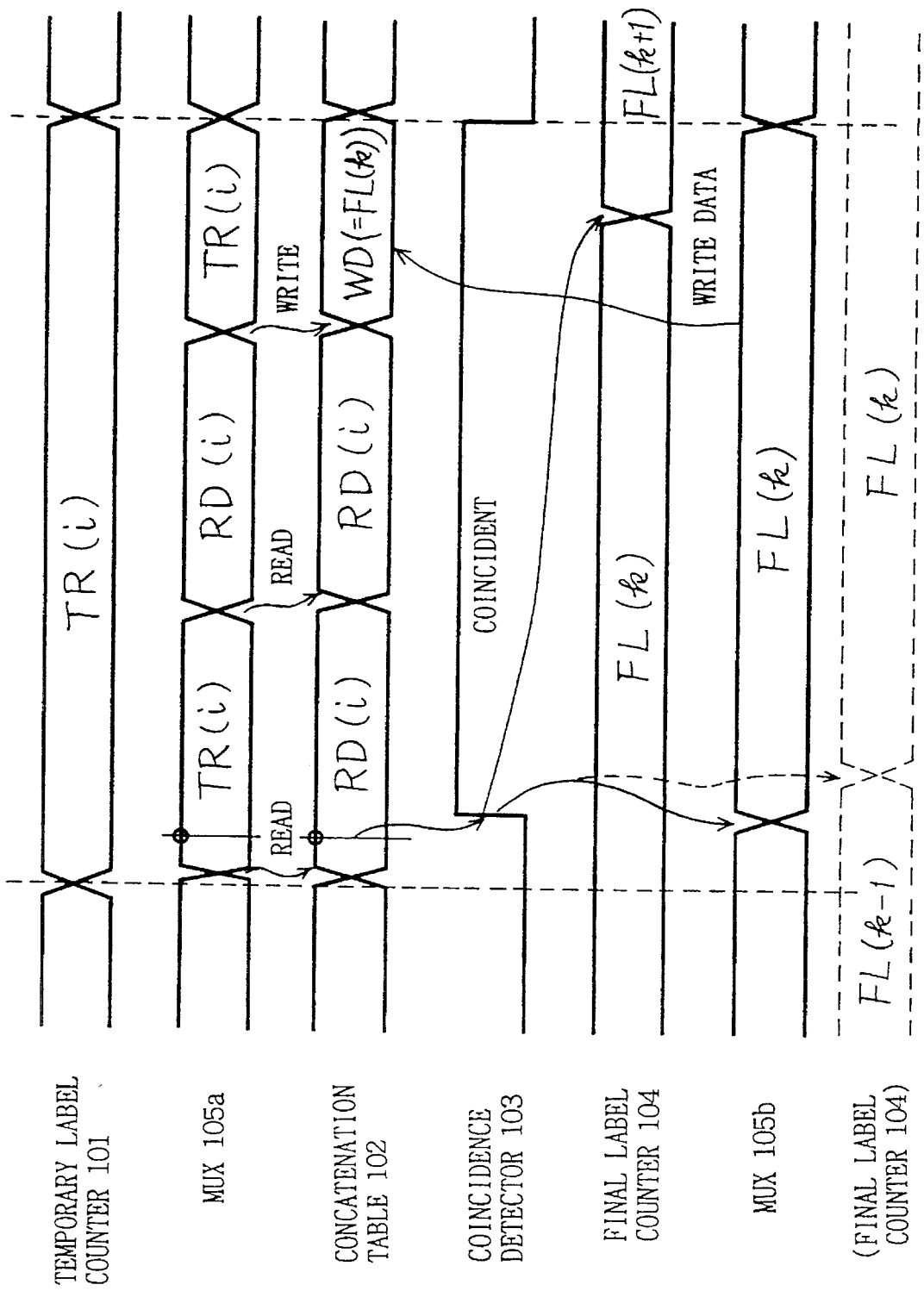
FIG. 63 is a signal waveform diagram showing an operation of the labeling circuit shown in FIG. 62.

Referring to FIGS. 62 and 63, an operation in the case where an address in the concatenation table is equal in value to the stored data will be described below.

The temporary label counter 101 outputs the count TR(i) onto the signal line 110. The selector circuit 105a first selects the count TR(i) sent from the temporary label counter 101, and applies the same to the concatenation table 102. The concatenation table 102 uses, as the address, the count TR(i) applied onto the signal line 111 from the selector circuit 105a, and transmits the data RD(i) stored thereat onto a signal line 112.

The coincidence detector 103 detects coincidence and noncoincidence between the count TR(i) of the temporary label counter 101 and the data RD(i) read onto the signal line 112 from the concatenation table 102. Since both of them are equal (TR(i)=RD(i)), the coincidence detector 103 sends a signal indicative of the coincidence onto a signal line 113. In FIG. 63, the signal indicating the coincidence is represented by a signal at a high level. In response to the coincidence detection signal applied onto the signal line 113 from the coincidence detector 103, the selector circuit 105b selects and applies a count FL(k) of the final label counter 104 onto a signal line 115.

In parallel to the coincidence detecting operation by the coincidence detector 103, the selector circuit 105a selects the read data RD(i) applied onto the signal line 112 and applies the same onto the signal line 111. From the concatenation table 102, the content at the address, which is equal to the data RD(i) applied onto the signal line 111, is read onto the signal line 112.

Then, the selector circuit 105a selects the count TR(i), which is applied onto the signal line 110 from the temporary label counter 101, and transmits the same onto the signal line 111. The selector circuit 105b selects the count FL(k) supplied from the final label counter 104, and transmits the same onto a signal line 115 as the write data WD. Into the concatenation table 102 is written the count FL(k) of final label counter 104 supplied from the selector circuit 105b, using the count TR(i) of temporary label counter 101 as the address. In parallel to this write operation, the count FL(k) of final label counter 104 is incremented by one to FL(k+1).

In the signal waveform diagram of FIG. 63, the output of coincidence detector 103 is in the state indicative of detection of coincidence during a period for which the count TR(i) of temporary label counter 101 is being processed. Alternatively, a signal may be employed which is brought it is in the state indicative of detection of coincidence during a predetermined period. The selector circuit 105b may not utilize such a timing that it attains the state selecting the count FL(k) of final label counter 104 in response to the coincidence detection signal, but may utilize such a timing that the output of selector circuit 105b is fixed when the data is written into the concatenation table 102. These timings are appropriately set by the timing controller 120.

Figure 64:
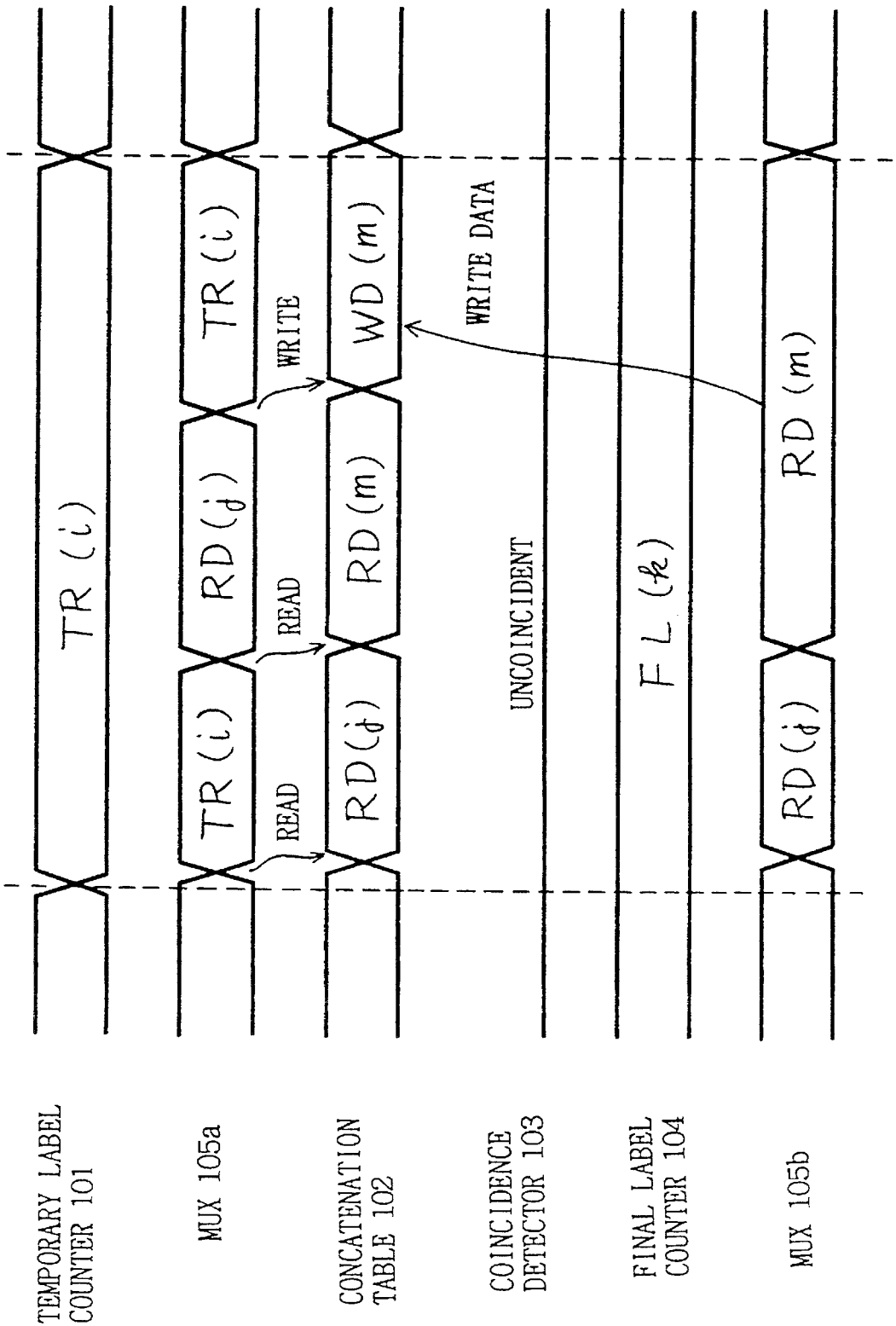
FIG. 64 is a signal waveform diagram showing an operation of the labeling circuit shown in FIG. 62.

Referring now to FIGS. 62 and 64, an operation in the case where the address and the stored data in the concatenation table 102 are not coincident with each other will be described below.

The temporary label counter 101 supplies the count TR(i) onto the signal line 110. The selector circuit 105a selects the count TR(i) sent from the temporary label counter 101 and applies the same onto the signal line 111. The read data RD(j) is read from the concatenation table 102 onto the signal line 112. The coincidence detector 103 compares the read data RD(j) on the signal line 112 with the count TR(i) applied from the temporary label counter 101 onto the signal line 110. Both are now noncoincident with each other (TR(i)≠RD(j)), so that the output of coincidence detector 103 attains the state indicative of detection of noncoincidence (which is represented by the signal at the low level in FIG. 64). In this state, the final label counter 104 does not change its count. The selector circuit 105b attains the state in which it selects the data read onto the signal line 112 from the concatenation table 102 in response to the noncoincidence detection signal applied onto the signal line 113 from the coincidence detector 103.

In parallel to the operation for detecting coincidence by the coincidence detector 103, the selector circuit 105a selects and applies the data RD(j), which is read onto the signal line 112 from the concatenation table 102, onto the signal line 111. The concatenation table 102 uses the data RD(j) applied onto the signal line 111 as the address, and reads the corresponding stored data RD(m) for applying it onto the signal line 112.

After the second reading operation, the selector circuit 105a selects the output count TR(i) applied from the temporary label counter 101 again, and applies it onto the signal line 111. The selector circuit 105b selects the data RD(m) applied onto the signal line 112, and applies it onto the signal line 115. In this state, the concatenation table 102 uses, as the address, the output count TR(i) of the temporary label counter 101 applied onto the signal line 111, and writes the write data WD(m), which is equal to RD(m) and is applied onto the signal line 115.

In the structure shown as an example in FIG. 62, the initial value of final label counter 104 is set to 1. In the case where the count of final label counter 104 is initially set to 0, such a structure is employed that its count is incremented in response to detection of coincidence as indicated by a signal represented by broken line in FIG. 63. In the signal waveform diagram of FIG. 64, the selector circuit 105b outputs the data RD(j) read from the concatenation table 102. The selector circuit 105b may employ such a structure that its output is decided at the second reading operation.

The operation of the circuit shown in FIG. 62 will be described below in connection with the case where the concatenation table 102 is in the state shown in FIG. 58C.

The temporary label counter 101 outputs the count 1 (TR(1)). The selector circuit 105a selects the count TR(1) applied from the temporary label counter 101, and applies it onto the signal line 111. The data 1 (RD(1)) at the address 1 is read from the concatenation table 102 onto the signal line 112. The coincidence detector 103 compares the count TR(1) applied from the temporary label counter 101 with the data (RD(1)) read from the concatenation table 102. Since both of them are 1, the coincidence detector 103 outputs the coincidence detection signal onto the signal line 113. In accordance with the coincidence detection signal on the signal line 113, the selector circuit 105b selects the count FL supplied from the final label counter 104 onto the signal line 114. The initial value of final label counter 104 is set to 1 (FL=FL(1)).

In parallel to the coincidence detecting operation of the coincidence detector 103, the read data RD(1) on the signal line 112 is selected by the selector circuit 105a and is transmitted onto the signal line 111. The data RD(1) is read from the concatenation table 102 onto the signal line 112 again.

After this reading operation, the selector circuit 105a selects the count TR(1) of the temporary label counter 101 again, and applies it onto the signal line 111. For the concatenation table 102, the count TR(1) on the signal line 111 is used as the address, and the count FL(1) of the final label counter applied onto the signal line 115 is written as the write data thereinto. In the concatenation table 102, the data 1 is written at the address 1. In parallel to this write operation, the final label counter 104 increments its count from 1 to 2 (i.e., FL(1) is updated to FL(2)). The process for the temporary label 1 is completed.

The operations for the temporary label 2 are performed similarly to those for the temporary label 1. The count of final label counter 104 is selected and updated to 3 (=FL(3)). In the concatenation table 102, the final label value 2 is written at the address 2.

For the temporary label value 3, the first access to the concatenation table 102 is performed similarly to the access in the cases for the temporary labels 1 and 2. However, subsequent processes are performed in a different manner. The data read from the address 3 in the concatenation table 102 is 2. In this case, the coincidence detector 103 compares the count 3 (TR(3)) supplied from the temporary label counter 101 with the data 2 (RD(2)) read from the concatenation table 102. In this case, the coincidence detector 103 detects noncoincidence. In parallel to the coincidence detecting operation by the coincidence detector 103, the selector circuit 105a selects the data RD(2) applied onto the signal line 112, and applies it onto the signal line 111. From the concatenation table 102, the stored data 2 at the address 2 is read and applied onto the signal line 112. The count of final label counter 104 is not updated. The selector circuit 105b selects the read data RD(2) on the signal line 112 in accordance with detection of noncoincidence by the coincidence detector 103.

The selector circuit 105a selects the count 3, which is applied from temporary label counter 101, as the address, and applies it onto the signal line 111. Therefore, the data 2 is written at the address 3 in the concatenation table 102.

For the temporary label value 4, operations are performed similarly to those for the temporary label value 3. The final label value 2 is written at the address 4 in the concatenation table 102. At this stage, the final label counter 104 has maintained the final label value 3.

The count of the temporary label counter 101 is incremented by one, and analysis relating to the temporary label value 5 starts. In this case, the coincidence detector 103 detects coincidence similarly to the cases relating to the temporary label values 1 and 2. The count of final label counter 104 is 3, and the data 3 is written at the address 5 in the concatenation table 102. The count of final label counter 104 is incremented from 3 to 4.

For the temporary label value 6, operations are performed similarly to those for the temporary label values 3 and 4. The data read from the concatenation table 102 is 5. Using this data 5 as the address, data is read from the concatenation table 102 again. The data thus read is 3, and this data 3 is selected as the final label. The data 3 is written at the address 6 in the concatenation table 102. As a result, the concatenation table provided with the storage contents shown in FIG. 61C is achieved. The final label image shown in FIG. 57 is obtained by successively scanning the temporary label image shown in FIG. 56 and performing the label conversion with this concatenation table 102. In the case shown in FIG. 62, analysis and integrating processing are performed entirely by a hardware. This allows high-speed processing. Since any storing unit other than the concatenation table is not used, the device scale can be reduced.

(viii) Eighth Embodiment

Figure 65:
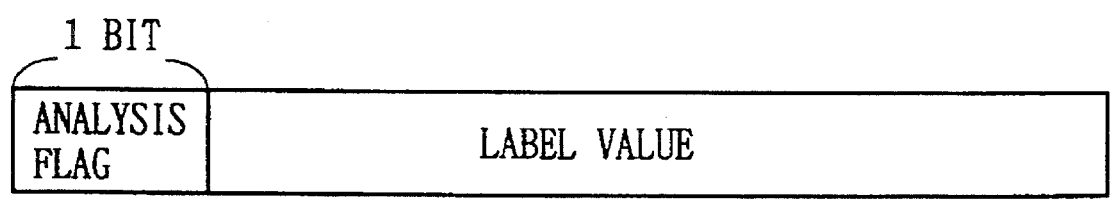
FIG. 65 shows a data structure of a concatenation table used in an eighth embodiment.

FIG. 65 shows a data structure of a concatenation table used in the eighth embodiment of the invention. As shown in FIG. 65, the data structure of the concatenation table includes units each consisting of a label value and an analysis flag of one bit. This analysis flag is added to the most significant bit position. The analysis flag of one bit is used to indicate whether the related label value is already processed or not in the operation for analyzing the concatenation table. In the operation for assigning temporary labels, this portion is not utilized. Initially in the operation for analyzing the concatenation table, the analysis flag is set to indicate the unprocessed state.

Figure 66:
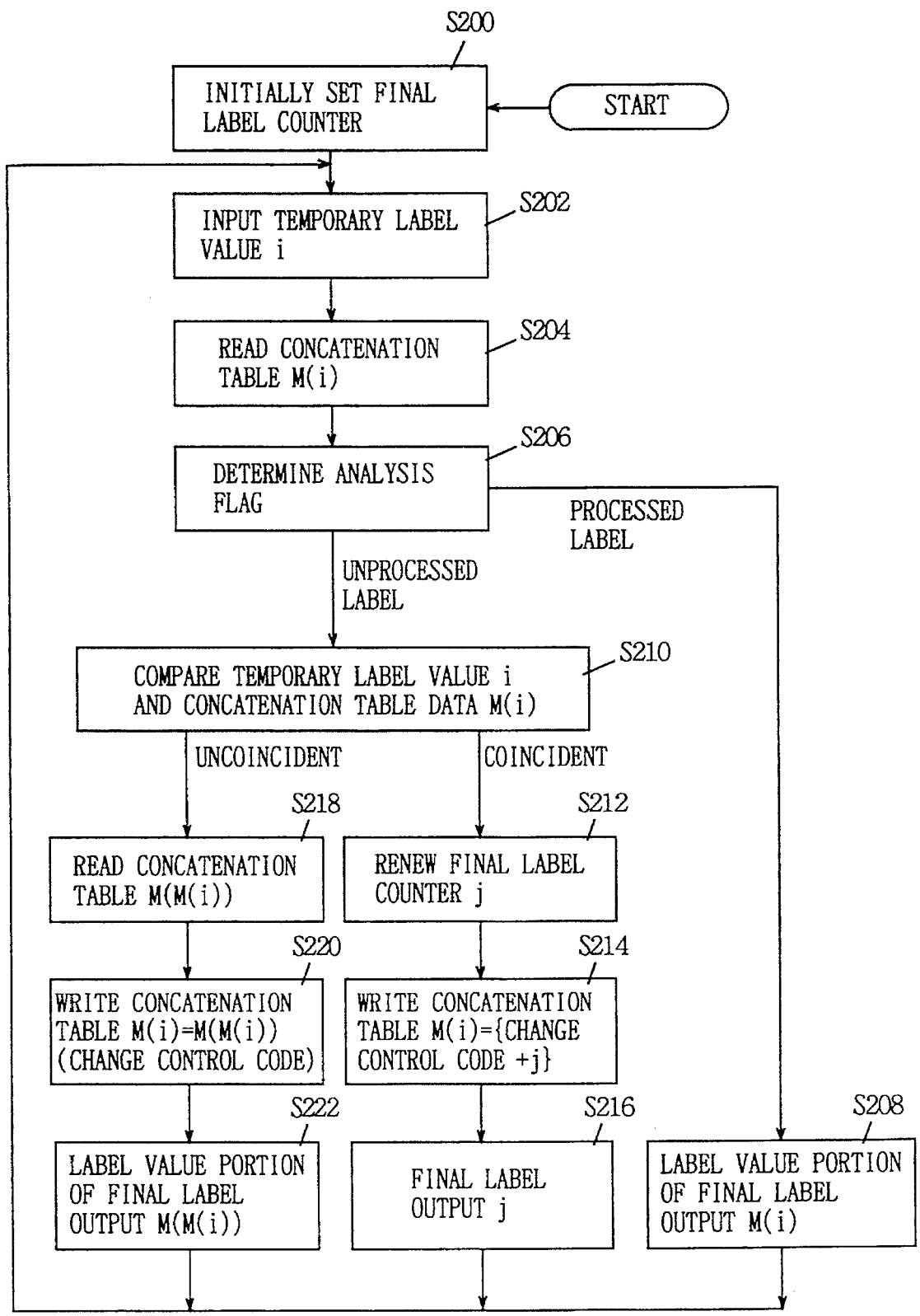
FIG. 66 is a flow diagram showing operations in a labeling method according to the eighth embodiment.

FIG. 66 is a flow diagram showing specific operations for analyzing the concatenation table according to the eighth embodiment. The operations for analyzing the concatenation table according to the eighth embodiment will be described below with reference to FIG. 66.

In the concatenation table, data includes the analysis flag at the most significant bit position, and also includes the label value at the lower bit positions. In the initial state before the assignment of temporary label, the analysis flag portion is set to the value "0" indicative of the unprocessed state, and the label value is stored at each address position, of which address value is equal to the corresponding label value, in the concatenation table. After termination of the assignment of temporary labels, the analysis flag in this concatenation table is "0", and the concatenation destination label is stored at the lower bit position as exemplified in FIG. 58.

This eighth embodiment also utilizes the temporary label counter for generating the temporary label and the final label counter for generating the final label value. First, the count of the final label counter is set to the initial value, i.e., "0" (step S200). Then, the temporary label image is raster-scanned, and the temporary label value i obtained by the raster-scan is inputted (step S202).

Using this temporary label value i as the address, data M(i) is read from the concatenation table (step S204). This read data M(i) contains an analysis flag. It is determined whether this analysis flag indicates the processed state or unprocessed state (step S206).

In the case where the analysis flag indicates the processed state, analysis of this temporary label has been completed, so that the label value portion of data M(i) read from the concatenation table is outputted as the final label (step S208).

In the case where the analysis flag represents the unprocessed state at step S206, the temporary label value i is compared with the label value of data M(i) read from the concatenation table (step S210). If the temporary label value i is coincident with the label value of read data M(i), the count of the final label counter is updated (step S212). An updated count j of the final label counter is written at the address (i) in the concatenation table while setting the corresponding analysis flag to the processed state (control code) (step S214). In parallel to this write operation, the count j supplied from the final label counter is outputted as the final label value (step S216).

In the case where noncoincidence is found at step S210, new data M(M(i)) is read from the concatenation table using the read data M(i) as the address (step S218). Then, using the temporary label value i as the address, the read data M(M(i)) is written into the concatenation table. At this time, the corresponding analysis flag is changed into the value "1" indicative of the processed state (i.e., control code is changed as shown in FIG. 66), and the step 220 is completed.

In parallel to the write into the concatenation table, the label value portion of the data M(M(i)) read from the concatenation table is outputted as the final label value (step S222).

Through a series of these operations, the process for the temporary label i is completed, and then the process is repeated for the temporary label value of the next temporary label image.

Thus, in contrast to the sixth embodiment, the processing operations shown in FIG. 66 are performed in such manner that the temporary label value obtained by scanning the temporary label image is inputted, instead of outputs of the temporary label counter, and this temporary label value is converted into the final label value for outputting. Thus, the analysis of the concatenation table and the final labeling process are concurrently performed. Here, the "final labeling process" means a process in which the temporary label value obtained by raster-scanning the temporary label image is used as the input, and is converted into the final label value for outputting. Referring to FIGS. 56 to 58, specific operations will be described below.

It is assumed that the concatenation table stores the data shown in FIG. 58 at respective addresses. Each data bears the analysis flag of "0" indicative of unprocessed state.

By raster-scanning the temporary label image 200 shown in FIG. 56, a pixel 224a bearing a temporary label appears first. The temporary label value of the pixel 224a is 1. Using this value 1 as the address, the concatenation table is accessed. The analysis flag is 0 and indicates the fact that the concatenation table analysis has not been processed. In this case, the temporary label value 1 and the label value 1 of the concatenation table data are compared with each other. Both of them are 1 and hence are coincident with each other, so that the count of the final label counter is updated into 1. The data, in which the updated count 1 of the final label counter is linked with the analysis flag converted into the value "1" indicative of the processed state, is written at the address equal to the temporary label value 1 in the concatenation table. The count 1 of the final label counter is outputted as the final label.

Then, the area for scanning the temporary label image 200 shifts rightward by one pixel to perform the processing for a pixel 224b. The temporary label value of pixel 224b is 1. Using this temporary label value 1 as the address, the concatenation table is accessed. The data stored at the address 1 in the concatenation table is already determined during the process for the pixel 224a, so that its analysis flag is 1. Therefore, the data is not written into the concatenation table in this case. The label value 1 read from the concatenation table is outputted as the final label value. The same processing is performed for a pixel 224c, and the final label value 1 is outputted.

Thus, when the temporary label value is equal to the value of the address storing the data which has been analyzed and thus has the analysis flag of 1, the label value portion of the stored data is outputted as the final label.

Then, for the temporary label value 2 of a pixel 224d in a temporary label image 200, the count of the final label counter is updated to 2 similarly to the case of the pixel 224a. The updated count 2 is outputted as the final label value. In parallel to this output operation, the analysis flag 1 is set to 1, and the data having the flag linked with the count of 2 of the final label counter is written at the address equal to the temporary label value of 2 in the concatenation table.

The scanning operation further proceeds to perform the processing for a pixel 224e, of which temporary label value is 3. The address 3 in the concatenation table is not yet accessed. Therefore, the data stored at the address contains the analysis flag of "0". In this case, therefore, the table analysis for the temporary label value 3 is required. For this purpose, the input temporary label value 3 is compared with the label value portion of the data read from the concatenation table. The data read from the concatenation table is 2, and it is detected that the input label value is different from the label value of the concatenation table data. The value "2" of the concatenation table data represents the concatenation destination of the temporary label value 3.

Using this concatenation table data 2 as the address, the concatenation table is accessed again, whereby the final label value 2 of the processed temporary label value 2 is read. This final label value 2 is the final label of the temporary label value 3. The data, which contains the final label 2 linked with the flag changed into the value 1 indicative of the processed state, is written at the address 3 in the concatenation table. Since the analysis flag is changed, the final label value 2 is unconditionally outputted when the temporary label value 3 is inputted in the scanning processes thereafter.

The processing for converting the temporary labels of pixels 224f, 224g and pixel 224h in the temporary label image 200 is the same as that which is performed when the respective temporary label values appear for the first time during the raster-scanning process. In this case, the analysis flag portion of the data read from the concatenation table represents the unprocessed state. Therefore, these pixels 224f, 224g and 224h are processed similarly to the pixels 224a, 224d and 224c, and specifically, analysis of the concatenation table, changes of the contents, and output of the final label values are performed for these pixels.

Remaining pixels in the temporary label image 200 shown in FIG. 56 are processed in such a manner that the label value portion of the data read from the concatenation table is outputted as the final label value without any modification, because analysis of the concatenation table has been performed for these remaining pixels. Thereby, the concatenation table shown in FIG. 61C is obtained, and the final label image 201 shown in FIG. 57 is obtained.

In this eighth embodiment, analysis of the concatenation table and integrating processing are performed concurrently with the final labeling, so that the labeling process can be performed at a high speed.

(ix) Ninth embodiment

Figure 67:
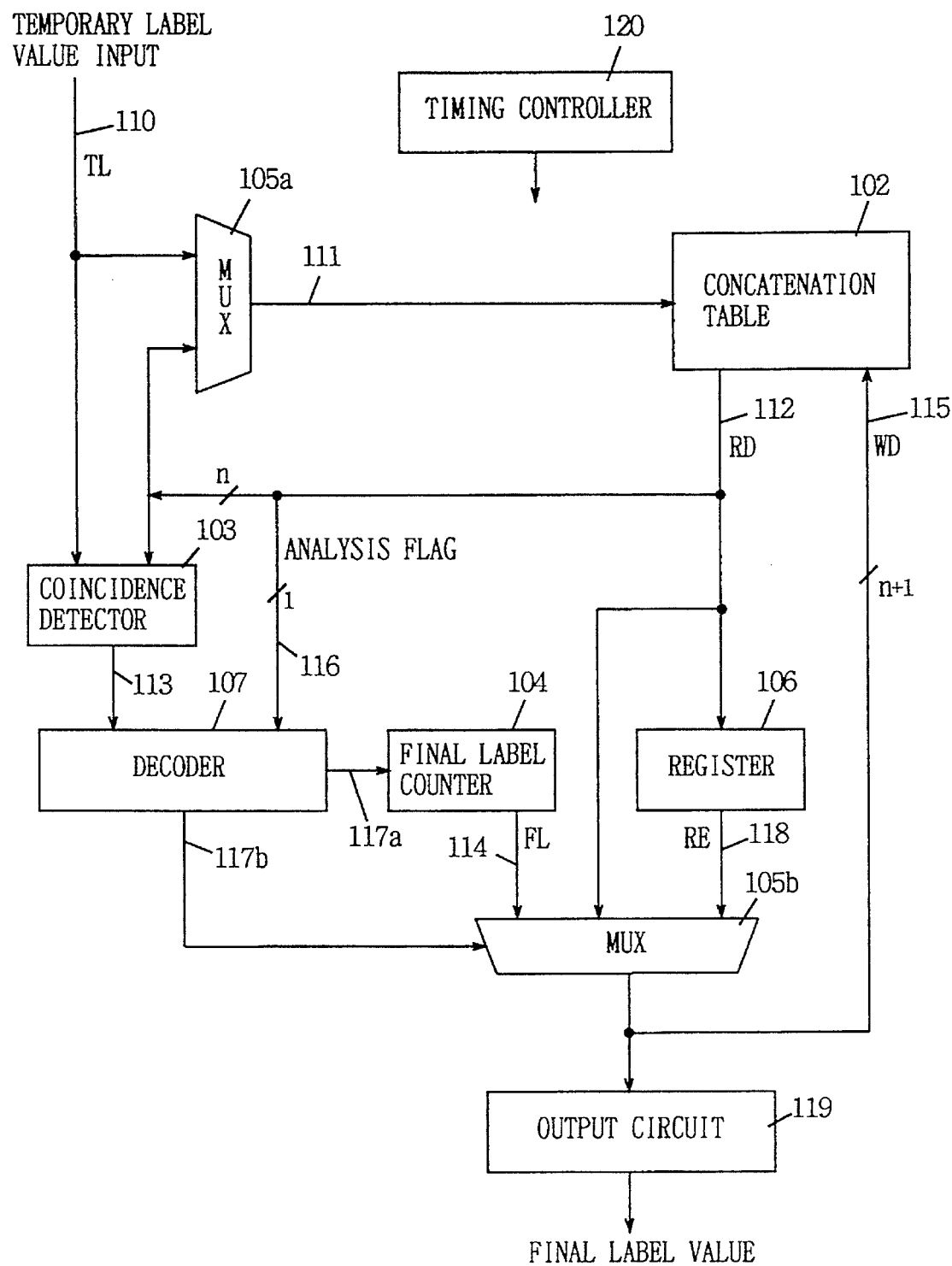
FIG. 67 schematically shows a structure of a labeling circuit of a ninth embodiment.

FIG. 67 shows a structure for achieving the processes and operations in the eighth embodiment with hardware. In FIG. 67, parts and portions corresponding to those shown in FIG. 62 bear the same reference numbers. In the structure shown in FIG. 67, the selector circuit 105a, which produces an address for the concatenation table 102, receives at one input the temporary label value TL obtained by scanning the temporary label image, and at another input the data RD read from the concatenation table 102 onto the signal line 112. In the structure shown in FIG. 67, there are additionally provided a decoder 107, a register 106 and an output circuit 119 supplying the final label value. The selector circuit 105b has three inputs and one output.

The decoder 107 decodes the signal applied from the coincidence detector 103 onto the signal line 113 and the analysis flag of one bit of the read data applied from the concatenation table 102 onto the signal line 112, and generates in accordance with the result of decoding a signal for controlling the count-up operation of the final label counter 104 and the selecting operation of the selector circuit 105b. The decoding operation of the decoder 107 is as follows.

(i) In the case where the analysis flag is "1":

A signal for selecting the data stored in the register 106 is sent onto the signal line 117b. Count-up of final label counter 104 is inhibited.

(ii) In the case where the analysis flag is "0", and the output of coincidence detector 103 indicates coincidence:

A signal for selecting the output of final label counter 104 is outputted onto the signal line 117a, and then a signal for updating the count of final label counter 104 is outputted onto the signal line 117a.

(iii) In the case where the analysis flag is "0" and the output of coincidence detector 103 indicates noncoincidence.

A signal for selecting the signal on the signal line 112 is outputted onto the signal line 117b, and the count-up of final label counter 104 is inhibited. The register 106 stores the data RD which is read by the first read operation from the concatenation table 102 onto the signal line 112.

The selector circuit 105b receives the final label value FL applied from the final label counter 104 onto the signal line 114 as well as the data RD stored in the register 106 and the data read from the concatenation table 102 in the second read cycle, and selects one of them in accordance with the control signal applied from the decoder 107 onto the signal line 117b for applying the selected one to the concatenation table 102 through the signal line 115 and applying the same to the output circuit 119. The output circuit 119 outputs, as the final label value, a labeled value portion of the data applied from the selector circuit 105b. The selector circuit 105b also sets the analysis flag to the value of "1" indicative of the processed state under the control of the decoder 107, and outputs the same. In connection with this, such a structure may be employed that the analysis flag indicative of the processed state is added to the count FL sent from the final label counter 104 for outputting. The final label counter 104 may utilize, as its own count, the count of which most significant bit is always "0". This is allowed by setting the highest bit position of the write data signal line 115 to "1" when writing the data. An operation of the circuit shown in FIG. 67 will be described below with reference to FIGS. 68 to 70.

Figure 68:
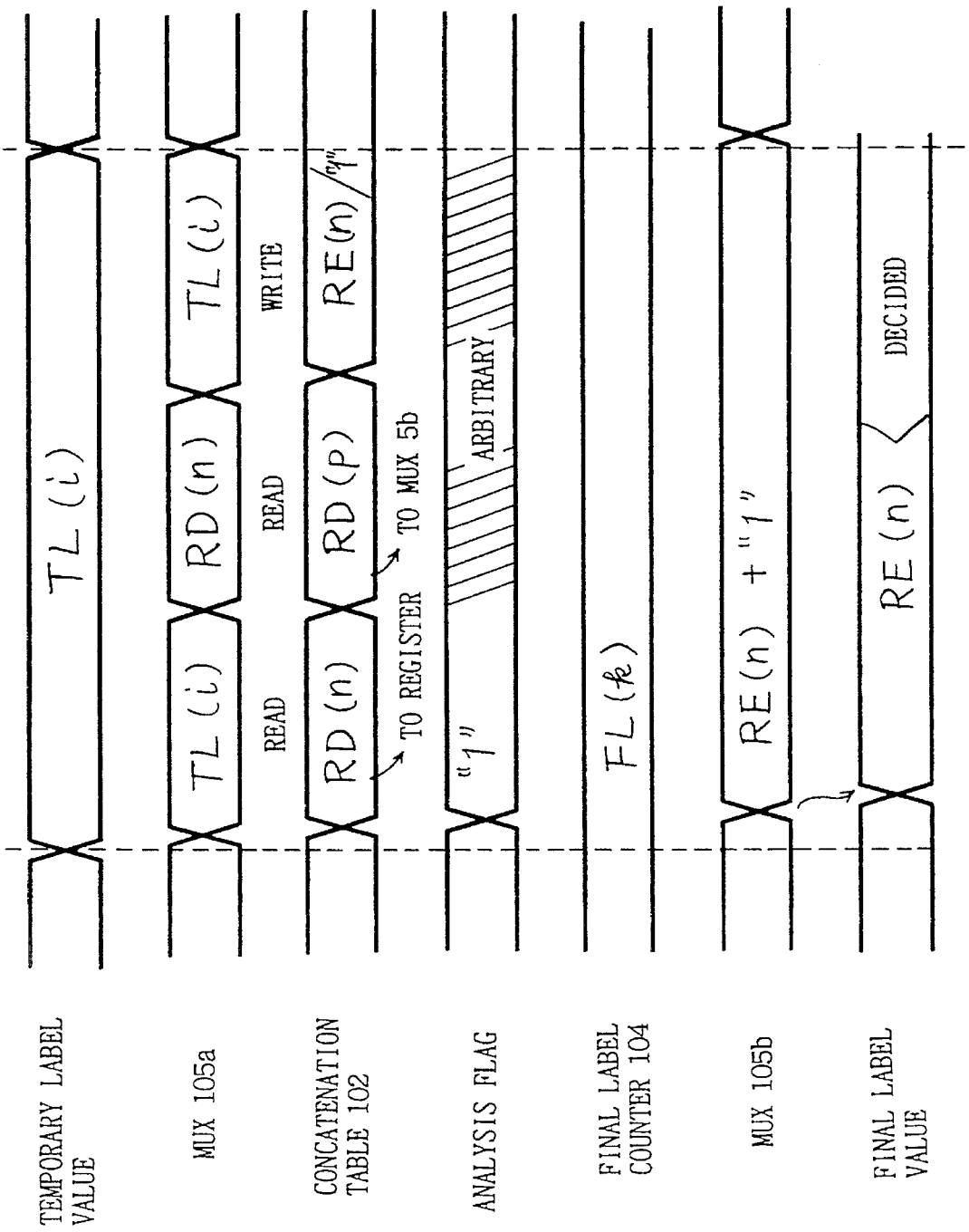
FIG. 68 is a signal waveform diagram showing an operation of the labeling circuit shown in FIG. 67.

Referring to FIGS. 67 and 68, an operation in the case where an input temporary label value is under the processed state will be described below. When a temporary label value TL(i) is applied onto the signal line 110, the selector circuit 105a first selects and applies this temporary label value TL(i) to the concatenation table 102. From the concatenation table 102, data is read using this temporary label value TL(i) as the address. If the analysis flag contained in the data RD(i) thus read from the concatenation table 102 is "1" indicative of the processed state, the decoder 107 applies onto a signal line 117a a signal for maintaining the count of final label counter 104, and also applies onto a signal line 117b a signal for instructing the selector circuit 105b to select the data RE stored in the register 106. In the register 106, there is stored the data RD(n) read from the concatenation table 102. The signal selected in the selector circuit 105b is applied to the output circuit 119. The output circuit 119 outputs, as the final label value, the label value RD(n) applied from the selector circuit 105b at an appropriate timing.

The selector circuit 105a selects the data RD(n) read from the concatenation table 102 at a predetermined timing and applies it onto the signal line 111 for reading data RD(P), and then it selects the input temporary label value TL(i) and applies the same onto the signal line 111. In the concatenation table 102, this temporary label value TL(i) is used as the address, and the data RD(n) supplied from the selector circuit 105b is written as the write data WD. These second read operation and data write operation are not necessary if the analysis flag is "1". It is shown in FIG. 68 that, in order to merely maintain the parallelism to the operation which is performed when the analysis flag is "0" indicative of the unprocessed state, the selector circuit 105a successively performs the selecting operation at predetermined timings for performing the reading and writing operations to the concatenation table 102.

Figure 69:
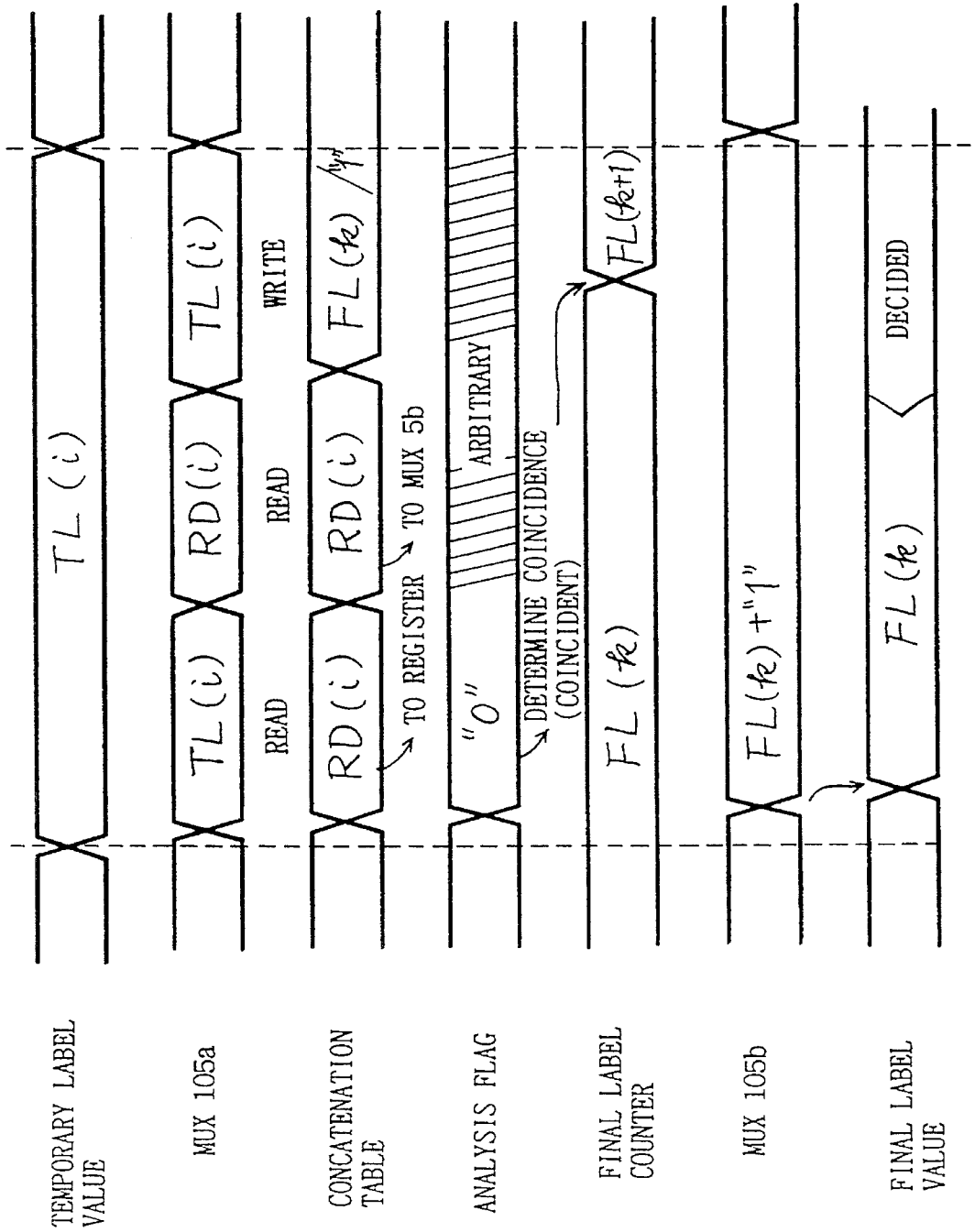
FIG. 69 is a signal waveform diagram showing an operation of the labeling circuit shown in FIG. 67.

Referring to FIGS. 67 and 69, description will be made on the operation performed when the analysis flag contained in the data read from the concatenation table 102 is "0" indicative of the unprocessed state. First, the operation in the case where the address of the concatenation table is equal in value to the label of the stored data will be described below with reference to FIGS. 67 and 69.

First, the input temporary label value TL(i) is selected by the selector circuit 105a and is applied via the signal line 111 to the concatenation table 102. The concatenation table 102 reads the data using this input temporary label value TL(i) as the address, and transmits the read data RD(i) onto the signal line 112. The data RD(i) applied onto the signal line 112 is stored in the register 106. In parallel to the operation for storing the data in the register 106, the coincidence detector 103 determines coincidence and noncoincidence between the label value of the data RD(i) read onto the signal line 112 and the input temporary label value TL(i). Since the value TL(i) is equal to the data RD(i), the coincidence detector 103 supplies the coincidence detection signal onto the signal line 113. The analysis flag of the data RD(i) read onto the signal line 112 is applied to the decoder 107 via a signal line 116. The decoder 107 responds to the coincidence detection signal sent from the coincidence detector 103 to the selector circuit 105b the signal for selecting the count of final label counter 104. The decoder 107 updates the count of final label counter 104 at a predetermined timing. The initial value of final label counter 104 has been set to "1". The selector circuit 105b selects the count FL(k) supplied from the final label counter 104, and applies the same to the output circuit 119 and signal line 115.

In parallel to the decoding operation of the decoder 107, the selector circuit 105a selects the data RD(i) read from the concatenation table and applies the same to the concatenation table 102. In the concatenation table 102, the stored content is read using the data RD(i) as the address, and is applied to the selector circuit 105b. The data RD(i) thus read in the second operation is not stored in the register 106.

The count FL(k) of the final label counter 104 before the updating and the analysis flag ("1") indicative of the processed state which are linked together are applied from the selector circuit 105b onto the signal line 115. When selector circuit 105a selects the input temporary label value TL(i) again and applies the same to the concatenation table 102, the data FL(k) applied onto the signal line 115 is linked with the analysis flag "1" and is stored in concatenation table 102 with this input temporary label value TL(i) as the address.

In parallel to this write operation, the count of final label counter 104 is incremented by one to FL(k+1) in accordance with the signal applied from the decoder 107 onto the signal line 117a.

The output circuit 119 outputs, as the final label value, the count FL(k) of the final label counter, i.e., a portion of the data applied from the selector circuit 105b excluding the analysis flag at an appropriate timing.

Figure 70:
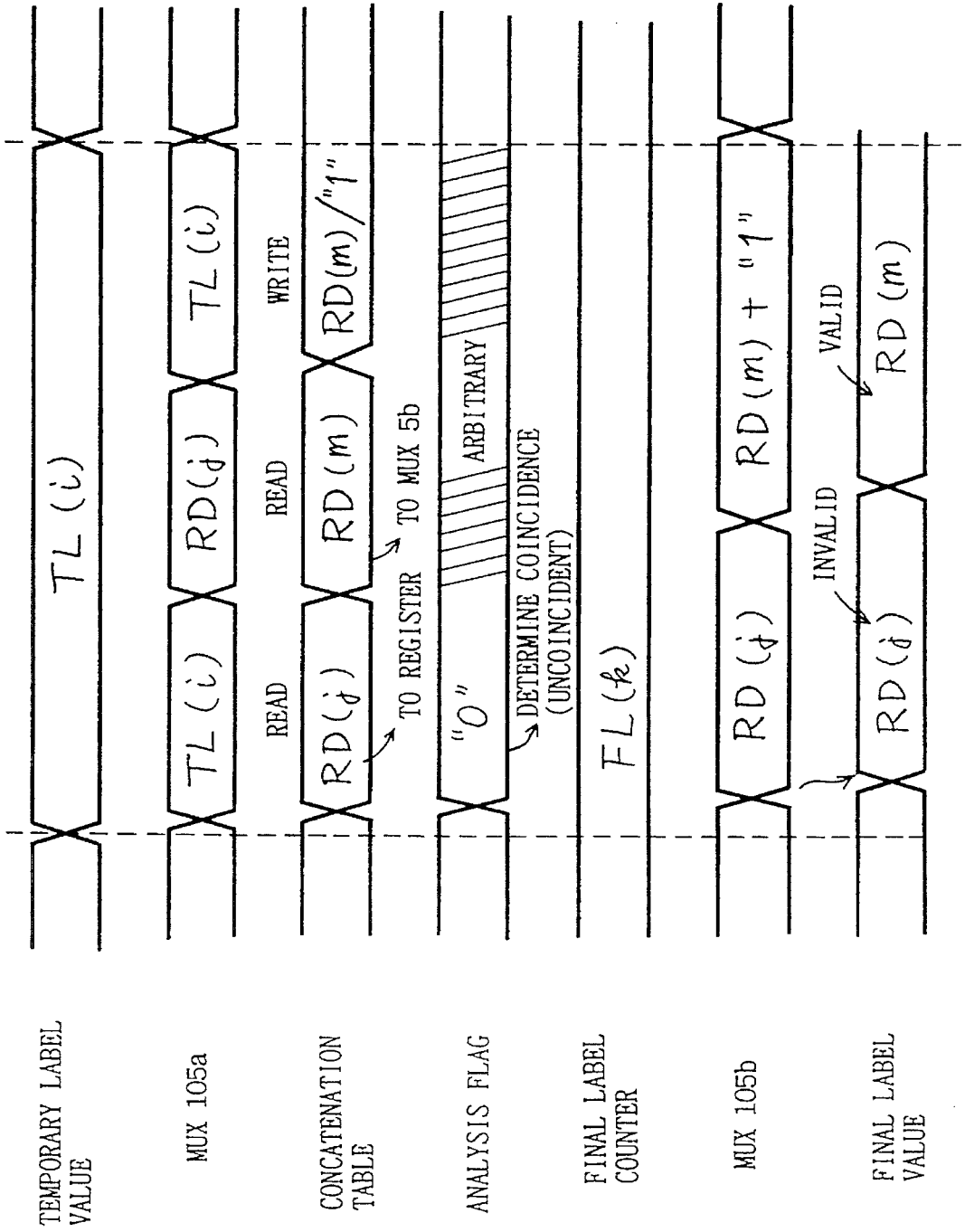
FIG. 70 is a signal waveform diagram showing an operation of the labeling circuit shown in FIG. 67.

Referring to FIGS. 67 and 70, description will be made on an operation in the case where the analysis flag is "0" and the address value in the concatenation table is not coincident with the label value of the stored data.

First, the input temporary label value TL(i) is inputted. The selector circuit 105a selects this input temporary label value TL(i) and applies the same to the concatenation table 102. In the concatenation table 102, the data RD(j) stored in the address TL(i) is read and supplied onto the signal line 112. The data RD (i) applied onto the signal line 112 is stored in the register 106.

In parallel to the storing operation for the register 106, the coincidence detector 103 detects coincidence and noncoincidence between the read data RD(j) and the input temporary label value TL(i). In this case, the coincidence detector 103 applies the noncoincidence detection signal onto the signal line 113.

The decoder 107 receives the analysis flag of the data RD(j), which is applied onto the signal line 112, via the signal line 116. When the analysis flag is "0" indicative of the unprocessed state and the coincidence detector 103 indicates detection of noncoincidence, the count-operation of final label counter is inhibited, and the control signal which sets the state for selecting the data on the signal line 112 is applied to the selector circuit 105b via the signal line 117b.

In parallel to the decoding operation of the decoder 107, the selector circuit 105a selects the data RD(j) read from the concatenation table 102 and applies the same onto the signal line 111. In the concatenation table 102, data reading operation is performed using this data RD(j) as the address, and the corresponding data RD(m) is applied to the selector circuit 105b via the signal line 112. The selector circuit 105b changes the analysis flag of the data RD(m) applied via the signal line 112 into "1" indicative of the processed state, and applies the same onto the signal line 115.

In parallel to the application of the write data RD(m) from the selector circuit 105b onto the signal line 115, the selector circuit 105a selects the input temporary label value TL(i) and applies the same to the concatenation table 102. In the concatenation table 102, the write operation is performed using the input temporary label value TL(i) as the address and the data RD(m) applied onto the signal line 115 as the write data.

In the structure shown in FIG. 70, the selector circuit 105b is set to the state for selecting the signal line 112 in accordance with the output of decoder 107 after the analysis flag attains the valid state and the output of coincidence detector 103 is decided. FIG. 70 shows a state where the data RD(j) is first outputted from the selector circuit 105b, and then the data RD(m) is outputted. Correspondingly, the data RD(j) and RD(m) are outputted as the final label value according to the state shown in the FIG. 70. Only the data RD(m) is valid. The outputs of selector circuit 105b and output circuit 119 may be decided at any appropriate timing provided that this timing precedes the timing for writing the data into the concatenation table 102.

Then, an operation of the circuit shown in FIG. 67 will be described below with reference to FIG. 56 showing the temporary label image. It is assumed that the state of concatenation table 102 is the same as that shown in FIG. 58. Each data includes the analysis flag, which is "0" indicative of the unprocessed state.

In the course of raster-scanning of the temporary label image 200, the pixel 224a is first detected. The temporary label value of the pixel 224a is "1". This input temporary label value "1" is selected by the selector circuit 105a, and is applied to the concatenation table 102. From the concatenation table 102 is read the data stored at the address 1. The data RD(1) read from the concatenation table 102 is temporarily stored in the register 106. The label value portion of the data RD(1) is applied to the selector circuit 105a and coincidence detector 103. The most significant bit of the data RD(1), i.e., analysis flag is applied to the decoder 107. The read data RD(1) has the label value of "1" and the analysis flag of "0" indicative of the unprocessed state. The coincidence detector 103 applies a code, which indicates that the input temporary label value TL(1) is equal to the label value of data RD(1) in the concatenation table, to the decoder 107 via the signal line 113. Based on the result of comparison of the table values and on the analysis flag, the decoder 107 generates a signal for outputting, as the final label, a new label value, i.e., the count of final label counter 104, and applies the same to the final label counter 104 and selector circuit 105b via the signal lines 117a and 117b, respectively.

In parallel to the decoding operation of the decoder 107, the selector circuit 105a selects the label value of the read data RD(1) and applies the same to the concatenation table 102. From the concatenation table 102, data is read again using the label value of data RD(1) as the address. The data RD(1) thus read again is not stored in the register 106 but is applied to the selector circuit 105b.

The count of final label counter 104 is initially set to the minimum value 1 of the temporary label. The selector circuit 105b responds to the control signal applied from the decoder 107 via the signal line 117b, and selects and outputs the count FL(1) held by the final label counter 104. The data supplied from the selector circuit 105b has the same data structure as that stored in concatenation table 102. The analysis flag contained in the output of selector circuit 105b is set to the value "1" indicative of the processed state. The output circuit 119 selects and outputs only the label value 1 in the data. The final label counter 104 increments its count by one to 2 after completion of the selecting operation in the selector circuit 105b.

The selector circuit 105a selects the input temporary label value TL(1) again and applies it onto the signal line 111. The concatenation table 102 uses the input temporary label value TL(1) applied onto the signal line 111 as the write address, and writes the data FL(1) applied onto the signal line 115 and the analysis flag ("1") as the write data WD.

As described above, processing one input temporary label requires five steps, i.e., (a) input of temporary label value, (b) read of data from the concatenation table, (c) detection of coincidence, decoding, and rereading from the concatenation table with the label value of read data as an address, (d) selection and output by selector circuit 105b, and (e) write of data into concatenation table 102.

Then, the raster scan shifts rightward by one pixel, and the temporary label value 1 of pixel 224b contained in the temporary label image 200 shown in FIG. 56 is inputted. From the concatenation table 102, data at the address 1 is read. The data RD(1) thus read includes a structure in which the concatenation table analysis flag for the pixel 224a is "1" indicative of the processed state and the label value is "1". The decoder 107 applies a signal, which is used for selecting the output of register 106 storing the first data read from the concatenation table, via the signal line 117b to the selector circuit 105b in accordance with the value "1" of this analysis flag. The output circuit 119 outputs the final label value 1.

In the case where the input label value is "1" when performing the raster-scanning of the pixel 224c and subsequent pixels, operations are performed similarly to those for the pixel 224b.

The temporary label value 2 for the pixel 224d is inputted. This temporary label value 2 has not been processed. In this case, since the input temporary label value 2 is equal to the label value 2 of data stored at the address in the concatenation table, so that processing is performed in the completely same manner as that for the pixel 224a. The final label value 2 is outputted. The analysis flag 1 and the data of label value 2 are written into the address 2 of the concatenation table 102. The count of final label counter 104 is updated to 3.

When the temporary label image 200 is further scanned, a temporary label value 3 of the pixel 224e is inputted, and corresponding data is read from the concatenation table 102. The data thus read has the analysis flag of 0, and the corresponding label value is 2 and hence is different from the input temporary label value 3. Thus, it is detected that the input temporary label value 3 is concatenated to the smaller temporary label 2. Using the temporary label value 2, which is directly concatenated to the temporary label value 3, as medium, it is necessary to detect the indirectly concatenated temporary label value from the concatenation table 102. This detecting operation corresponds to the second concatenation table reading operation. The data read at the second time from the concatenation table is the data, which is read using the label value 2 of the first read data as the address. The analysis flag of the stored data at the address 2 is "1" indicative of the processed state. Thus, the temporary label value 2 corresponding to this address 2 has been analyzed by the process performed for the pixel 224d. The decoder 107 applies the signal to the selector circuit 105b via the signal line 117b. The signal thus applied is used for selecting and outputting the data which is read second from the concatenation table. The output circuit 119 outputs, as the final label value, the label value portion 2 in the data applied from the selector circuit 105b. Data of the analysis flag 1 and label value 2 is written at the address 3 in the concatenation table 102.

The processing for the input temporary label values of pixels 224f, 224g and 224h is performed when the respective temporary label values first appear in the course of raster scanning. Corresponding to the input temporary label values of these pixels, the analysis flags contained in the data read from the concatenation table 102 indicate the unprocessed state. Therefore, operations for these pixels 224f, 224g and 224h are similar to those for the pixels 224a, 224d and 224e, and specifically, analysis and change of the concatenation table as well as output of the final label values are performed.

As for remaining pixels, the concatenation table has already been analyzed, so that the data read first from the concatenation table is outputted as the final label as it is. As a result of these processes, the final label image as shown in shown in FIG. 57 is obtained, and the concatenation table 102 attains the state shown in FIG. 61C.

As described above, the hardware is used for analyzing the concatenation table and for converting the temporary label values into the final labels, whereby the labeling process can be performed at a high speed. Since only the concatenation table is used as the storage device, the device scale can be small.

(x) Tenth Embodiment

Figure 71:
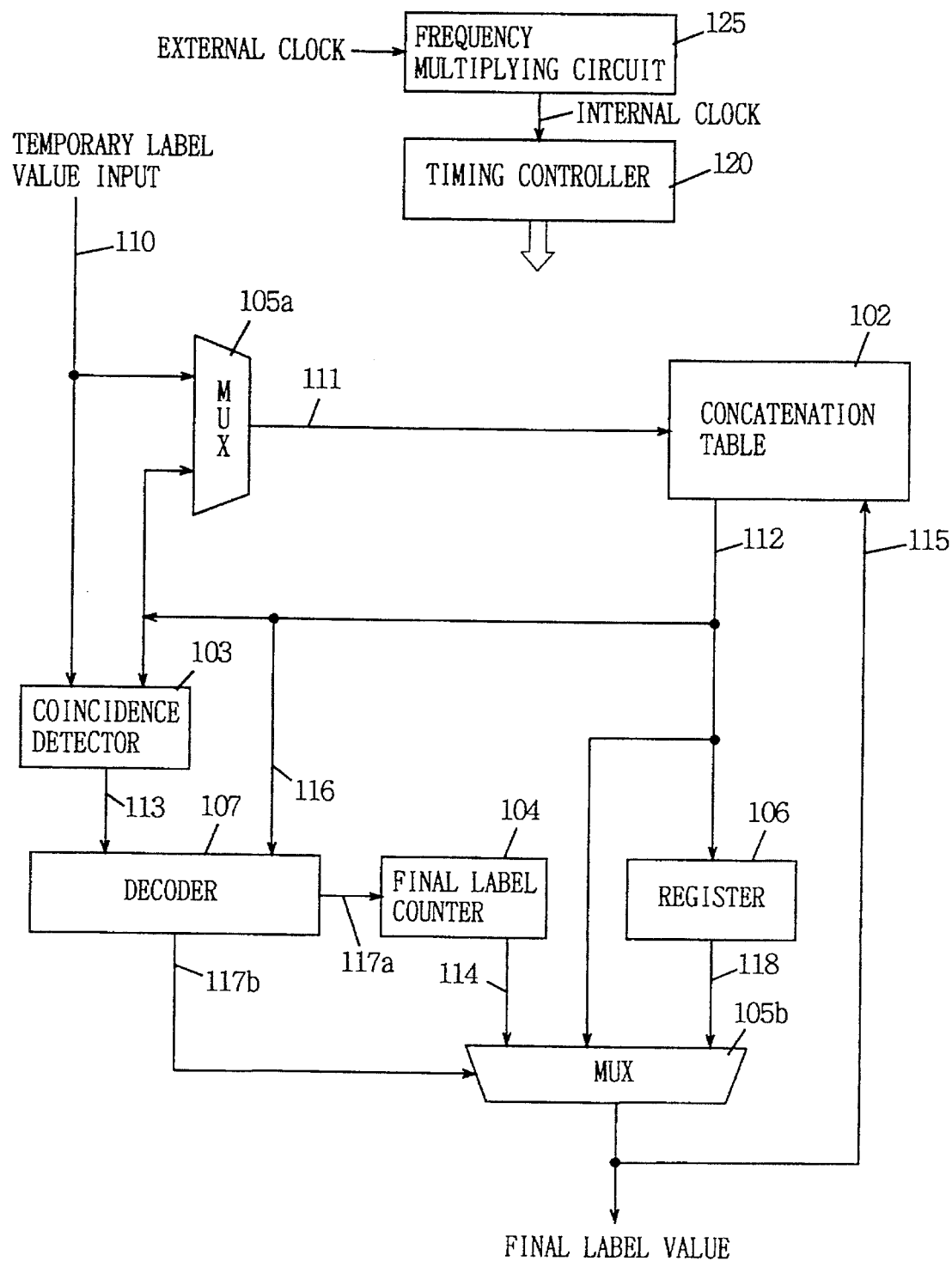
FIG. 71 shows a structure of a labeling circuit of a tenth embodiment.

FIG. 71 shows a structure of a labeling circuit of the tenth embodiment of the invention. Major portions of the structure shown in FIG. 71 are similar to those of the labeling circuit shown in FIG. 67. In the structure shown in FIG. 71, there is provided a frequency multiplier 25 for multiplying the frequency of the external clock signal. The frequency multiplier 25 supplies the clock signal to the timing controller 120. The external clock signal applied to the timing controller 120 is a signal for determining a cycle of input of the temporary label values. The temporary label image formed of temporary label values is stored in a storage such as an image memory, and the temporary label values are successively read from such temporary label image storage and are applied to this labeling circuit in accordance with the external clock signal. The external clock signal determining the cycle of input of the temporary label value is frequency-multiplied to produce a signal for determining the operation timings of the internal circuitry. High-speed processing can be implemented at an accurate timing.

In connection with the input of one temporary label, following five steps are required for concurrently performing analysis of the concatenation table and final labeling as already described: (a) input of the temporary label value, (b) read of data from the concatenation table, (c) decode and reread with the label value of read data from the concatenation table after detection of coincidence, (d) selection and output of the final label value by the selector circuit, and (e) write of the final label into the concatenation table.

If each of these steps is completed within one clock cycle, processing of only one input of the temporary label value data requires five clock cycles.

The frequency multiplier 130 uses, as its input, the external clock signal having the frequency equal to the frequency for scanning the temporary label image and reading the pixels, and produces the internal clock signal having the phase synchronized with this external clock signal and the frequency which is five times as large as that of the external clock signal. The internal timing controller 120 produces signals for determining the operation timings of predetermined respective circuits in accordance with the internal clock applied from the frequency multiplier 130. Therefore, in this case, the internal circuits shown in FIG. 71 operate at a high speed five times as high as that of circuits which operate in synchronization with the external clock.

Figure 72:
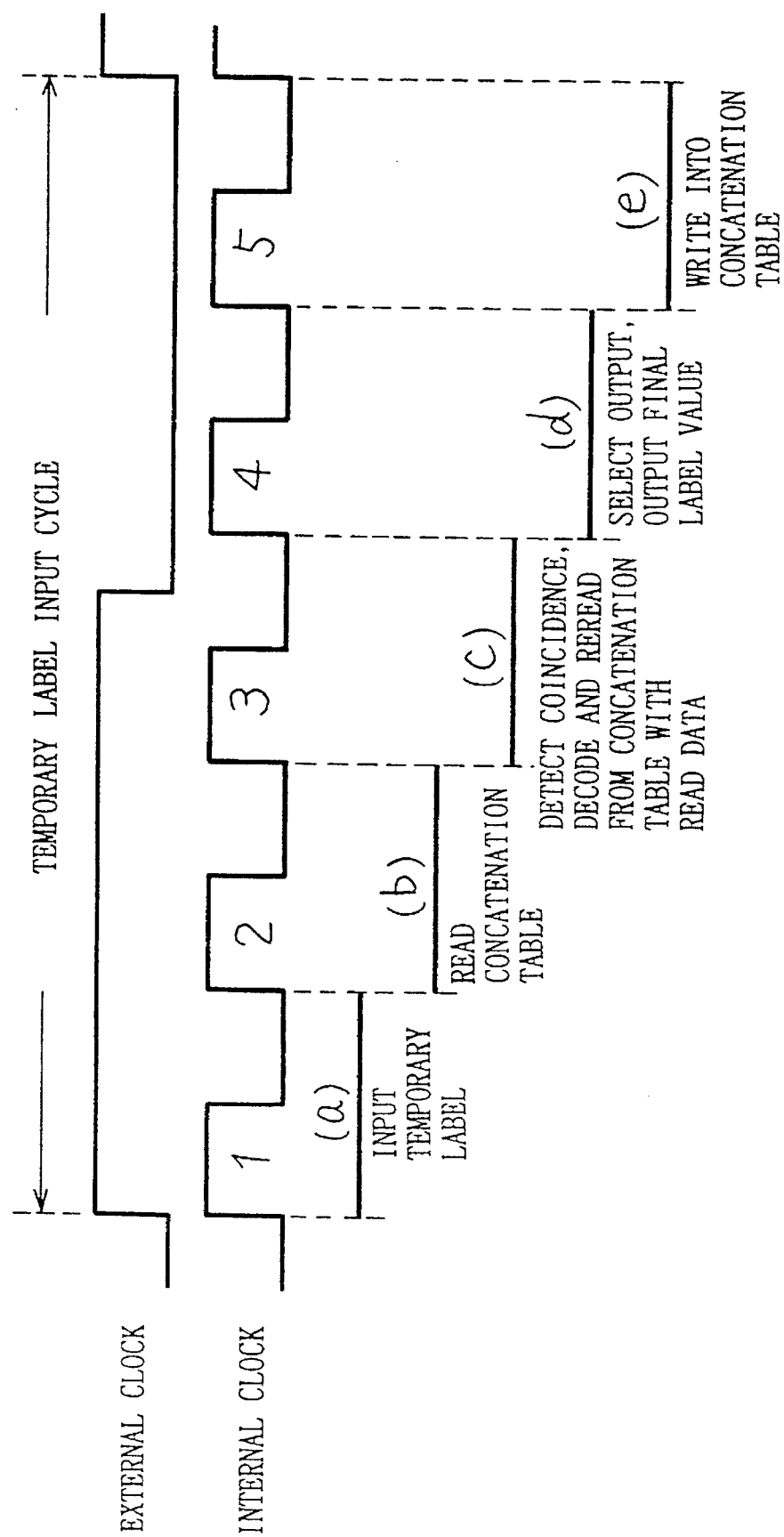
FIG. 72 shows an operation sequence of the labeling circuit shown in FIG. 71.

In this case, as shown in FIG. 72, each of five processing steps (a)–(e) is performed in one clock cycle of the internal clock. Since the operations of respective circuits are pipelines, high-speed processing is allowed. In the case where the internal circuitry is operated in synchronization with the clock signal, it is required only to provide a latch circuit, which operates in response to the clock, at an appropriate position.

The operations of the circuitry shown in FIG. 71 are the same as those of the circuitry shown in FIG. 67 except for the frequency multiplier, and the result of processing is completely the same.

The frequency multiplier 130 may be structured utilizing the circuit structure shown in FIG. 54.

Major features of the invention are as follows:

(1) The run label is read in accordance with detection of the leading end of adjacent run, the diversion destination label is read from the concatenation table using this run label as the address, and then the concatenated label and the concatenation table data (diversion destination temporary label) are compared with each other for determining and outputting the temporary label for each pixel forming the adjacent run. Thereby, the frequency of assignment of different labels to the same object is remarkably reduced. Further, since the label integrating process can be performed by using only the concatenation table, the temporary label image is not required, and a load in the label integrating process is reduced. Therefore, the binary image can be labeled at a high speed.

(2) The scanning is performed with the binary mask formed of pixels in two rows by three columns, the leading end of the adjacent run is detected in accordance with this binary mask, the run label is read from the run label storage upon detection of the leading end of the adjacent run, the concatenation table is referred to using this run label as the address, and thereafter the temporary label for each pixel in the adjacent run is determined by comparison of the concatenated label supplied from the concatenated label storage with the concatenation table data. This remarkably reduces the frequency of assignment of multiple labels to the same object in the temporary label image to be externally outputted. Since the contents of the concatenation table is appropriately corrected upon occurrence of label diversion, the frequency of occurrence of the label diversion in the stored contents is remarkably reduced, so that the label integrating process does not require the temporary label image and can be performed with only this concatenation table. Therefore, the temporary label image can be relabeled at a high speed, and the labeling circuit can perform the relabeling of the binary image at a high speed as a whole.

(3) Since the input binary image is scanned by the binary mask corresponding to the pixels in two rows by two columns, the scale of the circuitry for producing the mask is reduced, and also the scale of the circuitry for decoding the binary mask is remarkably reduced. Therefore the scale of the labeling circuit can be small.

(4) The concatenation table is referred to upon detection of the leading end of the adjacent run, and the referred concatenation table data and the current concatenated label are compared with each other to determine the temporary label for the adjacent run. Therefore, in the temporary label image to be externally outputted, the frequency of assignment of multiple labels to the same object is remarkably reduced. Further, in the case of occurrence of the label diversion, the contents of the concatenation table are corrected, so that the temporary label image is not required and the label integrating process can be performed with only the concatenation table. Therefore, a process time required for analyzing the relationship among labels can be remarkably reduced, and thus the labeling circuit can perform the labeling of the binary image at a high speed.

(5) The binary image is scanned with the binary mask formed of a horizontal row including three pixels and a vertical column including two pixels, the run label of the adjacent run is read upon detection of the leading end of the adjacent run, the concatenation table is referred to using this read run label as the address, the concatenated label at this time and the concatenation table data read from the concatenation table are compared, and the temporary label for the adjacent run is determined in accordance with the result of comparison. Therefore, in the temporary label image to be externally outputted, the frequency of assignment of multiple labels to the same object is remarkably reduced, and thus a load in the process of analyzing the label concatenation relationship can be remarkably reduced.

(6) Since the respective components operate based on the clock signal which is prepared by frequency-multiplying the external clock signal, all of the processing steps which are required for one binary mask can be performed within one cycle of input of the binary image, so that the temporary label production operation can be performed at a high speed.

(7) When the label diversion occurs, the content of the concatenation table is corrected, so that the frequency of occurrence of the label separation in the concatenation table is remarkably reduced, so that it is possible to form the concatenation table which does not require the temporary label image for the label integrating process. As a result, the labeling circuit can perform the labeling of the binary image at a high speed.

(8) The binary mask is produced from the input binary pixel data, and the binary mask is formed of the pixels arranged in two horizontal rows and two vertical columns on the screen. Therefore, the scale of the circuitry for producing this binary mask is remarkably reduced. Further, the circuit structure for decoding the binary mask and performing necessary processing can also have a small scale. Upon detection of the leading end of the adjacent run, the run label of this adjacent run is searched and read from the run label storage, the concatenation table is referred to using the read run label, the referred concatenation table data and the concatenated label data applied from the concatenated label storage are compared with each other, and the temporary label for the adjacent run is determined in accordance with the result of the comparison. Therefore, in the temporary label image to be externally outputted, the frequency of assignment of multiple labels to the same object is remarkably reduced. Further, the respective components are operated by preparing and using the clock signal which has the frequency equal to a product of the frequency of the clock signal used for input of the binary image data by a constant number. Therefore, all the steps required for one binary mask is performed in a pipeline manner and completed within one cycle period of external input of one pixel data. Therefore, the temporary label applying process can be performed at a high speed. Since the contents of the concatenation table are corrected when the label diversion occurs, it is possible to form the concatenation table which does not require the temporary label image in the label integrating process. As a result, the labeling circuit can perform the labeling of the binary image at a high speed.

(9) The address in the concatenation table and the data stored at the address are compared with each other, and rewrite of the concatenation table is performed in accordance with a result of the comparison. Therefore, the process for the above can be simple, and a conversion table is not required, so that a storage region can be small, resulting in reduction of the device scale.

(10) The analysis of the concatenation table is performed by rewriting the concatenation table with a hardware in accordance with a result of comparison between the address in the concatenation table and the stored data. Therefore, a load in software processing is reduced, and the labeling process can be performed at a high speed. Further, the concatenation table is not required, and the storage region can be small.

(11) The temporary label value obtained by scanning the temporary label image is used as the address input for the concatenation table. This input address as well as the label value and the analysis flag contained in the concatenation table data are inspected, and the concatenation table is rewritten. Then, the concatenation table is analyzed, and the temporary label is converted into the final label. Therefore, the labeling process is simplified and its speed is increased. Further, a conversion table is not required, and hence a storage region is reduced.

(12) The temporary label value obtained by scanning the temporary label image is used as the address input for the concatenation table. The address of this concatenation table as well as the label value and analysis flag of the stored data in the concatenation table are inspected. Then, the concatenation table is rewritten, and the concatenation table is analyzed. Further, all the operation including the final labeling operation, i.e., operation for assigning final labels are performed with a hardware. Therefore, a load in the software processing is reduced, and a high-speed operation is enabled. Also, the storage region can be small.

(13) In connection with the operations of the hardware described at the above item (12), operation timings of the internal circuits are specified by multiplying the frequency of the external clock signal used for specifying the temporary label input cycle. Therefore, the internal circuits can be in a pipeline form, and high-speed operations are allowed.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A labeling method for labeling a run in a binary image through scanning of said binary image with a unit mask formed of a local image region consisting of binary image bilevel data of pixels continuously adjoining to each other on said binary image and arranged in P rows and Q columns, comprising the steps of:

carrying out a search in a row adjacent to a row containing a reference run including a reference pixel in said unit mask, so as to search an adjacent run adjoining to said reference run, provisionally assigning a run label to said reference run in accordance with a result of said search, and storing said provisionally assigned run label at a trailing end of said reference run in a memory;

when said unit mask region extracts said reference run as an adjacent run, referring to said provisionally assigned run label stored in said memory, propagating said provisionally assigned run label to a new reference run for provisionally assigning a run label to said new reference run and determining a label for said reference run which is detected as said adjacent run; and if said run label propagated to said new reference run is different from a run label of a new adjacent run adjoining to said new reference run, storing at an address, which is equal to one of label values of the different two labels, in a concatenation table the other label value of the different two labels for storing a concatenation relationship between runs in said concatenation relationship; wherein said step of determining a label for said reference run includes the steps of, referring to said concatenation table using a run label which is referred to upon detection of a leading end of said adjacent run, and determining both of said label of said adjacent run and the label of said reference run concatenated to said adjacent run in accordance with referred contents of said concatenation table and said referred run label.

2. A labeling circuit comprising:

binary mask producing means for receiving a binary image data series obtained by raster-scan of a binary image and producing a binary mask by extracting a binary image bilevel pixel data P(i, j) at a position of an ith row and a jth column in said binary image and binary image bilevel pixel data P(i−1, j), P(i−1, j−1), P(i−1, j−2), P(i, j−2) and P(i, j−1) adjacent to said binary image bilevel pixel data P(i, j), said binary mask consisting of the bilevel pixel data P(i, j), P(i−1, j), P(i−1, j−1), P(i−1, j−2), P(i, j−1) and P(i, j−2);

run label storing means for storing, as a run label of a reference run, one label representing labels assigned to one or more adjacent run on a (i−1)th row adjacent to said reference run to which said binary image bilevel pixel data belongs;

run label storage control means responsive to said binary mask supplied from said mask producing means for detecting a trailing end of said reference run and responsive to detection of said trailing end to store said run label assigned to said reference run in said run label storing means;

concatenated label storing means for storing and supplying, as a concatenated label, the newest label among labels assigned to one or more adjacent runs existing in a column preceding the jth column in a raster-scanning order when a plurality of adjacent runs exist;

integrated label feeding means for feeding two labels when said two labels are detected to be different from each other and are assigned to a common region in said binary image;

integration processing means including a concatenation table, and receiving the two labels sent from said integrated label feeding means to write one of said two labels, which is selected as a temporary label of said reference run, at an address in said concatenation table, said address being equal in value to the nonselected label of said two labels;

run label read control means responsive to said binary mask outputted from said mask producing means for detecting a leading end of said adjacent run, and also responsive to detection of said leading end to read said run label, which was stored when said adjacent run was said reference run, from said run label storing means, and, using the read run label as an address, to read data from said concatenation table;

temporary label determining means for detecting coincidence and noncoincidence between the label read from said concatenation table, and the concatenated label read from said concatenated label storing means, and for determining the run label of said reference run in accordance with a result of said detection, and determining and outputting the label of the binary image bilevel pixel data as a temporary label, said temporary label determining means including means for controlling the label feeding operation of said integrated label feeding means in accordance with a result of detection of said temporary label determining means said run label from said temporary label determining means supplied to said run label storing means and to said concatenated label storing means; and new label counter means having an output selected as said temporary label and having contents changed by a unit value, when said temporary label determining means detects a new object in accordance with the result of detection by said temporary label determining means.

3. A labeling circuit comprising:

binary mask producing means for receiving a binary image data series obtained by raster-scan of a binary image and producing a binary mask of bilevel pixel data of two rows and two columns by extracting a binary image bilevel data P(i, j) at a position of an ith row and a jth column in said binary image as well as binary image bilevel data P(i−1, j−1), P(i−1, j) and P(i, j−1) adjacent to a position at said ith row and jth column;

run label storing means for storing, as a run label of a reference run, one label representing labels assigned to one or more adjacent runs on a (i−1)th row adjoining to said reference run to which a reference binary image bilevel data belongs;

run label storage control means responsive to said binary mask for detecting a trailing end of said reference run and also responsive to detection of said trailing end to store the run label assigned to said reference run in said run label storing means;

concatenated label storing means for storing, as a concatenated label, the newest label among labels of adjacent runs existing in columns preceding the jth column in a raster-scanning order if a plurality of adjacent runs exist;

integrated label feeding means for feeding two labels when said two labels are detected to be different from each other and be assigned to a common object region in said binary image;

integration processing means including a concatenation table and receiving the two labels sent from said integrated label feeding means and writing one of said two labels, which one is selected as a temporary label of said reference run, at an address in said concatenation table, said address being equal to the nonselected label between said two labels;

run label read control means responsive to said binary mask for detecting a leading end of said adjacent run, and also responsive to detection of said leading end for reading the run label, which was stored when said adjacent run was a reference run, from said run label storing means, and, using the read run label as an address, to read data from said concatenation table;

temporary label determining means for detecting coincidence and noncoincidence between the label read from said concatenation table and the concatenated label read from said concatenated label storing means, and for determining a run label of said reference run in accordance with a result of said detection, and determining and outputting the label of the binary image bilevel data as a temporary label, said temporary label determining means including means for controlling the label feeding operation of said integrated label feeding means in accordance with a result of detection of said temporary label determining means, said run label determined by said temporary label determining means being supplied to said run label storing means and said concatenated label storing means; and new label counter means having an output selected as said temporary label and having a count changed by a unit value when said temporary label determining means detects a new object in accordance with the result of detection by said temporary label determining means.

4. A labeling circuit comprising:

mask producing means for receiving a binary image data series, which is obtained by raster-scan of a binary image, in synchronization with a clock signal, and producing a binary mask in two rows and three columns by extracting a binary image bilevel data P(i, j) at a position of an ith row and a jth column in said binary image as well as binary image bilevel data P(i−1, j), P(i−1, j−1), P(i−1, j−2), P(i, j−2) and P(i, j−1) of pixels adjacent to a pixel of said binary image data P(i, j);

run label storing means for storing as a run label of a reference run, one label representing labels assigned to one or more adjacent runs on a (i−1)th row adjacent to said reference run to which said binary image data belongs;

run label storage control means responsive to said binary mask for detecting a trailing and of said reference run and also responsive to detection of said trailing end for storing said run label assigned to said reference run in said run label storing means;

concatenated label storing means for storing, as a concatenated label, the newest label among labels assigned to adjacent runs existing in columns preceding the jth column in a raster-scanning order if a plurality of adjacent runs exist;

integrated label feeding means for feeding two labels when said two labels are detected to be different from each other and to be assigned respectively to two runs concatenated together;

integration processing means including a concatenation table and receiving the two labels sent from said integrated label feeding means and for writing one of said different two labels, which is selected as a temporary label of said reference run, at an address in said concatenation table, said address being equal in value to the nonselected label between said two labels;

run label read control means responsive to said binary mask outputted from said mask producing means for detecting a leading end of an adjacent run, and also responsive to detection of said leading end for reading the run label, which was stored when said adjacent run was scanned as said reference run, from said run label storing means, and for reading data from said concatenation table using the read run label as an address;

temporary label determining means for detecting coincidence and noncoincidence between the label read from said concatenation table by said run label read control means and the concatenated label read from said concatenated label storing means, and for determining a run label of said reference run in accordance with the result of detection, and determining and outputting, as a temporary label, the label of the binary image bilevel data, said temporary label determining means including means for controlling the label data feeding operation of said integrated label feeding means in accordance with the result of detection of said temporary label determining means, said run label of said temporary label determining means being supplied to said run label storing means and to said concatenated label storing means;

new label counter means having an output selected as said temporary label and having a count changed by a unit value when said temporary label determining means detects a new object in accordance with the result of detection by said temporary label determining means; and clock multiplying means for receiving said clock signal and producing a clock having a frequency being a product of a frequency of the received clock signal and a constant number, said mask producing means, said run label storage control means, said integrated label feeding means, said integration processing means, said run label read control means, and said temporary label determining means operating in response to said clock signal supplied from said clock multiplying means.

5. A labeling circuit comprising:

mask producing means for receiving a binary image data series, which is obtained by raster-scan of a binary image, in synchronization with a clock signal, and producing a binary mask in two rows and two columns by extracting a binary image bilevel data P(i, j) at a position of an ith row and a jth column in said binary image as well as binary image bilevel data P(i−1, j−1), P(i−1, j) and P(i, j−1) of pixels adjacent to a pixel of said binary image bilevel data P(i, j);

run label storing means for storing, as a run label of a reference run, one label representing labels assigned to one or more adjacent runs on a (i−1)th row adjacent to said reference run to which said binary image data bilevel belongs;

run label storage control means responsive to said binary mask supplied from said mask producing means for detecting a trailing end of said reference run and also responsive to detection of said trailing end for storing said run label assigned to said reference run in said run label storing means;

concatenated label storing means for storing, as a concatenated label, the newest label among labels assigned to adjacent runs existing in columns preceding the jth column in a raster-scanning order case if a plurality of adjacent runs exist;

integrated label feeding means for feeding two different labels when it is detected that said two different labels are assigned respectively to runs concatenated together in said binary image;

integration processing means including a concatenation table and receiving said two different labels sent from said integrated label feeding means and writing one of said two different labels, which is selected as a temporary label of said reference run, at an address in said concatenation table, said address being equal in value to nonselected label between said two different labels;

run label read control means responsive to said binary mask outputted from said mask producing means for detecting a leading end of said adjacent run, and also responsive to detection of said leading end for reading said run label, which was stored when said adjacent run was said reference run, from said run label storing means, and using said run label as an address, to read data from said concatenation table;

temporary label determining means for detecting coincidence of noncoincidence between the label read from said concatenation table by said run label read control means and a concatenated label read from said concatenated label storing means, and for determining a run label of said reference run in accordance with result of the detection, and determining said run label as a temporary label of the binary image bilevel data, said temporary label determining means including means for controlling label feeding operation of said integrated label feeding means in accordance with result of detection of said temporary label determining means, said run label determined by said temporary label determining means being supplied to said run label storing means and said concatenated label storing means;

new label counter means having an output selected as said temporary label and also having a count changed by a unit value when said temporary label determining means detects a new object in accordance with the result of detection by said temporary label determining means; and clock multiplying means for receiving said clock signal and producing a clock having a frequency being a product of a frequency of the received clock signal and a constant number, said clock produced by said clock multiplying means providing timing of said mask producing means, said run label storage control means, said integrated label feeding means, said integration processing means, said label read control means and said temporary label determining means.

6. A labeling method in which an image data is scanned with a local image region to be labeled, comprising the steps of:

(a0) scanning said image data on a unit of said local image region consisting of bilevel pixel data and detecting a run and assigning a label to said run;

(a) where a plurality of labels are assigned to a common image region, selecting the smallest label value among said plurality of labels as a label to be propagated in a subsequent scanning operation;

(b) using the selected label value as data, using a nonselected label value as an address, and storing said label values in a form of a table;

(c) repeating said steps (a) and (b) to assign a temporary label to each image data;

(d) comparing in value a first address in said table with a first data stored at said first address;

(e) writing a new label value as storage contents to be stored at said first address into said table when the results of said comparison at said step (d) indicates that said first address is equal in value to said first data;

(f) storing a second data, which is stored at an address specified by said first data, at said first address of said table when the result of said comparison at said step (d) indicates that said first address is different in value from said first data; and (g) successively and repetitively performing said steps (d), (e) and (f) starting from the minimum address of said table after completion of said step (c).

7. A labeling circuit for scanning an image data with a local image region and labeling each image data, comprising:

means for scanning said image data on a unit of said local image region consisting of bilevel pixel data, detecting a run on said image data, and assigning a label to said run;

label storing means for performing storage during scanning, when a plurality of labels are concatenated to a common image region, by using the smallest label value among said plurality of labels as a data to be stored and using a nonselected label value as an address;

first counter means for successively performing a count-up operation using a minimum label value of possible label values as an initial value;

comparing means for reading a first data in said label storing means using an output count of said first counter means as an address, and comparing said first data with said output count of said first counter means;

a second counter means for performing a count-up operation using the minimum value of said possible labels as an initial value;

means responsive to detection of coincidence by said comparing means for storing an output count of said second counter means in said label storing means using said output count of said first counter means as an address, and for incrementing said output count of said second counter means; and means responsive to detection of noncoincidence by said comparing means for storing a second data stored at an address specified by said first data in said label storing means using said output count of said first counter means as an address.

8. A labeling method of scanning an image data in a bilevel image on a unit of a local image region consisting of bilevel image data and labeling each image data, comprising the steps of:

during the scanning operation, detecting a run in said bilevel image, and assigning a label to said run;

when a plurality of labels are assigned to a common image region during the scanning operation, assigning a temporary label to each of said image data by employing a label among said plurality of labels, which has a smallest label value, as a label value to be propagated in the subsequent scanning operation;

writing a data into a table using said employed label value as data to be written and using a nonselected label value as an address;

assigning a flag to each data stored in said table, said flag being initially set to a state indicative of an unprocessed state;

scanning an image data bearing a temporary label, and reading a first data including a label value and a flag from said table using the label assigned to the scanned image data;

when said flag of said first data indicates a processed state, outputting the label value of said first data as a final label value for the scanned image data;

when said flag of said first data indicates the unprocessed state, comparing in value the label of said first data with said first address;

when equality is found in said step of comparing, storing a second data having a new label value and said flag indicative of the processed state concatenated to each other, at said first address in said table, and outputting said new label value as the final label value; and when inequality is found in said step of comparing storing a third data, which is stored at an address specified by said first data in said table, at said first address in said table, and outputting a label value of said third data as the final label value.

9. A labeling circuit for scanning a local image region in an image and producing a final label image from a temporary label image which is produced by assigning a temporary label to each image data in said image, comprising:

concatenation relationship storing means for performing storage by using a minimum label value as a write data and using a nonselected label value as an address when a plurality of labels are concatenated to a common image region during said scanning operation, and by linking a flag indicative of a processed and unprocessed state to each data to be stored and forming one data, said label of the minimum value being propagated in the subsequent scanning operation;

first reading means for receiving an image data bearing a temporary label, and reading a first data from said concatenation relationship storing means using the received inputted temporary label image data as an address;

register means for storing said first data read from said first reading means;

second reading means for reading a second data from said concatenation relationship storing means using said first data as an address;

comparing means for detecting coincidence and noncoincidence between the label value of said first data read by said first reading means and the temporary label value of said received image;

counter means for performing count-up using the minimum value of said temporary label as an initial value;

selecting means for selecting and outputting one of a count of said counter means, said first data stored in said register means and said second data;

decoding means for performing decoding of an output of said comparing means and a flag of said first data, and generating a signal for controlling the count-up operation of said counter means and a selecting operation of said selecting means, in accordance with the result of decoding, said decoding means including (i) means for generating a first control signal for controlling said selecting means to select said first data stored in said register means, when said flag is indicative of the processed state; (ii) means for generating a second control signal, for controlling said selecting means to select said second data when said flag is indicative of the unprocessed state and an output of said coincidence detecting means is indicative of noncoincidence, (iii) means for generating a third control signal for controlling said selecting means to select an output count of said counter means, and a fourth control signal for updating the count of said counter means after the selecting operation of said selecting means, when said flag is indicative of the unprocessed state and the output of said coincidence detecting means is indicative of coincidence;

means for writing data outputted by said selecting means into said concatenation relationship storing means while setting a corresponding flag to the processed state, using the label value of said received temporary label image as an address; and means for outputting the label value of said data outputted from said selecting means as a final label value.

10. The labeling circuit according to claim 9, further comprising frequency multiplying means for frequency-multiplying a clock signal which determines a cycle of application of said temporary label image data; and control means coupled to said frequency multiplying means for providing timings of operations of said first and second reading means, said comparing means, said decoding means, said selecting means, said writing means and said output means in response to a clock signal supplied from said frequency multiplying means.

11. A method of labeling a pixel in a binary image including a plurality of pixels each having a binary pixel data, comprising the steps of:

receiving a series of pixel data produced through raster-scanning of said binary image for producing a binary mask including a predetermined number of bilevel pixel data arranged in rows and columns and having an upper row scanning an adjacent run and a lower row scanning a reference run;

responsive to said binary mask, detecting a leading end of an adjacent run;

responsive to detection of the leading end of the adjacent run, reading a run label related to the adjacent run from a run label storage, said run label storage storing each run label for each reference run and supplying a corresponding run label when a reference run is scanned as an adjacent run;

accessing a concatenation table with the read out run label from the run label storage as an address for reading a corresponding data;

selecting a smallest run label among run labels related to adjacent runs adjoining to the reference run, and producing a concatenation data;

responsive to detection of leading end of the adjacent run, comparing said corresponding data from the concatenation table and the concatenation data and determining a temporary label according to the result of comparison;

according to a binary data value of a reference pixel in the reference run in said binary mask, selecting one of the temporary label and a predetermined constant value and outputting the selected one as a final temporary label; and detecting a trailing end of the reference run, and responsive to the detection of the trailing end, storing said temporary label into said run label storage.

12. The method according to claim 11, wherein said step of producing a concatenation data includes the step of latching the temporary label data in response to the detection of the leading end of the adjacent run to produce said concatenation data.

13. The method according to claim 11 wherein said step of determining a temporary label includes the steps of, when said corresponding data from the table and said concatenation data are equal in value to each other, issuing a new label as said temporary label, said new label being produced by a counter, when said corresponding data is equal in value to zero and said concatenation label is different in value from zero, issuing said concatenation data as said temporary label, when said corresponding data is different in value from zero and said concatenation data is equal in value to zero, issuing said corresponding data as said temporary label, when said corresponding data and said concatenation data each are different in value from zero and said corresponding data is equal in value to said concatenation data, issuing either of said corresponding data and said concatenation data as said temporary label, and when said corresponding data and said concatenation label each are different in value from zero and said corresponding data is different in value from said concatenation label, issuing said corresponding data and said concatenation label whichever is smaller in value as said temporary label.

14. The method according to claim 11, further comprising the steps of, according to said corresponding data and said concatenation label, determining whether divergence of labels occurs, and when the divergence occurs, writing data selected as said temporary label of said corresponding data and said concatenation label into said concatenation table at an address specified by the other one out of said corresponding data and said concatenation label, and wherein a smaller one of said corresponding data and said concatenation table is selected and issued as said temporary data when said divergence occurs.

15. The method according to claim 14, wherein said divergence of labels is detected to occur when said corresponding data and said concatenation table are different in value from each other and from zero.

16. The method according to claim 11, further comprising the steps of detecting an interruption of the adjacent run and the reference run responsive to said binary mask, and responsive to the detection of interruption, resetting said concatenation label to a predetermined initial value.

17. A method of labeling a pixel in a binary image including a plurality of pixels each having a binary pixel data, comprising the steps of:

receiving a series of pixel data produced through raster-scanning of said binary image for producing a binary mask including a predetermined number of pixel data arranged in rows and columns and having an upper row scanning an adjacent run and a lower row scanning a reference run;

responsive to said binary mask, detecting a leading end of an adjacent run;

responsive to detection of the leading end of the adjacent run, reading a run label related to the adjacent run from a run label storage, said run label storage storing each run label for each reference run and supplying a corresponding run label when a reference run is scanned as an adjacent run;

accessing a concatenation table with the read out run label from the run label storage as an address for reading a corresponding data;

selecting a smallest run label among run labels related to adjacent runs adjoining to the reference run, and producing a concatenation data;

responsive to detection of leading end of the adjacent run, comparing said corresponding data from the concatenation table and the concatenation data and determining a temporary label according to the result of comparison;

according to a binary data value of a reference pixel in the reference run in said binary mask, selecting one of the temporary label and a predetermined constant value and outputting the selected one as a final temporary label; and detecting a trailing end of the reference run, and responsive to the detection of the trailing end, storing said temporary label into said run label storage;

(a) initializing both a temporary label counter and a final label counter to initial counts, (b) accessing said concatenation table with a count of said temporary label counter as an address for reading a first corresponding storage content therefrom, (c) comparing the count of said temporary label counter with the first corresponding storage content, (d) when the result of comparison in said step (c) indicates noncoincident, accessing said concatenation table with the corresponding storage content as an address for reading a second corresponding storage content therefrom, and (e) writing said second corresponding storage content into said concatenation table with the count of said temporary label counter as an address.

18. The method according to claim 17, wherein said step (a) includes the step of initializing the counts of the temporary label counter and the final label counter to a count equal in value to a minimal label value.

19. The method according to claim 17, further comprising the steps of incrementing the count of said temporary counter, and repeating the steps (b) through (e).

20. The method according to claim 17, further comprising the step of writing data equal to the count of said final label counter into said concatenation table with said first concatenation table with said first corresponding storage content as an address when the result of comparison in said step (c) indicates coincident.

21. The method according to claim 20, wherein said step of writing includes the step of incrementing the count of said final label counter in response to the detection of coincidence in said step (c) and then accessing said concatenation table with the incremented count as an address.

22. The method according to claim 20, further comprising the step of supplying the data equal to the count of said final label counter as a final label data in parallel with the writing thereof into said concatenation table.

23. The method according to claim 20, wherein said first corresponding storage content includes a label data indicating a label and an analysis flag indicating that said label data has been processed, and wherein said step of writing includes the step of setting the analysis flag into a state that said label data has been processed.

24. The method according to claim 17, further comprising the step of inhibiting updating of the count of said final label counter when the result of comparison in said step (b) indicates noncoincident.

25. The method according to claim 17, further comprising the step of supplying said second corresponding storage content as a final label data in parallel with said step (e) of writing.

26. The method according to claim 17, wherein each of storage contents in said concatenation table includes a label data indicating a label and an analysis flag indicating whether the label data has been processed, and wherein said method further comprises, after the step (b), the steps of determining whether an analysis flag indicates that the first corresponding storage content has been processed, proceeding to the step (c) of comparing when said analysis flags indicates that the first corresponding storage content is unprocessed, and issuing a label data in said first corresponding storage content as a final label data when said analysis flag indicates that the first corresponding storage content has been processed.

27. The method according to claim 26, wherein said step (e) of writing includes the step of setting an analysis flag on the second corresponding storage content into a state indicating that the second corresponding storage content is processed.

28. A method of labeling a pixel in a binary image including a plurality of pixels each having a binary pixel data, comprising the steps of:

receiving a series of pixel data produced through raster-scanning of said binary image for producing a binary mask including a predetermined number of bilevel pixel data arranged in rows and columns and having an upper row scanning an adjacent run and a lower row scanning a reference run;

responsive to said binary mask, detecting a leading end of an adjacent run;

responsive to detection of the leading end of the adjacent run, reading a run label related to the adjacent run from a run label storage, said run label storage storing each run label for each reference run and supplying a corresponding run label when a reference run is scanned as an adjacent run;

accessing a concatenation table with the read out run label from the run label storage as an address for reading a corresponding data;

selecting a smallest run label among run labels related to adjacent runs adjoining to the reference run, and producing a concatenation data;

responsive to detection of leading end of the adjacent run, comparing said corresponding data from the concatenation table and the concatenation data and determining a temporary label according to the result of comparison;

according to a binary data value of a reference pixel in the reference run in said binary mask, selecting one of the temporary label and a predetermined constant value and outputting the selected one as a final temporary label; and detecting a trailing end of the reference run, and responsive to the detection of the trailing end, storing said temporary label into said run label storage, wherein said step of producing a binary mask includes the step of producing a binary mask including pixel data arranged in two rows and two columns.

29. A method for producing a final label for respective runs in a binary image through use of a concatenation table storing data each indicating concatenation destination run with run labels temporarily assigned to respective runs as addresses, comprising the steps of:

(a) initializing a temporary label counter and a final label counter to initial counts, (b) accessing said concatenation label with a count of said temporary counter as an address for reading out a first corresponding data therefrom;

(c) comparing in value a count of said temporary label counter and said first corresponding data; and (d) according to the result of comparison in said step of comparing, determining a final label value to be written into said concatenation table at the address specified by the count of the temporary label counter, and writing the final label value onto said concatenation table at said address.

30. The method according to claim 29, wherein said step of determining includes the step of selecting a count of said final label counter as said final label value when the result of comparison indicates that the count of the temporary label counter is equal in value to said first corresponding data.

31. The method according to claim 30, wherein said step of writing includes the step of incrementing the count of said final label counter for writing.

32. The method according to claim 29, wherein said step of determining includes when said result of comparison indicates coincidence, the steps of accessing said concatenation table with said first corresponding data as an address and reading a second corresponding data therefrom, and selecting the second corresponding data as the final label value.

33. The method according to claim 29, further comprising the step of outputting said final label value in parallel with the writing of said final label value into said concatenation table.

34. The method according to claim 29, wherein said concatenation table further stores analysis flags for the respective data stored therein, each of said analysis flag indicating whether a corresponding data is processed, and wherein said method further includes the steps of, in said step (b) of accessing, reading out an analysis flag corresponding to said first corresponding data, responsive to the analysis flag read out indicating that the first corresponding data has been processed, supplying said first corresponding data as the final label.

35. The method according to claim 34, further comprising the steps of, responsive to said analysis flag indicating that the first corresponding data has been processed, disabling the step (c) of comparing, and incrementing the count of said temporary label counter to proceed to the step (b) of accessing.

36. The method according to claim 34, further comprising the steps of, responsive to the analysis flag indicating that the first corresponding data is unprocessed, proceeding to the step (c) of comparing, and setting said analysis flag into a state indicating that a corresponding data is processed for writing simultaneously with said step (d) of writing.

37. An apparatus for labeling a pixel in an image including a plurality of pixels each having a bilevel pixel data, comprising:

binary mask producing means receiving a series of pixel data produced through raster-scanning of said image for producing a binary mask consisting of a predetermined number of bilevel pixel data arranged in rows and columns and having an upper row scanning an adjacent run and a lower row scanning a reference run;

run label storage means for storing run labels for respective adjacent runs;

run label read control means responsive to said binary mask for detecting a leading end of an adjacent run and responsive to the detection of the leading end of the adjacent run for reading a corresponding run label related to said adjacent run from said run label storage means;

concatenation storage means for storing run labels related to adjacent runs adjoining to a reference run and supplying a smallest run label as a concatenation data;

a concatenation table storing data representing concatenation relationship among runs on said image;

accessing means for accessing said concatenation table with the run label read from said run label storage means as an address for reading a corresponding data therefrom;

determination means responsive to detection of the leading end of said adjacent run for comparing said corresponding data from said concatenation table and said concatenation data from said concatenation storage means and determining a temporary label and a run label for the reference run according to the result of comparison, said run label determined by said determination means being supplied to said run label storage means and said concatenation storage means; and temporary label feeding means responsive to a data value of a reference pixel in the reference run in said binary mask for selecting one of data indicating said temporary label from said determination means and a predetermined constant data as a final temporary label for external outputting.

38. The apparatus according to claim 37, further comprising run label storage control means responsive to said binary mask for detecting a trailing end of said reference run and responsive to detection of said trailing end for storing said temporary label into said run label storage means as a run label for said reference run, said temporary label being equal to said run label for said reference run.

39. The apparatus according to claim 38, wherein said run label storage means supplies the run label when said reference run is scanned as an adjacent run by said binary mask.

40. The apparatus according to claim 37, wherein said run label storage means comprises a first-in first-out type memory.

41. The apparatus according to claim 37, wherein said concatenation storage means comprises a latch responsive to detection of the leading end of the adjacent run for latching and outputting the data indicating said temporary label as said concatenation data.

42. The apparatus according to claim 41, wherein said concatenation storage means includes means responsive to said binary mask for detecting an interruption of the reference run and the adjacent run to reset said latch.

43. The apparatus according to claim 37, further comprising divergence detecting means responsive to said corresponding data and said concatenation data for detecting whether a divergence of labels occurs, means responsive to said divergence detecting means detecting that the divergence occurs for writing a smaller one of said corresponding data and said concatenation data into said concatenation table with a larger one of said corresponding data and said concatenation data as an address.

44. The apparatus according to claim 43, wherein said divergence detecting means detects the occurrence of divergence when said corresponding data and said concatenation data each are different from zero and said corresponding data is different in value from said concatenation data.

45. An apparatus for labeling a pixel in an image including a plurality of pixels each having a binary pixel data, comprising:

binary mask producing means receiving a series of pixel data produced through raster-scanning of said image for producing a binary mask including a predetermined number of pixel data arranged in rows and columns and having an upper row scanning an adjacent run and a lower row scanning a reference run;

run label storage means for storing run labels for respective adjacent runs;

run label read control means responsive to said binary mask for detecting a leading end of an adjacent run and responsive to the detection of the leading end of the adjacent run for reading a corresponding run label related to said adjacent run from said run label storage means;

concatenation storage means for storing run labels related to adjacent runs adjoining to a reference run and supplying a smallest run label as a concatenation data;

a concatenation table storing data representing concatenation relationship among runs on said image;

accessing means for accessing said concatenation table with the run label read from said run label storage means as an address for reading a corresponding data therefrom;

determination means responsive to detection of the leading end of said adjacent run for comparing said corresponding data from said concatenation table and said concatenation data from said concatenation storage means and determining a temporary label and a run label for the reference run according to the result of comparison; and a temporary label feeding means responsive to a data value of a reference pixel in the reference run in said binary mask for selecting one of data indicating said temporary label from said determination means and a predetermined constant data as a final temporary label for external outputting wherein said determination includes, a new label counter for supplying a count, first means for detecting that said corresponding data from said concatenation table is equal in value to said concatenation data for selecting and issuing the count of said new label counter as said temporary label, second means for detecting that said corresponding data is zero and said concatenation data is different from zero to select and issue said concatenation data as said temporary label, third means for detecting that said corresponding data is different from zero and said concatenation data is different from zero to select and issue said corresponding data as said temporary data, fourth means detecting that said corresponding data and said concatenation data each are different from zero and said corresponding data is equal in value to said concatenation data to select and issue either of said corresponding data and said concatenation data as said temporary data, and fifth means for detecting that said corresponding data and said concatenation data each are different from zero and said corresponding data is different in value from said concatenation data to select and issue the corresponding data and said concatenation data whichever is smaller as said temporary data.

46. An apparatus for labeling a pixel in an image including a plurality of pixels each having a binary pixel data, comprising:

binary mask producing means receiving a series of pixel data produced through raster-scanning of said image for producing a binary mask including a predetermined number of pixel data arranged in rows and columns and having an upper row scanning an adjacent run and a lower row scanning a reference run;

run label storage means for storing run labels for respective adjacent runs;

run label read control means responsive to said binary mask for detecting a leading end of an adjacent run and responsive to the detection of the leading end of the adjacent run for reading a corresponding run label related to said adjacent run from said run label storage means;

concatenation storage means for storing run labels related to adjacent runs adjoining to a reference run and supplying a smallest run label as a concatenation data;

a concatenation table storing data representing concatenation relationship among runs on said image;

accessing means for accessing said concatenation table with the run label read from said run label storage means as an address for reading a corresponding data therefrom;

determination means responsive to detection of the leading end of said adjacent run for comparing said corresponding data from said concatenation table and said concatenation data from said concatenation storage means and determining a temporary label and a run label for the reference run according to the result of comparison; and a temporary label feeding means responsive to a data value of a reference pixel in the reference run in said binary mask for selecting one of data indicating said temporary label from said determination means and a predetermined constant data as a final temporary label for external outputting;

a temporary label counter for supplying a count, a final label counter for supplying a count, first accessing means for accessing to said concatenation table with the count of said temporary counter as an address to read a first corresponding data therefrom, coincidence detecting means for detecting coincidence n value between the count of said temporary label counter and said first corresponding data, second accessing means responsive to said coincidence detecting means detecting non-coincidence for accessing said concatenation table with the first corresponding data as an address for reading a second corresponding data therefrom, and write control means responsive to said coincidence detecting means detecting noncoincidence for writing said second corresponding data into said concatenation table with said count of said temporary label counter as an address.

47. The apparatus according to claim 46, wherein said coincidence detecting means includes means for incrementing the count of said final label counter.

48. The apparatus according to claim 46, wherein said write control means further includes means responsive to said coincidence detecting means detecting coincidence for writing the count of said final label counter into said concatenation table with said count of said temporary label counter as an address.

49. The apparatus according to claim 48, wherein said write control means writes said first corresponding data after the count of said final label counter is incremented in response to detection of coincidence by said coincidence detecting means.

50. The apparatus according to claim 48, further comprising output means for supplying said count of the final label counter as a final label value.

51. The apparatus according to claim 46, further comprising means for initializing said temporary label counter and said final label counter to an initial count equal in value to a minimum label value.

52. The apparatus according to claim 46, further comprising means for incrementing the count of said temporary label counter after the writing into said concatenation table by said write control means.

53. The apparatus according to claim 46, wherein said concatenation table stores analysis flags for the respective data, each of said analysis flag indicating whether a corresponding data has been processed, and wherein said first accessing means for reading a corresponding analysis flag simultaneously with the reading of said first corresponding data, and wherein said apparatus further comprising flag decode means responsive to said corresponding analysis flag indicating that the first corresponding data has been processed for supplying said first corresponding data as a final label value and for inhibiting said coincidence detecting means, said second accessing means and said write control means from operating.

54. The apparatus according to claim 53, wherein said flag decode means includes means responsive to said corresponding analysis flag means indicating that the first corresponding data has been unprocessed for enabling said coincidence detecting means, said second accessing means and said write control means.

55. The apparatus according to claim 46, further comprising output means for supplying said second corresponding data as a final label in parallel with writing operation of said write control means.

56. An apparatus for producing a final label for respective runs in a binary image through use of a concatenation table storing data each indicating concatenation destination run with run labels temporarily assigned to respective runs as addresses, comprising;

a temporary label counter for supplying a count, a final label counter for supplying a count, first accessing means for accessing to said concatenation table with the count of said temporary counter as an address to read a first corresponding data therefrom, coincidence detecting means for detecting coincidence in value between the count of said temporary label counter and said first corresponding data, second accessing means responsive to said coincidence detecting means detecting non-coincidence for accessing said concatenation table with the first corresponding data as an address for reading a second corresponding data therefrom, and write control means responsive to said coincidence detecting means detecting noncoincidence for writing said second corresponding data into said concatenation table with said count of said temporary label counter as an address.

57. The apparatus according to claim 56, wherein said coincidence detecting means includes means for incrementing the count of said final label counter.

58. The apparatus according to claim 56, wherein said write control means further includes means responsive to said coincidence detecting means detecting coincidence for writing the count of said final label counter into said concatenation table with said count of said temporary label counter as an address.

59. The apparatus according to claim 58, wherein said write control means writes said first corresponding data after the count of said final label counter is incremented in response to detection of coincidence by said coincidence detecting means.

60. The apparatus according to claim 58, further comprising output means for supplying said count of the final label counter as a final label value.

61. The apparatus according to claim 56, further comprising means for initializing said temporary label counter and said final label counter to an initial count equal in value to a minimum label value.

62. The apparatus according to claim 56, further comprising means for incrementing the count of said temporary label counter after the writing into said concatenation table by said write control means.

63. The apparatus according to claim 56, wherein said concatenation table stores analysis flags for the respective data, each of said analysis flag indicating whether a corresponding data has been processed, and wherein said first accessing means includes means for reading a corresponding analysis flag simultaneously with the reading of said first corresponding data, and wherein said apparatus further comprises flag decode means responsive to said corresponding analysis flag indicating that the first corresponding data has been processed for supplying said first corresponding data as a final label value and for inhibiting said coincidence detecting means, said second accessing means and said write control means from operating.

64. The apparatus according to claim 63, wherein said flag decode means includes means responsive to said corresponding analysis flag means indicating that the first corresponding data has been unprocessed for enabling said coincidence detecting means, said second accessing means and said write control means.

65. The apparatus according to claim 56, further comprising output means for supplying said second corresponding data as a final label in parallel with writing operation of said write control means.

* * * * *